(12) United States Patent
Page et al.

(10) Patent No.: US 12,443,671 B2
(45) Date of Patent: Oct. 14, 2025

(54) DISTRIBUTED SYSTEMS AND METHODS FOR FACILITATING WEBSITE REMEDIATION AND PROMOTING ASSISTIVE TECHNOLOGIES AND DETECTING COMPLIANCE ISSUES

(71) Applicant: AudioEye, Inc., Tucson, AZ (US)

(72) Inventors: Jonathan Robert Page, Boring, OR (US); Sean Michael Massie, Portland, OR (US); Dominic Peter Varacalli, Portland, OR (US); Robert Edward Higdon, Portland, OR (US)

(73) Assignee: AudioEye, Inc., Tucson, AZ (US)

( * ) Notice: Subject to any disclaimer, the term of this patent is extended or adjusted under 35 U.S.C. 154(b) by 0 days.

(21) Appl. No.: 17/451,273

(22) Filed: Oct. 18, 2021

(65) Prior Publication Data
US 2022/0121723 A1 Apr. 21, 2022

Related U.S. Application Data

(60) Provisional application No. 63/093,486, filed on Oct. 19, 2020, provisional application No. 63/112,307, filed on Nov. 11, 2020.

(51) Int. Cl.
G06F 17/20 (2006.01)
G06F 11/07 (2006.01)
G06F 11/3668 (2025.01)
G06F 16/955 (2019.01)

(52) U.S. Cl.
CPC ...... G06F 16/9566 (2019.01); G06F 11/0784 (2013.01); G06F 11/0793 (2013.01); G06F 11/3684 (2013.01); G06F 11/3688 (2013.01)

(58) Field of Classification Search
CPC ............ G06F 16/9566; G06F 11/0784; G06F 11/0793; G06F 11/3684; G06F 11/3688; G06F 11/263
See application file for complete search history.

(56) References Cited

U.S. PATENT DOCUMENTS

| 5,918,223 | A | 6/1999 | Blum et al. |
| 5,930,752 | A | 7/1999 | Kawaguchi et al. |
| 5,991,781 | A | 11/1999 | Nielsen |
| 6,092,039 | A | 7/2000 | Zingher |
| 6,240,448 | B1 | 5/2001 | Imielinski et al. |
| 6,606,374 | B1 | 8/2003 | Rokoff et al. |
| 6,665,642 | B2 | 12/2003 | Kanevsky et al. |

(Continued)

FOREIGN PATENT DOCUMENTS

| CA | 2773088 A1 | 3/2011 |
| CA | 2800723 A1 | 12/2011 |

(Continued)

OTHER PUBLICATIONS

US 8,874,716 B2, 10/2014, Derin et al. (withdrawn)

(Continued)

Primary Examiner — Nicholas P Celani
Assistant Examiner — Wuji Chen
(74) Attorney, Agent, or Firm — Perkins Coie LLP

(57) ABSTRACT

Systems and methods are disclosed herein for identifying accessibility issues in web sites and for remediating website accessibility issues to thereby facilitate website navigation by people with diverse abilities.

16 Claims, 20 Drawing Sheets

(56) References Cited

U.S. PATENT DOCUMENTS

| | | | |
|---|---|---|---|
| 6,742,021 B1 | 5/2004 | Halverson et al. | |
| 6,751,544 B2 | 6/2004 | Hashimoto et al. | |
| 6,880,014 B2 | 4/2005 | Brown et al. | |
| 6,934,684 B2 | 8/2005 | Alpdemir et al. | |
| 6,940,953 B1 | 9/2005 | Eberle et al. | |
| 6,944,665 B2 | 9/2005 | Brown et al. | |
| 6,959,279 B1 | 10/2005 | Jackson et al. | |
| 7,010,581 B2 | 3/2006 | Brown et al. | |
| 7,028,306 B2 | 4/2006 | Boloker et al. | |
| 7,106,220 B2 | 9/2006 | Gourgey et al. | |
| 7,124,366 B2 | 10/2006 | Foreman et al. | |
| 7,174,293 B2 | 2/2007 | Kenyon et al. | |
| 7,181,692 B2 | 2/2007 | Siegel | |
| 7,194,411 B2 | 3/2007 | Slotznick et al. | |
| 7,194,752 B1 | 3/2007 | Kenyon et al. | |
| 7,219,136 B1 | 5/2007 | Danner et al. | |
| 7,246,058 B2 | 7/2007 | Burnett | |
| 7,284,255 B1 | 10/2007 | Apel et al. | |
| 7,334,050 B2 | 2/2008 | Zondervan et al. | |
| 7,546,531 B2 | 6/2009 | Celik | |
| 7,653,544 B2 | 1/2010 | Bradley et al. | |
| 7,702,674 B2 | 4/2010 | Hyder et al. | |
| 7,810,087 B2 | 10/2010 | O'Brien | |
| 7,849,448 B2 * | 12/2010 | Yunus | G06F 21/51 714/25 |
| 7,966,184 B2 | 6/2011 | O'Conor et al. | |
| 8,046,229 B2 | 10/2011 | Bradley et al. | |
| 8,055,713 B2 | 11/2011 | Simske et al. | |
| 8,090,800 B2 | 1/2012 | Yee | |
| 8,103,956 B2 | 1/2012 | Trujillo | |
| 8,255,827 B2 | 8/2012 | Malik | |
| 8,260,616 B2 | 9/2012 | O'Conor et al. | |
| 8,260,903 B2 | 9/2012 | Ganesh et al. | |
| 8,296,150 B2 | 10/2012 | Bradley et al. | |
| 8,321,502 B2 | 11/2012 | Scoda | |
| 8,438,485 B2 | 5/2013 | Kulis et al. | |
| 8,448,084 B2 | 5/2013 | Brichter | |
| 8,452,600 B2 | 5/2013 | Fleizach | |
| 8,516,362 B2 | 8/2013 | Scoda | |
| 8,527,862 B2 | 9/2013 | Scoda et al. | |
| 8,572,549 B2 | 10/2013 | Ganesh et al. | |
| 8,589,169 B2 | 11/2013 | Bradley et al. | |
| 8,589,484 B2 | 11/2013 | Scoda | |
| 8,613,039 B2 | 12/2013 | Chen | |
| 8,650,474 B2 | 2/2014 | Scoda | |
| 8,694,319 B2 | 4/2014 | Bodin et al. | |
| 8,769,169 B2 | 7/2014 | Grieves et al. | |
| 8,855,423 B2 | 10/2014 | Boncyk et al. | |
| 8,868,638 B2 | 10/2014 | Scoda | |
| 8,903,978 B2 | 12/2014 | Zerr et al. | |
| 8,935,364 B2 | 1/2015 | Teraguchi | |
| 8,983,935 B2 | 3/2015 | Scoda | |
| 8,984,164 B2 | 3/2015 | Scoda | |
| 8,990,392 B1 | 3/2015 | Stamos | |
| 9,003,423 B1 * | 4/2015 | Rodriguez Valadez | G06F 9/542 719/310 |
| 9,009,784 B2 * | 4/2015 | Chen | H04L 67/10 726/1 |
| 9,146,675 B2 | 9/2015 | Chen et al. | |
| 9,208,783 B2 | 12/2015 | Ativanichayaphong et al. | |
| 9,268,753 B2 | 2/2016 | Hendry et al. | |
| 9,275,023 B2 | 3/2016 | Scoda | |
| 9,311,281 B2 | 4/2016 | Scoda | |
| 9,319,244 B2 | 4/2016 | Taylor et al. | |
| 9,356,574 B2 | 5/2016 | Denninghoff | |
| 9,384,183 B2 | 7/2016 | Kasa et al. | |
| 9,473,592 B2 | 10/2016 | Scoda | |
| 9,489,131 B2 | 11/2016 | Seymour et al. | |
| 9,514,238 B2 | 12/2016 | Blitzstein | |
| 9,547,633 B2 | 1/2017 | Scoda | |
| 9,569,795 B1 | 2/2017 | Shin et al. | |
| 9,575,624 B2 | 2/2017 | Voorhees et al. | |
| 9,632,800 B1 | 4/2017 | Chorley et al. | |
| 9,715,557 B2 | 7/2017 | Kim et al. | |
| 9,727,660 B2 | 8/2017 | Barrell et al. | |
| 9,736,245 B2 | 8/2017 | Scoda | |
| 9,736,524 B2 | 8/2017 | Aravamudan et al. | |
| 9,767,487 B2 | 9/2017 | Schechter et al. | |
| 9,811,602 B2 | 11/2017 | Dewar et al. | |
| 9,846,572 B2 | 12/2017 | Scoda | |
| 9,846,686 B2 | 12/2017 | Scoda | |
| 9,865,261 B2 | 1/2018 | Goenka et al. | |
| 9,875,671 B2 | 1/2018 | Gharpure et al. | |
| 9,876,776 B2 | 1/2018 | Scoda | |
| 9,971,636 B2 | 5/2018 | Scoda et al. | |
| 9,996,613 B2 | 6/2018 | Jadhav et al. | |
| 10,015,226 B2 | 7/2018 | Scoda et al. | |
| 10,037,318 B2 | 7/2018 | Liu | |
| 10,049,089 B2 | 8/2018 | Scoda et al. | |
| 10,116,726 B2 | 10/2018 | Scoda | |
| 10,120,847 B2 | 11/2018 | Scoda | |
| 10,141,006 B1 | 11/2018 | Burciu | |
| 10,198,414 B2 | 2/2019 | Scoda | |
| 10,218,775 B2 | 2/2019 | Scoda | |
| 10,222,942 B1 | 3/2019 | Zeiler | |
| 10,237,334 B2 | 3/2019 | Alexander et al. | |
| 10,276,148 B2 | 4/2019 | Fleizach et al. | |
| 10,282,401 B2 | 5/2019 | Scoda | |
| 10,311,751 B2 | 6/2019 | Beranek | |
| 10,318,095 B2 | 6/2019 | Harrison et al. | |
| 10,331,756 B2 | 6/2019 | Chen et al. | |
| 10,394,579 B2 | 8/2019 | Nandakumar et al. | |
| 10,402,159 B1 | 9/2019 | Darrah et al. | |
| 10,423,709 B1 * | 9/2019 | Bradley | G06F 16/9577 |
| 10,425,501 B2 | 9/2019 | Nasson et al. | |
| 10,444,934 B2 * | 10/2019 | Bradley | G06F 40/117 |
| 10,452,730 B2 | 10/2019 | Scoda | |
| 10,452,758 B1 | 10/2019 | Bhowmick | |
| 10,481,752 B2 | 11/2019 | Latheef et al. | |
| 10,552,236 B2 | 2/2020 | Pahlavan Yali et al. | |
| 10,642,468 B2 | 5/2020 | Guido et al. | |
| 10,671,520 B1 * | 6/2020 | Rodrigues | H04L 41/0806 |
| 10,739,984 B1 | 8/2020 | Apicella | |
| 10,749,885 B1 * | 8/2020 | Hoorvitch | H04L 63/08 |
| 10,761,804 B2 | 9/2020 | Miron | |
| 10,762,280 B2 * | 9/2020 | Bradley | G06F 40/279 |
| 10,809,877 B1 | 10/2020 | Bradley | G10L 15/22 |
| 10,845,946 B1 * | 11/2020 | Bradley | G06F 40/117 |
| 10,845,947 B1 * | 11/2020 | Bradley | G06F 40/117 |
| 10,860,173 B1 * | 12/2020 | Bradley | G06F 3/0482 |
| 10,866,691 B1 * | 12/2020 | Bradley | G06F 3/04817 |
| 10,867,120 B1 | 12/2020 | Bradley et al. | |
| 10,896,286 B2 | 1/2021 | Bradley et al. | |
| 10,928,978 B2 * | 2/2021 | Bradley | G06F 3/04817 |
| 10,997,361 B1 * | 5/2021 | Bradley | G06F 40/174 |
| 11,029,815 B1 | 6/2021 | Bradley et al. | |
| 11,061,532 B2 | 7/2021 | Bradley et al. | |
| 11,080,469 B1 * | 8/2021 | Bradley | G06F 3/04817 |
| 11,151,304 B2 | 10/2021 | Bradley et al. | |
| 11,157,682 B2 | 10/2021 | Bradley et al. | |
| 11,194,884 B2 * | 12/2021 | Brunet | G06F 40/14 |
| 11,409,832 B2 * | 8/2022 | Isager | G06F 16/9577 |
| 11,455,458 B2 | 9/2022 | Bradley et al. | |
| 11,727,195 B2 | 8/2023 | Bradley et al. | |
| 12,045,560 B2 | 7/2024 | Bradley et al. | |
| 12,175,186 B2 | 12/2024 | Bradley et al. | |
| 2002/0003547 A1 | 1/2002 | Wang | |
| 2002/0007379 A1 | 1/2002 | Wang | |
| 2002/0010584 A1 | 1/2002 | Schultz et al. | |
| 2002/0010715 A1 | 1/2002 | Chinn et al. | |
| 2002/0023020 A1 | 2/2002 | Kenyon et al. | |
| 2002/0065658 A1 | 5/2002 | Kanevsky et al. | |
| 2002/0074396 A1 | 6/2002 | Rathus et al. | |
| 2002/0122053 A1 | 9/2002 | Dutta | |
| 2002/0124020 A1 | 9/2002 | Janakiraman et al. | |
| 2002/0124025 A1 | 9/2002 | Janakiraman et al. | |
| 2002/0156799 A1 | 10/2002 | Markel et al. | |
| 2002/0158903 A1 | 10/2002 | Janakiraman et al. | |
| 2002/0194388 A1 | 12/2002 | Boloker et al. | |
| 2002/0198705 A1 | 12/2002 | Burnett | |
| 2003/0033434 A1 | 2/2003 | Kavacheri et al. | |
| 2003/0098803 A1 | 5/2003 | Gourgey et al. | |
| 2003/0115546 A1 | 6/2003 | Dubey et al. | |

(56) References Cited

U.S. PATENT DOCUMENTS

| | | | |
|---|---|---|---|
| 2003/0140097 A1* | 7/2003 | Schloer | H04L 67/306 707/999.01 |
| 2003/0158737 A1 | 8/2003 | Csicsatka | |
| 2004/0002808 A1 | 1/2004 | Hashimoto et al. | |
| 2004/0006478 A1 | 1/2004 | Alpdemir et al. | |
| 2004/0056882 A1 | 3/2004 | Foreman et al. | |
| 2004/0128136 A1 | 7/2004 | Irani | |
| 2004/0148568 A1 | 7/2004 | Springer | |
| 2004/0158429 A1 | 8/2004 | Bary et al. | |
| 2004/0199392 A1 | 10/2004 | Khatri et al. | |
| 2004/0218451 A1 | 11/2004 | Said et al. | |
| 2004/0254988 A1 | 12/2004 | Rodriguez | |
| 2005/0033577 A1 | 2/2005 | Bradley et al. | |
| 2005/0108338 A1 | 5/2005 | Simske et al. | |
| 2005/0160065 A1 | 7/2005 | Seeman | |
| 2005/0195077 A1 | 9/2005 | McCulloch et al. | |
| 2006/0136579 A1* | 6/2006 | Linville | G06F 11/3688 709/208 |
| 2006/0212466 A1 | 9/2006 | Hyder et al. | |
| 2007/0100628 A1 | 5/2007 | Bodin et al. | |
| 2007/0174340 A1 | 7/2007 | Gross | |
| 2007/0208687 A1 | 9/2007 | O'Conor et al. | |
| 2007/0219908 A1 | 9/2007 | Martinez | |
| 2008/0133500 A1 | 6/2008 | Edwards et al. | |
| 2008/0168049 A1 | 7/2008 | Gao et al. | |
| 2008/0208593 A1 | 8/2008 | Ativanichayaphong et al. | |
| 2008/0235564 A1 | 9/2008 | Erol et al. | |
| 2009/0319927 A1 | 12/2009 | Beeman et al. | |
| 2010/0070872 A1 | 3/2010 | Trujillo | |
| 2010/0095210 A1 | 4/2010 | Bradley et al. | |
| 2010/0114578 A1 | 5/2010 | Yuen et al. | |
| 2010/0166165 A1 | 7/2010 | Langseth et al. | |
| 2010/0205523 A1 | 8/2010 | Lehota et al. | |
| 2010/0251217 A1 | 9/2010 | Miller | |
| 2011/0154212 A1 | 6/2011 | Gharpure et al. | |
| 2011/0196861 A1 | 8/2011 | Egnor et al. | |
| 2011/0231192 A1 | 9/2011 | O'Conor et al. | |
| 2011/0252356 A1* | 10/2011 | Morris | G06F 9/451 715/772 |
| 2011/0295623 A1 | 12/2011 | Behringer et al. | |
| 2011/0302298 A1* | 12/2011 | Lawrance | H04L 67/563 709/224 |
| 2011/0307259 A1 | 12/2011 | Bradley et al. | |
| 2011/0307855 A1 | 12/2011 | Scoda et al. | |
| 2012/0116872 A1 | 5/2012 | Hicken et al. | |
| 2012/0176509 A1 | 7/2012 | Aravamudan et al. | |
| 2012/0216243 A1 | 8/2012 | Gill et al. | |
| 2012/0239405 A1 | 9/2012 | O'Conor et al. | |
| 2012/0240045 A1 | 9/2012 | Bradley et al. | |
| 2012/0254723 A1* | 10/2012 | Kasa | G06F 40/226 715/234 |
| 2012/0272132 A1* | 10/2012 | Mondal | G06F 16/957 715/234 |
| 2012/0278714 A1 | 11/2012 | Bradley et al. | |
| 2012/0322384 A1 | 12/2012 | Zerr et al. | |
| 2013/0073949 A1 | 3/2013 | Barrell et al. | |
| 2013/0104029 A1 | 4/2013 | Hendry et al. | |
| 2013/0212638 A1* | 8/2013 | Wilson | G06F 11/3688 726/1 |
| 2013/0305139 A1 | 11/2013 | Scoda | |
| 2013/0332815 A1 | 12/2013 | Gallo et al. | |
| 2014/0025949 A1* | 1/2014 | Kay | H04L 63/0428 713/168 |
| 2014/0047337 A1 | 2/2014 | Bradley et al. | |
| 2014/0059112 A1* | 2/2014 | Chen | H04L 67/10 709/201 |
| 2014/0063070 A1 | 3/2014 | Leventhal et al. | |
| 2014/0149447 A1 | 5/2014 | Scoda | |
| 2014/0164352 A1 | 6/2014 | Denninghoff | |
| 2014/0180846 A1 | 6/2014 | Meron | |
| 2014/0195653 A1 | 7/2014 | Alexander et al. | |
| 2014/0365860 A1 | 12/2014 | Spielberg et al. | |
| 2014/0380149 A1 | 12/2014 | Gallo et al. | |
| 2015/0067342 A1* | 3/2015 | Pazdziora | H04L 9/3247 713/176 |
| 2015/0106686 A1 | 4/2015 | Blitzstein | |
| 2015/0113410 A1 | 4/2015 | Bradley et al. | |
| 2015/0156084 A1 | 6/2015 | Kaminsky | |
| 2015/0286658 A1 | 10/2015 | Folkens et al. | |
| 2015/0319215 A1 | 11/2015 | Scoda | |
| 2015/0370815 A1 | 12/2015 | Lee | |
| 2016/0004628 A1* | 1/2016 | Gugri | G06F 11/3688 717/124 |
| 2016/0188714 A1 | 6/2016 | Bradley et al. | |
| 2016/0188838 A1 | 6/2016 | Bradley et al. | |
| 2016/0189567 A1 | 6/2016 | Bradley et al. | |
| 2016/0306784 A1* | 10/2016 | Bradley | G10L 25/48 |
| 2016/0337426 A1 | 11/2016 | Shribman et al. | |
| 2017/0063653 A1* | 3/2017 | Kieviet | H04L 43/062 |
| 2017/0111431 A1 | 4/2017 | Scoda et al. | |
| 2017/0269816 A1* | 9/2017 | Bradley | G06F 40/14 |
| 2017/0324803 A1* | 11/2017 | Shaath | G06F 11/3688 |
| 2017/0371975 A1 | 12/2017 | Chen et al. | |
| 2018/0075438 A1 | 3/2018 | Celik et al. | |
| 2018/0165258 A1 | 6/2018 | Scoda | |
| 2018/0191764 A1 | 7/2018 | Chawla et al. | |
| 2018/0239516 A1 | 8/2018 | Scoda | |
| 2018/0267847 A1 | 9/2018 | Smith et al. | |
| 2018/0293504 A1 | 10/2018 | Meruva et al. | |
| 2018/0336356 A1 | 11/2018 | Papaxenopoulos et al. | |
| 2018/0349004 A1 | 12/2018 | Scoda et al. | |
| 2019/0075081 A1 | 3/2019 | Adam et al. | |
| 2019/0272168 A1* | 9/2019 | Mani Nadar | G06F 11/3688 |
| 2019/0340212 A1 | 11/2019 | Isager | |
| 2019/0354262 A1 | 11/2019 | Bradley et al. | |
| 2020/0073921 A1* | 3/2020 | Bradley | G06F 40/174 |
| 2020/0371669 A1 | 11/2020 | Bradley et al. | |
| 2020/0371670 A1 | 11/2020 | Bradley et al. | |
| 2020/0371671 A1 | 11/2020 | Bradley et al. | |
| 2020/0371672 A1 | 11/2020 | Bradley et al. | |
| 2020/0372204 A1* | 11/2020 | Bradley | G06F 40/14 |
| 2020/0372205 A1* | 11/2020 | Bradley | G06F 16/22 |
| 2021/0157473 A1 | 5/2021 | Bradley et al. | |
| 2021/0157474 A1 | 5/2021 | Bradley et al. | |
| 2021/0157972 A1 | 5/2021 | Bradley et al. | |
| 2021/0165950 A1 | 6/2021 | Bradley et al. | |
| 2021/0165951 A1 | 6/2021 | Bradley et al. | |
| 2021/0256201 A1 | 8/2021 | Bradley et al. | |
| 2022/0121723 A1* | 4/2022 | Page | G06F 11/0784 |
| 2022/0129123 A1 | 4/2022 | Nair et al. | |
| 2022/0245327 A1 | 8/2022 | Bradley et al. | |
| 2022/0269849 A1 | 8/2022 | Bradley et al. | |
| 2023/0161946 A1* | 5/2023 | Bradley | G06F 16/22 715/205 |
| 2023/0344657 A1* | 10/2023 | Kumar | G06Q 10/06313 |
| 2024/0111740 A1* | 4/2024 | Mishra | G06F 16/958 |
| 2024/0193348 A1 | 6/2024 | Bradley et al. | |
| 2024/0362401 A1 | 10/2024 | Bradley et al. | |

FOREIGN PATENT DOCUMENTS

| | | | |
|---|---|---|---|
| CA | 2800790 | A1 | 12/2011 |
| CA | 2807320 | A1 | 2/2012 |
| CA | 2811207 | A1 | 3/2012 |
| CA | 2816336 | A1 | 5/2012 |
| CA | 2816338 | A1 | 5/2012 |
| CA | 2821769 | A1 | 6/2012 |
| CA | 2839013 | A1 | 1/2013 |
| CA | 2861602 | A1 | 8/2013 |
| CA | 2824861 | A1 | 3/2014 |
| CA | 2834466 | A1 | 5/2014 |
| CA | 2843938 | A1 | 9/2014 |
| CA | 2845279 | A1 | 9/2014 |
| CA | 2848175 | A1 | 10/2014 |
| CA | 2855420 | A1 | 1/2015 |
| CA | 2858590 | A1 | 2/2015 |
| CA | 2868162 | A1 | 5/2015 |
| CA | 2947402 | A1 | 11/2015 |
| CA | 2958235 | A1 | 3/2016 |
| CA | 2963393 | A1 | 4/2016 |
| CA | 2716635 | C | 11/2016 |
| CA | 2944659 | A1 | 4/2017 |

(56) References Cited

FOREIGN PATENT DOCUMENTS

| | | |
|---|---|---|
| CA | 2951659 A1 | 6/2017 |
| CA | 2839006 C | 8/2017 |
| CA | 2732540 C | 2/2018 |
| EP | 2738696 A1 | 6/2014 |
| EP | 2656303 A4 | 7/2014 |
| EP | 2778975 A1 | 9/2014 |
| EP | 2787454 A1 | 10/2014 |
| EP | 2827261 A1 | 1/2015 |
| EP | 2851813 A1 | 3/2015 |
| EP | 2732385 A4 | 4/2015 |
| EP | 2869222 A1 | 5/2015 |
| EP | 2363995 B1 | 7/2015 |
| EP | 2807578 A4 | 11/2015 |
| EP | 2724253 A4 | 4/2016 |
| EP | 2580699 A4 | 7/2016 |
| EP | 2580686 A4 | 11/2016 |
| EP | 2638683 B1 | 3/2017 |
| EP | 3156919 A1 | 4/2017 |
| EP | 3185145 A1 | 6/2017 |
| EP | 2638681 B1 | 7/2017 |
| EP | 2606436 A4 | 11/2017 |
| EP | 2778976 B1 | 12/2017 |
| EP | 3140733 A4 | 12/2017 |
| EP | 2616962 A4 | 1/2018 |
| EP | 2476063 A4 | 2/2018 |
| EP | 3195136 A4 | 4/2018 |
| EP | 3204874 A4 | 7/2018 |
| EP | 2724251 B1 | 8/2018 |
| WO | WO 2001/075678 | 10/2001 |
| WO | WO 2006/065877 | 6/2006 |
| WO | WO2009111251 A1 | 9/2009 |
| WO | WO2011031868 A1 | 3/2011 |
| WO | WO2011156739 A2 | 12/2011 |
| WO | WO2011156743 A2 | 12/2011 |
| WO | WO2012024380 A3 | 6/2012 |
| WO | WO2012064857 A3 | 9/2012 |
| WO | WO2012088326 A9 | 9/2012 |
| WO | WO2012064856 A3 | 10/2012 |
| WO | WO2012036833 A9 | 12/2012 |
| WO | WO2012178167 A3 | 2/2013 |
| WO | WO2013003455 A3 | 3/2013 |
| WO | WO2013112285 A1 | 8/2013 |
| WO | WO 2013/184273 | 12/2013 |
| WO | WO2014040080 A1 | 3/2014 |
| WO | WO2015171228 A1 | 11/2015 |
| WO | WO2016032602 A1 | 3/2016 |
| WO | WO2016057092 A1 | 4/2016 |
| WO | 2017/061008 A1 | 4/2017 |
| WO | WO 2017/161008 | 9/2017 |

OTHER PUBLICATIONS

Asakawa et al., "Annotation-Based Transcoding for Nonvisual Web Access", In Proceedings of the 4th ACM Conference on Assistive Technologies, ASSETS 2000, Arlington, Virginia, USA, (Nov. 13-15, 2000), pp. 172-179.

Le Hégaret P. et al., What is the Document Object Model? (Apr. 9, 2002), available at https://www.w3.org/TR/2002/WD-DOM-Level-3-Core-20020409/introduction.html; 8 pages.

Introduction to XML and XML with JAVA, Nov. 8, 2005, originally available at http://totheriver.com/learn/XML/xmltutorial.html in 27 pages.

JAVA, "XML Processing" (2004), available at https://web.mit.edu/java_v1.5.0_22/distrib/share/docs/guide/XML/jaxp/index.html, in 3 pages.

JAVA2 Platform Standard Edition 5.0 API Specification, downloaded on Aug. 29, 2022; available at https://web.mit.edu/java_v1.5.0_22/distrib/share/docs/api/index.html, in 5 pages.

JAVA2 Platform Standard Edition 5.0 API Specification, downloaded on Sep. 1, 2022; available at https://web.mit.edu/java_v1.5.0_22/distrib/share/docs/api/index.html, in 9 pages.

Scale, "CSS: Cascading Style Sheets / MDN", last updated Jun. 11, 2022, available at https://developer.mozilla.org/en-US/docs/WebCSS/transform-function/scale, in 5 pages.

Takagi et al., Collaborative web accessibility improvement: challenges and possibilities. In Proceedings of the 11th International ACM SIGACCESS Conference on Computers and Accessibility, Oct. 25, 2009; pp. 195-202.

W3C, "Introduction to Web Accessibility", Last visited Aug. 31, 2021, available at: https://www.w3.org/WAI/fundamentals/accessibility-intro/, in 8 pages.

W3C, Accessible Rich Internet Applications (WAI-ARIA) 1.0 (2014) available at https://www.w3.org/TR/wai-aria-1.0/states_and_properties in 32 pages.

W3C, A vocabulary and associated APIs for HTML and XHTML W3C (Working Draft) Apr. 5, 2011; available at https://www.w3.org/TR/2011/WD-HTM15-20110405/, in 19 pages.

W3C, "Cascading Style Sheets, level 2 CSS2 Specification", May 12, 1998; available at https://www.w3.org/TR/1998/REC-CSS2-19980512/Overview.html, in ?? Pages.

W3C, "Package.org.w3c.dom: Interface for DOM"; (2004) originally available at https://web.mit.edu/java_v1.5.0_22/distrib/share/docs/api/org/w3c/dom/package-summary-html, in 3 pages.

W3C, "5.1.2 Request-URI" part of Hypertext Transfer Protocol—HTTP/1.1., available at https://www.w3.org/Protocols/rfc2616/rfc2616-sec5.html, in 3 pages.

W3C, "The ALT-server (An eye for an alt)", Jul. 1997-Jan. 1998), originally available at https://www.23.org/WAI/altserv.htm, in 9 pages.

W3SCHOOLS.com, "CSS transform property", downloaded on Jan. 9, 2022; available at https://www.w3schools.com/cssref/css3_pr_transform.asp in 8 pages.

WEBVISUM-1, Jul. 7, 2008, originally available at http:/www.webvisum.com, in 2 pages.

WEBVISUM-2, "Review of the WebVisum Firefox extension"; Jul. 3, 2008, originally available at http:/www.marcozehe.de/2008/07/03/review-of-the-webvisum-firefox-extension/, currently availabe at http://web.archive.org/web/20080902031833/http:/www.marcozehe.de/2008/07/03/review-of-the-webvisum-firefox-extension/, in 14 pages.

Zoom, "CSS: Cascading Style Sheets / MDN", last updated Aug. 30, 2022; available at https://developer.mozilla.org/en-US/docs/Web/CSS/zoom in 5 pages.

Petition for Inter Partes Review of U.S. Pat. No. 10997361 filed Sep. 6, 2022 in 86 pages.

Petition for Inter Partes Review of U.S. Pat. No. 10928978 filed Sep. 6, 2022 in 87 pages.

Petition for Inter Partes Review of U.S. Pat. No. 11061532 filed Sep. 7, 2022 in 96 pages.

Petition for Inter Partes Review of U.S. Pat. No. 11080469 filed Sep. 7, 2022 in 96 pages.

International Search Report and Written Opinion of PCT/US2021/055465 dated Feb. 4, 2022 in 9 pages.

U.S. Appl. No. 16/991,392, filed Aug. 12, 2020, Bradley et al.
U.S. Appl. No. 16/991,381, filed Aug. 12, 2020, Bradley et al.
U.S. Appl. No. 16/991,434, filed Aug. 12, 2020, Bradley et al.
U.S. Appl. No. 16/991,505, filed Aug. 12, 2020, Bradley et al.
U.S. Appl. No. 16/991,578, filed Aug. 12, 2020, Bradley et al.
U.S. Appl. No. 17/447,654, filed Sep. 14, 2021, Bradley et al.
U.S. Appl. No. 17/447,680, filed Sep. 14, 2021, Bradley et al.

Alor-Hernandez et al., "Towards Dynamic Representation of Rich Internet Applications through Web Service Invocation," 2009 Second International Conference on Advances in Human-Oriented and Personalized Mechanisms, Technologies, and Services, Porto, Portugal, 2009, pp. 33-38.

Al Oudat et al., "A Survey of Image Retrieval Techniques for Search Engine", International Journal of Scientific & Engineering Research, Jul. 2015, vol. 6, Issue 7, pp. 1868-1888.

Amalfitano et al., "An Interactive Approach for the Reverse Engineering of Rich Internet Application User Interfaces," 2010 Fifth International Conference on Internet and Web Applications and Services, Barcelona, Spain, 2010, pp. 401-410.

Berners-Lee et al., "RFC 1738: Uniform Resource Locators (URL)", Proposed Standard—Dec. 1994; in 29 pages.

(56) References Cited

OTHER PUBLICATIONS

Bigham et al., "WebInSight: Making Web Images Accessible", Proceedings of the 8th International ACM SIG ACCESS Conference on Computers and Accessibility, 2006, pp. 181-188.
Bigham, "Increasing Web Accessibility by Automatically Judging Alternative Text Quality", 12th International Conference on Intelligent User Interfaces, IUI 2007, Honolulu, Hawaii, USA, pp. 349-352, alleged to be available at https://dl.acm.org/doi/10.1145/1216295.1216364.
Bureau of Internet Accessibility [BOIA] "History of the Web Content Accessibility Guidelines (WCAG)", dated May 6, 2019 in 4 pages; alleged to be available at: https://www.boia.org/blog/history-of-the-web-content-accessibility-guidelines-wcag in 4 pages.
Brunet et al., "Accessibility requirements for systems design to accommodate users with vision impairments", IBM Systems Journal, 2005, 44(3): 445-466.
Clarifai, Inc., "Bring the Future into Focus with our World Class Visual Recognition System", May 15, 2015 WayBackMachine Date; in 4 pages.
Cundiff C., Alt Text Bot, DevPost, alleged to be available at: https://devpost.com/software/alt-text-bot-hgzu, downloaded Apr. 8, 2021 in 6 pages.
Dove, CamFind Launches CloudSight API for Multiplatform Visual Search Functionality, The Next Web alleged to be available at https://thenextweb.com/creativity /2015/02/24/camfind- launches-cloudsight-api-for-multiplatform-visual-search-functionality/ in 4 pages.
Fielding et al., "Hypertext Transfer Protocol—HTTP/1.1", Network Working Group; The Internet Society (1999) in 4 pages.
Iaccarino et al., "Personalizable Edge Services for Web Accessibility", Univ Access Inf Soc 6, 2007, pp. 285-306 https://doi.org/10.1007/s10209-007-0091-y.
Image Searcher, Inc., "CamFind—The First Visual Search Engine Goes Social", PR Newswire Apr. 16, 2015 in 5 pages; alleged to be available at https://www.pmewswire.com/news-releases/camfind---the- first-visual-search-engine-goes-social-300067412.html in 5 pages.
Janakiram, MSV, Google Cloud Vision API Delivers Sophisticated Image Recognition Service to Developers, Forbes Magazine alleged to be available at: https://www.forbes.com/sites/janakirammsv/2015/12/03/google-cloud-vision-api-delivers-sophisticated-image-recognition-service-to-developers/?sh=4f7706bc6d22 in 4 pages.
Kar S., AlchemyAPI Releases API based AI Image Processing AlchemyVision, SiliconAngle, May 20, 2014; alleged to be available at https://siliconangle.com/2014/05/20/alchemyapi-releases- api-based-ai-image-processing-alchemyvision/ in 8 pages.
Kneser et al., "Toward Knowledge-Enhanced Viewing Using Encyclopedias and Model-Based Segmentation", Proc. SPIE 7260, Medical Imaging 2009: Computer-Aided Diagnosis, 72601D; doi: 10.1117/12.811587 in 10 pages.
Maeda et al., "Web accessibility technology at the IBM Tokyo Research Laboratory", IBM Journal of Research and Development, Nov. 2004, 48(5/6): 735-749 http://dialog.proquest.com/professional/docview/220685504?accountid=157282.
Nguyen et al., "Learning to Extract Form Labels", Very Large Data Base Conference (VLDB), Aug. 24-30, 2008 Auckland, New Zealand in 11 pages.
Novet J., "How Stephen Wolfram's Image-Recognition Tool Performs Against 5 Alternatives", VentureBeat alleged to be available at https://venturebea t.com/2015/05/16/how-stephen-wolframs-image-recognition-tool-peftorms-against-5-alternatives/ in 10 pages.
Sato et al., "Accessibility Evaluation based on Machine Learning Technique", Oct. 22-25, 2006, Portland, Oregon, USA, ACM, in 2 pages (Year: 2006).
Schiavone et al., "An extensible environment for guideline-based accessibility evaluation of dynamic Web applications", Univ Access Inf Soc., Jan. 2015, 22 pages.
Sensus Internet Browser, printed from www/sensus.dk/sibl0uk.htm on Jul. 23, 2002.
Shadi et al., "Artificial Intelligence for Web Accessibility-Conformance Evaluation as a Way Forward?", Apr. 23-25, 2018, Lyon, France, ACM, pp. 5 (Year: 2018) in 5 pages.
Venugopalan et al., "Sequence to Sequence—Video to Text", Computer Vision Foundation IEEE Xplore, In Proceedings of the IEEE International Conference on Computer Vision (ICCV), 2015, pp. 4534-4542.
W3C, "HTML 4.0 Specification" [Excerpts]; W3C Recommendation, revised on Apr. 24, 1998 downloaded from http://www.w3.org/TR/1998/REC-html40-19980424/ in 20 pages.
W3C, "Document Object Model (DOM) Level 1 Specification v1.0", W3C Recommendation 1-Oct. 1998 ("W3C DOM") in 169 pages.
W3C, "Web Content Accessibility Guidelines 1.0", W3C Recommendation, May 5, 1999 in 34 pages.
W3C, "Html Techniques for Web Content Accessibility Guidelines 1.0", W3C Note, Nov. 6, 2000 in 56 pages.
W3C, "Techniques for Web Content Accessibility Guidelines 1.0", W3C Note (WCAG Techniques v1.0) Nov. 6, 2000, in 23 pages.
W3C, "Web Content Accessibility Guidelines (WCAG) v2.0" (WCAG 2.0), W3C Recommendation, Dec. 11, 2008, in 29 pages.
W3C, "Supported States and Properties", Chapter 6 in Accessible Rich Internet Applications 1.0; WayBackMachine Jan. 14, 2015, available at https://web.archive.org/web/20150114075748/http://www.w3.org/TR/wai-aria/states_and_properties#aria-label/ in 41 pages.
W3C, "Mobile Accessibility: How WCAG 2.0 and Other W3C/WAI Guidelines Apply to Mobile", W3C First Public Working Draft Feb. 26, 2015; alleged to be available at: https://www.w3.org /TR/mobile-accessibility-mapping/ in 14 pages.
W3C, "Web Accessibility Evaluation Tools List", downloaded May 10, 2021; alleged to be available at: https://www.w3.org /TR/mobile- accessibility-mapping/ in 23 pages.
W3c, "Introduction to Web Accessibility", Web Accessibility Initiative (WAI) available at https://www.w3.org/WAI/fundamentals/accessibility-intro/ downloaded Dec. 4, 2021 in 6 pages.
W3C, "W3C Accessibility Standards Overview", Web Accessibility Initiative (WAI) available at https://www.w3.org/WAI/standards-guidelines/ downloaded Dec. 4, 2021 in 5 pages.
W3SCHOOLS.com, "HTML Global Hidden Attribute", WayBackMachine Jan. 15, 2015, available at https://web.archive.org/web/20150115050246/http://www.w3schools.com/tags/att_global_hidden.asp in 4 pages.
W3SCHOOLS.com, "HTML <input> name Attribute", WayBackMachine Jan. 15, 2015, available at https://web.archive.org/web/20150115063533/http://www.w3schools.com/tags/att_input_name.asp in 4 pages.
W3SCHOOLS.com, "HTML <input> placeholder Attribute", WayBackMachine Jan. 15, 2015, available at https://web.archive.org/web/20150115063535/http://www.w3schools.com/tags/att_input_placeholder.as p in 4 pages.
W3SCHOOLS.com, "HTML <p> Tag", WayBackMachine Jan. 15, 2015, available at https://web.archive.org/web/20150115043456/http://www.w3schools.com/tags/tag_p.asp in 4 pages.
W3SCHOOLS.com, "HTML <span> Tag", WayBackMachine Jan. 15, 2015, available at https://web.archive.org/web/20150115043512/http://www.w3schools.com/tags/tag_span.asp in 4 pages.
W3SCHOOLS.com, "HTML Input Types", WayBackMachine Jan. 15, 2015, available at https://web.archive.org/web/20150115041345/http://www.w3schools.com/html/html_form_input_types.a sp in 11 pages.
European Search Report and Written Opinion of EP 17767449.6 dated Oct. 15, 2019 in 10 pages.
International Preliminary Report on Patentability dated Jan. 25, 2019 for International Application No. PCT/US2017/022542 in 36 pages.
International Search Report and Written Opinion of PCT/US17/22542 dated Jun. 20, 2017 in 10 pages.
International Search Report and Written Opinion of PCT/US2019/046361 dated Dec. 5, 2019 in 17 pages.
*Audioeye, Inc.* v. *accessiBe Ltd.*, Case No. 6:20-cv-00924-LY (W.D. Tex.), Complaint—Infringement of U.S. Pat. Nos. 10,423,709, 10,444,934 and 10,762,280; filed Sep. 4, 2020 in 12 pages.
*Audioeye, Inc.* v. *accessiBe Ltd.*, Case No. 6:20-cv-00997-ADA (W.D. Tex.), First Amended Complaint—Infringement of U.S. Pat. Nos. 10,423,709, 10,444,934, 10,762,280, 10,809,877, 10,845,946 and 10,845,947; filed Dec. 2, 2020 in 46 pages.

(56) References Cited

OTHER PUBLICATIONS

*Audioeye, Inc. v. accessiBe Ltd.*, Case No. 6:20-cv-00997-ADA (W.D. Tex.), Second Amended Complaint—Infringement of U.S. Pat. Nos. 10,423,709, 10,444,934, 10,762,280, 10,809,877, 10,845,946, 10,845,947, 10,860,173, 10,866,691 and 10,867,120; filed Dec. 29, 2020 in 54 pages.

*Audioeye, Inc. v. accessiBe Ltd.*, Case No. 6:20-cv-00997-ADA (W.D. Tex.), Defendant accessiBe Ltd.'s Preliminary Invalidity Contentions, filed Jun. 25, 2021 in 1089 pages.

*Audioeye, Inc. v. accessiBe Ltd.*, Case No. 6:20-cv-00997-ADA (W.D. Tex.), [Document No. 33], Defendant accessiBe Ltd.'s Opening Claim Construction Brief, filed Aug. 13, 2021 in 55 pages.

*Audioeye, Inc. v. accessiBe Ltd.*, Case No. 6:20-cv-00997-ADA (W.D. Tex.) [Document No. 069] Amended Claim Construction Order, dated Nov. 23, 2021 in 8 pages.

*Audioeye, Inc. v. accessiBe Ltd.*, Case No. 6:21-cv-00726-ADA (W.D. Tex.), Plaintiff's Preliminary Infringement Contentions, filed Oct. 14, 2021 in 165 pages.

*Audioeye, Inc. v. accessiBe Ltd.*, Case No. 6:21-cv-00726-ADA (W.D. Tex.), Defendant's Preliminary Invalidity Contentions, filed Dec. 9, 2021 in 29 pages.

*Audioeye, Inc. v. accessiBe Ltd.*, Case No. 6:21-cv-00726-ADA (W.D. Tex.), Defendant's Preliminary Invalidity Contentions, filed Dec. 9, 2021, Exhibit 1 [U.S. Pat. No. 10,896,286] in 188 pages.

*Audioeye, Inc. v. accessiBe Ltd.*, Case No. 6:21-cv-00726-ADA (W.D. Tex.), Defendant's Preliminary Invalidity Contentions, filed Dec. 9, 2021, Exhibit 2 [U.S. Pat. No. 10,928,978] in 124 pages.

*Audioeye, Inc. v. accessiBe Ltd.*, Case No. 6:21-cv-00726-ADA (W.D. Tex.), Defendant's Preliminary Invalidity Contentions, filed Dec. 9, 2021, Exhibit 3 [U.S. Pat. No. 10,997,361] in 173 pages.

*Audioeye, Inc. v. accessiBe Ltd.*, Case No. 6:21-cv-00726-ADA (W.D. Tex.), Defendant's Preliminary Invalidity Contentions, filed Dec. 9, 2021, Exhibit 4 [U.S. Pat. No. 11,029,815] in 228 pages.

*Audioeye, Inc. v. accessiBe Ltd.*, Case No. 6:21-cv-00726-ADA (W.D. Tex.), Defendant's Preliminary Invalidity Contentions, filed Dec. 9, 2021, Exhibit 5 [U.S. Pat. No. 11,061,532] in 177 pages.

*Audioeye, Inc. v. accessiBe Ltd.*, Case No. 6:21-cv-00726-ADA (W.D. Tex.), Defendant's Preliminary Invalidity Contentions, filed Dec. 9, 2021, Exhibit 6 [U.S. Pat. No. 11,080,469] in 206 pages.

Petition for Inter Partes Review of U.S. Pat. No. 10,444,934 filed May 12, 2021 in 90 pages.

Declaration of Scott Delman dated Apr. 27, 2021 in support of Petition for IPR review of U.S. Pat. No. 10,444,934 in 2 pages.

Declaration of Dr. James Fogarty dated May 12, 2021 in support of Petition for Inter Partes Review of U.S. Pat. No. 10,444,934 in 158 pages.

Petition for Inter Partes Review of U.S. Pat. No. 10809877 filed Dec. 1, 2021 in 89 pages.

Declaration of Dr. Sylvia Hall-Ellis dated Nov. 10, 2021 in support of Petition for Inter Partes Review of U.S. Pat. No. 10,809,877 in 24 pages.

Declaration of Dr. James Fogarty dated Nov. 30, 2021 in support of Petition for Inter Partes Review of U.S. Pat. No. 10,809,877 in 124 pages.

Petition for Inter Partes Review of U.S. Pat. No. 10,845,946 filed Dec. 7, 2021 in 102 pages.

Declaration of Dr. Sylvia Hall-Ellis dated Dec. 3, 2021 in support of Petition for Inter Partes Review of U.S. Pat. No. 10,845,946 in 33 pages.

Declaration of Dr. James Fogarty dated Dec. 3, 2021 in support of Petition for Inter Partes Review of U.S. Pat. No. 10,845,946 in 192 pages.

Petition for Inter Partes Review of U.S. Pat. No. 10,845,947 filed Dec. 7, 2021 in 105 pages.

Declaration of Dr. James Fogarty dated Dec. 6, 2021 in support of Petition for Inter Partes Review of U.S. Pat. No. 10,845,947 in 179 pages.

Petition for Inter Partes Review of U.S. Pat. No. 10,866,691 filed Dec. 15, 2021 in 110 pages.

Declaration of Dr. Sylvia Hall-Ellis dated Dec. 13, 2021 in support of Petition for Inter Partes Review of U.S. Pat. No. 10,866,691 in 41 pages.

Declaration of Dr. James Fogarty dated Dec. 15, 2021 in support of Petition for Inter Partes Review of U.S. Pat. No. 10,866,691 in 161 pages.

Petition for Inter Partes Review of U.S. Pat. No. 10,860,173 filed Dec. 15, 2021 in 112 pages.

Declaration of Dr. Sylvia Hall-Ellis dated Dec. 13, 2021 in support of Petition for Inter Partes Review of U.S. Pat. No. 10,860,173 in 59 pages.

Declaration of Dr. James Fogarty dated Dec. 14, 2021 in support of Petition for Inter Partes Review of U.S. Pat. No. 10,866,691 in 188 pages.

http://wave.webaim.org.

https://www.w3.org/standards/webdesign/accessibility.

Mobile Accessibility: How WCAG 2.0 and Other W3C/WAI Guidelines Apply to Mobile alleged to be available at: https://www.w3.org/TR/mobile- accessibility-mapping/.

U.S. Appl. No. 16/99,1416, filed Aug. 12, 2020, by Bradley et al.
U.S. Appl. No. 16/991,304, filed Aug. 12, 2020, by Bradley et al.
U.S. Appl. No. 17/447,680, filed Sep. 14, 2021, by Bradley et al.
U.S. Appl. No. 16/991,329, filed Aug. 12, 2020, by Bradley et al.
U.S. Appl. No. 16/991,346, filed Aug. 12, 2020, by Bradley et al.
U.S. Appl. No. 16/991,405, filed Aug. 12, 2020, by Bradley et al.
U.S. Appl. No. 16/991,584, filed Aug. 12, 2020, by Bradley et al.
U.S. Appl. No. 16/991,671, filed Aug. 12, 2020, by Bradley et al.

Web Accessibility Evaluation Tools List alleged to be available at: https://www.w3.org /TR/mobile-accessibility-mapping/.

Web Content Accessibility Guidelines (WCAG) v1.0, W3C (WCAG v1.0).

\* cited by examiner

| issues_rema | result_code | scan_test_rename | | |
|---|---|---|---|---|
| 70446561139 | htmlTextResi | 652 | Detected a Small Font Size |
| 15554000404 | linkHrefExists | 423 | Anchor Tag is Correct |
| 13135313742 | cssComponen | 350 | Contrast Ratio Between the Visual Indicator and its Surroundings is Sufficient |
| 12895002062 | htmlClickable | 331 | Detected an Input Area That is Too Small |
| 11506069737 | htmlContentl | 344 | Could Not Detect a Method of Notifying Change in Content |
| 9723917692 | linkTextConta | 85 | Link Contains Meaningful Text |
| 8396451074 | htmlClickable | 332 | Input Area is Sufficiently Large |
| 7934738666 | cssComponen | 349 | Contrast Ratio Between the Visual Indicator and its Surroundings is Too Low |
| 5059093343 | htmlAriaRole | 141 | Found an ARIA Role or Label |
| 4625135516 | htmlSemanti | 39 | Found Semantic Tag |
| 3806049900 | buttonTextCo | 680 | Found a Button with Text |
| 3637804993 | htmlFocusSe | 80 | Tab Indexes are in Document Order |
| 3202977550 | htmlColorCu | 686 | Detected a link that relies only on color to distinguish itself |
| 3015866530 | formFieldMe | 592 | Check Whether The Form Field Should Contain an Autocomplete Attribute |
| 2581603099 | cssContrastx | 60 | CSS Has Adequate Contrast Ratios |
| 2596873654 | headingSequ | 91 | Headers are in Order |
| 2512656647 | formFieldLab | 113 | Form Field Has a Label |
| 2505220373 | fieldRequirec | 387 | Check that Field is Not Required |
| 1082468426 | htmlCompon | 238 | Check for Consistency in Design Across User Interfaces |
| 993730032 | htmlStyledTe | 191 | Ensure that Text is used Rather than Images of Text |
| 995600273 | emoticonDef | 27 | Found Emoticon with Text Equivalent |
| 99282873 | htmlSensory | 185 | Ensure Sensory only Information has Textual Indentification |
| 9567425 | htmlDocume | 52 | Document Order Matches Visual Order |
| 90943907 | htmlElement | 123 | Element Has a Unique ID |
| 83446643 | linkAdjacentI | 88 | Adjacent Links Point to Different Destinations |
| 73999175 | htmlTextResi | 188 | Ensure that Text can be Resized up to 200% without Assistive Technology |
| 70440350 | cssContrastT | 59 | Contrast Ratio is Too Low |
| 69622224 | linkImgTextA | 128 | Link Image Contains Meaningful Alt Text |
| 58113627 | scriptKeybo | 216 | Found an Element Using Native OnClick Functionality |
| 54811179 | htmlContentl | 302 | Check Whether Content Can Reach a Text Size of 320 CSS Pixels |
| 49281549 | imgTextAltFc | 6 | Image Has Alt Text |
| 44978377 | htmlContentl | 597 | Detected Two-Axis Scrolling on Reflow of Site Contents |
| 38612456 | formFieldErr | 147 | Ensure that Error Messages are Properly Added |

FIG. 3A

| | | |
|---|---|---|
| 8861266 | formErrorPre | 143 Check for Error Prevention Mechanisms on Important Forms |
| 3540033 | formContext | 135 Form Has a Submit Button |
| 3453305 | formFieldMe | 591 Detected a Valid Autocomplete Attribute |
| 3035650 | imgTextAltFo | 7 Image Is Decorative |
| 2994847 | cssContrastB | 58 Ensure that CSS Background Image Provides Enough Contrast |
| 2773513 | linkSamePage | 651 Same-Page Link Contains a Valid Reference |
| 2274710 | htmlLandma | 656 Found a Page Landmark |
| | htmlAriaRole | 688 An aria-describedby contains a reference to a target that does not exist. |
| 2160977 | htmlContent | 596 Detected a Collision of Elements on Reflow of Site Contents |
| 2013520 | htmlAriaRole | 692 An element with an ARIA role is missing a required child element |
| 1853434 | htmlAriaRole | 693 An element with an ARIA role is missing a required parent role |
| | linkTextCont | 126 Detected a Link with No Text Content |
| 1827258 | linkSamePage | 650 Detected a same-page link with an invalid reference |
| | scriptKeyboa | 63 Detected Mouse-Triggered Event with no Equivalent Keyboard Event |
| | buttonTextCc | 678 Button Title is Redundant |
| 1496159 | mediaFlashin | 66 Ensure that GIF Does Not Flash Excessively |
| | svgEquivalen | 23 Could Not Find Equivalent for SVG |
| | buttonTextCc | 676 Detected a button with no visible text |
| 1207767 | formFieldGrc | 116 Checkbox Group Has a Fieldset and Legend |
| 1161303 | formFieldRec | 118 No Visible Text Indication of Required Field |
| 1141191 | htmlAriaRole | 454 Detected an ARIA role checkbox that needs manual verification |
| 1042074 | formFieldMe | 593 Check Whether The Autocomplete Attribute of On/Off is Appropriate for The Form Field |
| 891581 | tableSemanti | 40 TH Elements are Needed on Data Tables |
| 840185 | htmlColorCu | 55 Information is Conveyed by More Than Just Color |
| 635009 | mediaFlashin | 67 Ensure that Script Does Not Cause Excessive Flashing |
| | htmlAriaRole | 634 Detected an invalid ARIA role value. |
| 806861 | htmlTitleFou | 75 Page Has a Title |
| 805056 | htmlFocusVis | 151 Check for Keyboard Focus Styles |
| 292239 | htmlTextAda | 598 Detected a Collision of Elements on Re-Spacing of Site Contents |
| | imgTextAltM | 3 Image Alt Text suggests a Decorative Image |
| 791186 | linkTextCont | 129 Link Title is Redundant |
| | linkAdjacent | 87 Combine Adjacent Links with Same HREF |
| 772911 | frameTitleDu | 664 Detected multiple frames with the same title |
| | imgTextAltNc | 1 Image Has No Alt Text |

FIG. 3B

| | | |
|---|---|---|
| | linkTextConte | 127 Link Text Content Does Not Describe Purpose |
| 6362166 | scriptDeviceC | 602 Detected a Media Query That May Lock Orientation |
| 6209422 | headingSequ | 90 Heading is Out of Order |
| 6097798 | headingLevel | 357 There is a single level 1 heading |
| 5416540 | frameTitleFo | 78 Frame Has a Title |
| 5382851 | videoDescrip | 163 Ensure Videos have user-selected Audio Track |
| 5362851 | videoTextAlt | 140 Check for Alternatives to Time Based Media |
| | linkHrefNone | 422 Anchor Not Functional |
| 5295516 | videoCaption | 29 Check for Captions on Linked Video |
| 5158753 | formContextI | 134 Form Does Not Appear to Have a Submit Button |
| 4757 | htmlSkipToM | 72 Page Has a Skip to Main Link |
| | formFieldReq | 119 Found Text Indication of Required Fields |
| 4714386 | firstHeaderC | 353 Priority level of the first heading is high enough |
| | frameTitleNo | 76 Frame Has No Title |
| | formFieldLab | 110 Form Field Has No Label |
| | linkImgTextA | 281 Images Inside a Link Must Contain Alt Text If No Other Text is Found |
| | linkImgTextA | 83 Link Image Alt is the File Name |
| | firstHeaderLe | 354 Initial Page Heading Should Be Level 1 or 2 |
| | htmlAriaRole | 687 An aria-labelledby contains a reference to a target that does not exist. |
| | linkImgTextA | 84 Link Image Alt is Redundant |
| 2649539 | svgEquivalen | 24 Found SVG With Text Equivalent |
| 2622995 | htmlContentI | 667 Detected a meta tag that restricts the scale and reflow of a page |
| 2406695 | htmlContentI | 345 Check for Notifications of Change in Content |
| 2271335 | formFieldGrc | 117 Radio Group Has a Fieldset and Legend |
| 2556637 | htmlContentI | 668 Meta viewport tag allows adequate content zoom |
| | linkImgTextA | 81 Missing Alt Attribute on Link Image |
| 1914471 | htmlAriaRole | 453 Detected an ARIA role listbox that needs manual verification |
| | htmlAriaRole | 691 An element with an ARIA role is missing a required attribute |
| | htmlAriaRole | 689 Detected an ARIA attribute that is not appropriate for the element's current role. |
| | formFieldLab | 111 Form Field Label is Empty |
| 1653 | scriptKeybca | 176 Ensure that Users Don't Get Trapped in Content |
| | formFieldLab | 674 Detected a form control with only a placeholder attribute |
| 1439812 | htmlElement | 485 Check Duplicate ID for Possible Accessibility Issues |
| 1300125 | tableSemanti | 46 Detected a Data Table |

FIG. 3C

| | | |
|---|---|---|
| | linkTextConte | 127 Link Text Content Does Not Describe Purpose |
| 6362166 | scriptDeviceC | 602 Detected a Media Query That May Lock Orientation |
| 6209423 | headingSequ | 90 Heading is Out of Order |
| 6097798 | headingLevel | 357 There is a single level 1 heading |
| 5416340 | frameTitleFo | 78 Frame Has a Title |
| 5382851 | videoDescrip | 163 Ensure Videos have user-selected Audio Track |
| 5362851 | videoTextAlt | 140 Check for Alternatives to Time Based Media |
| | linkHrefNone | 422 Anchor Not Functional |
| 5295516 | videoCaption | 29 Check for Captions on Linked Video |
| 5158753 | formContextI | 134 Form Does Not Appear to Have a Submit Button |
| 4765?? | htmlSkipToM | 72 Page Has a Skip to Main Link |
| | formFieldReq | 119 Found Text Indication of Required Fields |
| 4714386 | firstHeaderCl | 353 Priority level of the first heading is high enough |
| | frameTitleNo | 76 Frame Has No Title |
| | formFieldLab | 110 Form Field Has No Label |
| | linkImgTextA | 281 Images Inside a Link Must Contain Alt Text If No Other Text is Found |
| | linkImgTextA | 83 Link Image Alt is the File Name |
| | firstHeaderLe | 354 Initial Page Heading Should Be Level 1 or 2 |
| | htmlAriaRole | 687 An aria-labelledby contains a reference to a target that does not exist. |
| | linkImgTextA | 84 Link Image Alt is Redundant |
| 2849539 | svgEquivalen | 24 Found SVG With Text Equivalent |
| 2622293 | htmlContentI | 667 Detected a meta tag that restricts the scale and reflow of a page |
| 2406695 | htmlContentI | 345 Check for Notifications of Change in Content |
| 2271335 | formFieldGro | 117 Radio Group Has a Fieldset and Legend |
| 2256337 | htmlContentI | 668 Meta viewport tag allows adequate content zoom |
| | linkImgTextA | 81 Missing Alt Attribute on Link Image |
| 1914?? | htmlAriaRole | 453 Detected an ARIA role listbox that needs manual verification |
| | htmlAriaRole | 691 An element with an ARIA role is missing a required attribute |
| | htmlAriaRole | 689 Detected an ARIA attribute that is not appropriate for the element's current role. |
| | formFieldLab | 111 Form Field Label is Empty |
| 1655?? | scriptKeypoa | 176 Ensure that Users Don't Get Trapped in Content |
| | formFieldLab | 674 Detected a form control with only a placeholder attribute |
| 1439612 | htmlElement | 485 Check Duplicate ID for Possible Accessibility Issues |
| 1301625 | tableSemanti | 46 Detected a Data Table |

FIG. 3D

| ID | Category | Count | Description |
|---|---|---|---|
| 1293108 | htmlAriaRole | 695 | Detected an invalid ARIA attribute value. |
| 1158028 | htmlLandmar | 292 | Navigation Regions Should Be Distinctly Labeled |
| 1027101 | formFieldGrc | 114 | Checkbox Group Requires a Description |
| 1004736 | formFieldMe | 589 | Detected an Inappropriate Autofill Field Type for the Given Control |
| 967256 | htmlFocusSei | 131 | Detected a Tabbable Element with an Aria Hidden Attribute |
| 875271 | htmlSkipToM | 71 | Page Has No Skip to Main Link |
| 877728 | fieldsetLegen | 94 | Found a Fieldset with a Legend |
| | selectOptgro | 95 | Select Field with Large Option List has No Optgroup |
| | formFieldMe | 590 | Could Not Find an Autocomplete Attribute |
| | htmlSemantii | 35 | Improper Use of List Tags |
| 738604 | headingLevel | 356 | There are no level 1 headings |
| 720166 | htmlAriaRole | 455 | Detected an ARIA role radio that needs manual verification |
| 693437 | linkTextConti | 419 | Hyperlink Text containing "link" causes AT Redundancy |
| | headingLevel | 355 | There are multiple level 1 headings |
| 658029 | formFieldGrc | 115 | Radio Group Requires a Description |
| 639095 | htmlTextAda | 309 | Check Whether Content Can Be Adapted to Different Styles |
| 638061 | htmlElement | 101 | Foreign Word is Marked with a Language Attribute |
| 619846 | htmlSemantii | 32 | Detected Empty Header |
| 360078 | htmlFocusSei | 79 | Detected Tab Indexes that are Out of Order |
| | buttonTextCc | 679 | Button With Label Containing "button" Causes AT Redundancy |
| 311627 | htmlTitleNotl | 73 | Page Has No Title |
| 307273 | htmlTextAda | 599 | Detected Two-Axis Scrolling on Re-Spacing of Site Contents |
| | htmlSemanti | 37 | Detected Content Best Wrapped in a Heading Tag |
| 276599 | tableSemanti | 662 | Detected a table header that does not reference any table cells |
| | htmlLandmar | 653 | Detected a top-level landmark nested within another landmark |
| 249818 | htmlFocusCo | 234 | Check that the Focus Event Does Not Create a Context Change |
| 59601 | formFieldMe | 584 | Detected an Invalid Hidden Input Autofill |
| 28028 | formFieldMe | 587 | Detected an Invalid Autofill Field Type |
| 25387 | htmlDocume | 50 | Detected Whitespace Used to Style Plaintext |
| 20740 | selectOptgro | 96 | Select Field with Large Option List has an Optgroup |
| | htmlLandmar | 291 | Found Multiple Main Regions |
| 15612 | scriptKeybo¢ | 64 | Keyboard Event Found for Detected Mouse Event |
| 9783? | htmlAriaRole | 696 | Detected an invalid ARIA attribute name. |
| | imgTextAltTc | 4 | Image Alt Text is not concise |

FIG. 3E

| | | |
|---|---|---|
| fieldRequired | 386 | Visually Required Field Missing Required Attribute |
| HtmlSemanti | 33 | Improper Use of Blockquote |
| formFieldsLab | 112 | Form Field Label is a Placeholder |
| htmlLandmar | 653 | Complementary (Aside) Regions Should Be Distinctly Labeled |
| linkDownloa | 749 | Detected a Downloadable Document with No Warning Labels |
| htmlDocume | 51 | Detected Whitespace Used to Control Letter Spacing |
| mapAreaText | 13 | Map Area Has No Alt Text |
| htmlElement | 122 | Element ID is a Duplicate |
| htmlAriaRole | 690 | Detected an ARIA role type that is not appropriate for its element |
| tableSemanti | 660 | Detected a table header with no text |
| videoCaption | 30 | Could Not Find Captions for Video |
| imgTextAltFi | 5 | Image Alt Text is the File Name |
| htmlLandma | 654 | Found Multiple ContentInfo (Footer) Regions |
| htmlSkipToM | 671 | The Skip to Main link is not clearly marked |
| inputImageT | 12 | Input Image Has No Alt Text |
| tableSemanti | 489 | Detected unusual colspans and/or rowspans |
| htmlLandmar | 280 | Found Multiple Banner Regions |
| HtmlSemanti | 658 | Detected an Improper Structuring of DT and DD tags inside a DL Tag |
| formFieldsLab | 673 | Detected a form control with only a title attribute |
| htmlSemanti | 659 | Detected a DT or DD tag outside of a DL tag |
| scriptPaused | 278 | Marquee Tag Found |
| htmlElement | 100 | Document Lang Attribute is Not ISO 639 Standard |
| htmlSitemap | 89 | Website Has a Sitemap |
| emoticonNot | 25 | Could Not Find Text Equivalent for Emoticon |
| htmlSkipToM | 672 | The Skip to Main link contains a reference to a target that does not exist |
| linkDownloa | 750 | Detected a Properly-Labeled Downloadable Document |
| htmlTitlePlac | 74 | Page Title is a Placeholder |
| scriptPaused | 171 | Check if Updating Contents can be Paused |
| scriptExtend | 173 | Check if any Time Limits on the Page can be Extended |
| linkImgTextA | 551 | Hyperlink Image with Alt Text Containing "link" Causes AT Redundancy |
| htmlHoverVi | 511 | Check that Content Visible by Focus or Hover is Accessible |
| audioControl | 166 | Ensure Automatically Playing Sounds have Controls |
| mediaFlashin | 69 | Ensure that Object Does Not Cause Excessive Flashing |
| objectEquiva | 21 | Could Not Find Equivalent for Object |

FIG. 3F

| Count | ID | Description |
|---|---|---|
| 9849 | mapAreaText | 16 Map Area Has Alt Text |
| 6679 | tableSemanti | 43 Detected Summary on Layout Table |
| 5828 | linkImgTextA | 82 Link Image Alt is a Placeholder |
| 5629 | tableSemanti | 661 Detected a "headers" Attribute on a TD Whose Reference Does Not Exist |
| 5108 | embedEquiv | 19 Could Not Find Equivalent for Embed |
| 4654 | htmlAriaRole | 452 Detected an ARIA role combobox that needs manual verification |
| 3678 | inputImageTi | 8 Input Image has No Alt Text |
| 1809 | mediaFlashin | 70 Ensure that Embed Does Not Cause Excessive Flashing |
| 1659 | tableSemanti | 488 Detected a nested table |
| 3480 | imgTextAltPl | 2 Image Alt Text is a Placeholder |
| 3127 | buttonAccess | 684 Elements have unique accesskey attributes |
| 2983 | htmlColorCue | 258 Information Conveyed by more than just Color is Inadequate |
| 2736 | emoticonExc | 26 Excessive Use of Emoticons |
| 2026 | tableSemanti | 44 Detected Caption on Layout Table |
| 1808 | htmlSemanti | 36 Detected Content Best Wrapped in a Blockquote |
| 1660 | fieldsetLegen | 92 Fieldset Legend is Empty |
| 1368 | formFieldLab | 675 Detected a form control with only an aria-describedby attribute. |
| 1278 | htmlHoverVis | 601 Popup Contents are Overlapping the Control That Showed It |
| 901 | buttonAccess | 682 Detected two elements with the same accesskey attribute. |
| 717 | objectEquiva | 22 Found Object With Text Equivalent |
| 665 | formFieldMe | 586 Detected an Invalid Order of Autofill Tokens |
| 655 | mediaLiveCa | 145 Ensure Live Synchronized Media has caption |
| 655 | mediaTransc | 28 Check for Transcript to Linked Media |
| 653 | videoCaption | 31 Found Captions for Video |
| 259 | imgLongDesc | 86 Found Long Desc on an Image |
| 1680 | mapAreaText | 14 Map Area Alt Cannot be Blank |
| 146 | formFieldMe | 585 Detected an Invalid Use of Autofill On/Off |
| 1180 | buttonTextC | 677 Button Text is Not Descriptive |
| 990 | inputImageTi | 9 Input Image Alt Cannot be Blank |
| 35 | buttonAccess | 683 Detected an invalid accesskey attribute. |
| 12 | tableSemanti | 663 Table caption and summary are the same |
| 920 | frameTitlePla | 77 Frame Title is a Placeholder |
| 7 | mediaFlashin | 68 Ensure that Applet Does Not Cause Excessive Flashing |
| 7 | appletEquiva | 18 Found Applet With Text Equivalent |

FIG. 3G

| | | |
|---|---|---|
| 9949 | mapAreaText | 16 Map Area Has Alt Text |
| 6679 | tableSemanti | 43 Detected Summary on Layout Table |
| | linkImgTextA | 82 Link Image Alt is a Placeholder |
| 56.5 | tableSemanti | 661 Detected a "headers" Attribute on a TD Whose Reference Does Not Exist |
| | embedEquiva | 19 Could Not Find Equivalent for Embed |
| 461 | htmlAriaRole | 452 Detected an ARIA role combobox that needs manual verification |
| | inputImageTi | 8 Input Image has No Alt Text |
| 3309 | mediaFlashin | 70 Ensure that Embed Does Not Cause Excessive Flashing |
| | tableSemanti | 488 Detected a nested table |
| | imgTextAltPl | 2 Image Alt Text is a Placeholder |
| 3127 | buttonAccess | 684 Elements have unique accesskey attributes |
| 2983 | htmlColorCor | 258 Information Conveyed by more than just Color is Inadequate |
| 2736 | emoticonExc | 26 Excessive Use of Emoticons |
| 2026 | tableSemanti | 44 Detected Caption on Layout Table |
| 1808 | htmlSemanti | 36 Detected Content Best Wrapped in a Blockquote |
| 1568 | fieldsetLegen | 92 Fieldset Legend is Empty |
| | formFieldLab | 675 Detected a form control with only an aria-describedby attribute. |
| 1278 | htmlHoverVis | 601 Popup Contents are Overlapping the Control That Showed it |
| 901 | buttonAccess | 682 Detected two elements with the same accesskey attribute. |
| 717 | objectEquiva | 22 Found Object With Text Equivalent |
| 665 | formFieldMe | 586 Detected an Invalid Order of Autofill Tokens |
| 655 | mediativeCaj | 145 Ensure Live Synchronized Media has caption |
| 655 | mediaTransci | 28 Check for Transcript to Linked Media |
| 653 | videoCaption | 31 Found Captions for Video |
| 259 | imgLongDesc | 86 Found Long Desc on an Image |
| | mapAreaText | 14 Map Area Alt Cannot be Blank |
| | formFieldMe | 585 Detected an Invalid Use of Autofill On/Off |
| | buttonTextCc | 677 Button Text is Not Descriptive |
| | inputImageTi | 9 Input Image Alt Cannot be Blank |
| | buttonAccess | 683 Detected an invalid accesskey attribute. |
| 12 | tableSemanti | 663 Table caption and summary are the same |
| | frameTitlePl: | 77 Frame Title is a Placeholder |
| 7 | mediaFlashin | 68 Ensure that Applet Does Not Cause Excessive Flashing |
| 7 | appletEquiva | 18 Found Applet With Text Equivalent |
| 1 | embedEquiv: | 20 Found Embed With Text Equivalent |

FIG. 3H

| Remediation Name | Issue | Fix | Trigger |
|---|---|---|---|
| accessKeyOptIn | The accesskey attribute can conflict with user/system shortcuts | Removes accesskey attribute because it can be used to improve accessibility in a complex web application if communicated successfully this must be opted-in at the site-level | If a site is opted-in to this remediation all accesskey occurrences desirably trigger the remediation (although in some embodiments, less than all occurrences may trigger the remediation) |
| addFrameTitleSmartText | An iframe is missing a title and so users of AT would not have context on where they are in the page | Adds a title attribute to the iframe element based on context clues. | If the frame is related to a list of known sources a relevant title is added (e.g., "Twitter Widgets Event Hub" for "pathname") |
| addSmartAltText | An image is missing an alt attribute to inform the AT user what a sighted user would see. | If the image is inside a hyperlink with additional text or the image is likely used as spacing, make the alt attribute empty to indicate it is decorative. If there is a title attribute different from the file name, reuse it as an alt attribute. | If an image is sized similarly to spacer images or is inside a hyperlink with text |
| altDuplicateOptIn | Multiple adjacent images should not have the same alt attribute | Appends a counter to the alt attributes of adjacent images with duplicate alt attributes | If an adjacent image has duplicated alt attribute |
| altLong | An alt attribute should not be long (i.e., over 100 characters) | Shortens a long alt attribute and appends an ellipsis while preserving the initial alt attribute as an aria-label | If an alt attribute is longer than 100 characters |
| altRedundant | alt attribute text is redundant compared to visible text nearby. | If the alt attribute is redundant, it is set to empty to mark it as decorative. | Looks at text before and after the image to see if the alt text is repeated, spaced no further than 14 characters away. |
| anchorShouldBeButtonOptIn | Anchor tags should not have an onclick event or contain JavaScript in the href attribute | Change the anchor tag's role to a button and update keypress events so that Space triggers the event instead of Enter | Anchor tags have an onclick event or contain JavaScript in the href attribute |
| ariaChildlessMenu | Tags should not have a role of menu when there are no menu children | Remove role="menu" when that element has no children elements with role="menuitem", role="menuitemcheckbox", or role="menuitemradio" | Element has a role of menu without relevant children elements. |
| automaticSingleListItem | A list should not have just a single item | If a single list item lacks a role, this remediation sets the role of the ul, ol and li elements to presentation | List with only one child list item |
| blinkOptIn | Elements should not blink | Replaces a blink element with a span. Replaces an element with text-decoration style equal to blink to text-decoration none. | Blink element or an element with text-decoration equal to blink |

FIG. 6A

| Remediation Name | Issue | Fix | Trigger |
|---|---|---|---|
| buttonTextContentNotFoundOptin | Buttons should have a label | Checks common locations around a button element with no text content for a label that can be applied to it. These sources may include:<br>* Text immediately following the button.<br>* The name of an icon the button contains.<br>* The presence of a common class name for the button describing what it does.<br>* Text input fields that are proximate to the button.<br>* A form's name that the button belongs to. If a good candidate for a button label is found, then it will be applied as the button's aria-label attribute. | Button without a label that has relevant context nearby. |
| deviceIndependentEvent | Mouse-only events are not accessible to keyboard-only users | Copies inline mouse events over to related keyboard events when there is not already an inline keyboard event. These new mine functions are wrapped in a try-catch that will log new errors thrown by the copied functions. | Mouse-events on an element with no corresponding keyboard events |
| fieldsetLegendEmpty | If a legend element exists, then it must not be empty | Set's aria-hidden to true if completely empty and adds role presentation if there is no text content | Fieldset legend without text content |
| firstHeaderLevelNot1or2 | First heading should be an H1 or H2 tag | set the first heading aria-level to 1 | First heading on a page is not H1 or H2. Site with Alpaca JavaScript library has a radio button group that is not properly labelled. |
| formFieldGroupRadioGroupNotFoundAlpaca | Radio button groups should be labelled | Adds aria-describedby and id attributes to ensure the label for the radio button group is properly associated with the group | |
| formFieldGroupRadioGroupNotFoundOptin | Radio button groups should be labelled | Detects surrounding element that contains a relevant label and adds role radiogroup and aria-labelledby attribute to associate the relevant label | Fieldset with multiple radio buttons missing radiogroup or associated label |
| formFieldLabelOptin | Form field doesn't have a valid label | 1. Check if there is a nearby sibling orphaned label that had some text. If so - mark it as form fields label using aria-labelledby attribute<br>2. Check if form field has some attributes that can be used as a label (placeholder, title). If so - use that value as aria-label attribute<br>3. Check if there is an element nearby that could potentially be a label. If so - mark it as form fields label using aria-labelledby attribute. his is mostly designed to fix a situation where original site developer used non-semantic markup to create a label (so a label visually exists, but assistive technologies don't see it) | Form field missing a label except for inputs with type "submit", "button" or "reset" |

FIG. 6B

| Remediation Name | Issue | Fix | Trigger |
|---|---|---|---|
| | | 4. Check if element has a name. If so - use that name as a value for aria-label attribute. This is a last resort step. | |
| formFieldLabelOrphan | Labels should be associated to target elements with an attribute or through nesting | Attempts to find a field to associate an 'orphan' label element to. This auto-remediation takes one of several approaches to resolving this situation. They are evaluated in this order until a solution is found.<br>1. Remediate a "fake" form field control, if a label is associated with a form field that is hidden from view, this remediation will make it focusable and accessible while still keeping it out of view, visually since the label itself is acting as the form field control, mapped to the field element in the DOM.<br>2. Attempt to find an 'orphan' form field; if there is a field element that is proximate to the 'orphan' label, then they will be explicitly associated with each other by use of the labels for attribute. An ID will be generated for the 'orphan' form field if it does not already have one.<br>3. Mark the 'orphan' label element with role="presentation". | Label does not have targeted element |
| formFieldMetadataBadAnchor | Hidden inputs should not allow autocomplete | Removes autocomplete attribute from any hidden inputs. | Input with type hidden and an autocomplete attribute |
| formFieldMetadataNotFoundOptIn | Inputs that could be autocomplete are missing the autocomplete attribute | Inspects form fields name attribute and compares that to a list of known autocomplete fields. An autocomplete attribute is added except for the following cases:<br>• Form fields related to addresses, because:<br>- There is a multitude of ways you can structure an address form, trying to guess the correct autocomplete value would be expensive (in terms of performance) and would have a high risk of breaking things<br>- We would also have to take into account different localities and administrative levels, which complicates this even further<br>- Browsers are already really good in auto filling your address forms, even if the fields don't have autocomplete attributes set | Inputs that could be autocomplete and are missing the autocomplete attribute |

FIG. 6C

| Remediation Name | Issue | Fix | Trigger |
|---|---|---|---|
| frameTitleDuplicate | Multiple frame elements have the same title | • Form fields related to credit cards, because: - Any weird behavior during checkout process might scare off users, and we don't want to risk that - Browsers are already really good in auto filling your credit card forms, even if the fields don't have autocomplete attributes set - Input elements that are related to country, because - In most cases this should be handled using a <select> tag. If <input> tag is used, it is very likely that there is some kind of JS-based dropdown (and logic) attached and we don't want to interfere with that - <select> tags related to countries will still be corrected<br>• Add a count value to the existing duplicate titles to orient the AT user. | Duplicate iframe titles. |
| headingEmpty | A heading has no text content | Announce to the AT user that heading appears to be empty and set the role to presentation. | Heading with no text content |
| headingLevelOneCountZero | There should be a heading with level 1 | Adds a heading of level 1 with the page title that will announce to AT users, but is not displayed. | No heading with level 1 |
| headingSequenceOutOfOrder | Heading levels should not jump levels up | It will first update the out of order header to properly follow the level of the header preceding it. This is accomplished by adjusting the aria-level attribute of the element to be one increment greater than the previous heading's level. Afterwards, it will check to see if the header following it has been made to be out of order due to the change that was made. The fix will continue to be applied until the next heading element is in proper order or the last heading element has been reached. | Heading that increments more than one from the preceding heading level |
| htmlAccessibleNameMismatchOrOptIn | Mismatch between elements text content and elements accessible name | Removes an attribute that provides accessible name to the element (aria-label, aria-labelledby).<br>Exceptions:<br>Because ARIA attributes are usually placed on purpose by site original developer, this remediation is limited to only link and button elements. Removing aria-label from other HTML elements comes with too much risk of decreasing accessibility. Furthermore, this remediation will NOT remove accessible name even from <a> or <button> elements, if their text content is too short to be considered valid. | There is a mismatch between elements text content and elements accessible name |

FIG. 6D

| Remediation Name | Issue | Fix | Trigger |
|---|---|---|---|
| htmlAriaRolesAttributeNotAppropriate | Element with role attribute has an inappropriate aria attribute | This remediation will attempt to either substitute an attribute that is closest (via levenshtein distance) or remove those attributes that are invalid (meaning they do not exist in the dictionary of aria attributes) and not global or part of a framework. | Element with role attribute and an inappropriate aria attribute |
| htmlAriaRolesInvalidRole | Element with a role that is not in the list of known roles | Attempts to generate a valid role based on child/parent role requirements, and levenshtein distance. Finally if a valid role cannot be found the remediation will remove the role attribute from the element. | Element with a role that is not in the list of known roles |
| htmlAriaRolesMissingParent | Element with an ARIA role is missing a required parent role | It will either add a parent role, or remove one based off of the following criteria:<br>1. Add a role to the parent based off of of the child aria roles, will only add if more children contain that specific role.<br>2. Remove role if there are multiple possible parent roles, will bail out if it cannot determine a role that suits all or most children elements.<br><br>Exceptions:<br>• Some ARIA roles may have multiple valid parent roles, such as [role="row"]. If this is the case, this remediation will remove all children roles.<br>• Remediation will remove children ARIA roles if no other siblings contain that role.<br>• Will sometimes insert correct context of nesting of ARIA roles, such as a list item within a list item. | Element with an ARIA role that is missing a required parent role |
| htmlFocusSequenceAriaHiddenTabbableOptin | An element has an aria-hidden="true" attribute, but is displayed on the screen and is possible to focus using keyboard | 1. If element has a role="presentation" attribute, it marks element as not reachable via keyboard (tabindex="-1").<br>2. In other cases it removes aria-hidden from an element. | An element has an aria-hidden="true" attribute, but is displayed on the screen and is possible to focus using keyboard |
| htmlLandmarksMultipleNavsOptin | There should not be multiple nav elements in a single section | If a nav lives inside of a clear content section (header, footer, section, etc.), labels the nav with an aria-label = "section". If there are multiple navs in the same section, increment the value (e.g. header #1). | There are multiple nav elements in a single section |
| htmlSkipToMainOptin | There should be a skip to content link to assist AT users in getting to the main content of a page. | adds a "skip to content" link that anchors to the most likely relevant "content" section. It chooses that, if a header or nav exists on the page, it chooses the next valid sibling (must be a section, article, or div as the target of the anchor). If | There is no skip to content link |

FIG. 6E

| Remediation Name | Issue | Fix | Trigger |
|---|---|---|---|
| imgTextAltRedundant | Text describing an element appears in both the neighboring text content and attributes on an image. | none of those are true, then it looks for an h1 and makes its parent the target of the anchor. Note: If the target already has an ID, the link will use the existing ID as an href. If the text surrounding the image is already present in the title, then the title attribute is removed. If the descriptive text is found in the alt attribute, then it is set to an empty string. | Redundant text neighboring an image. |
| labelEmpty | Labels should not be empty | Checks the relevant input looking at the for attribute then at a child input if it exists) for either a placeholder, title, or name to use as label content in the form of a visually-hidden span that announces to AT users. | A label is empty |
| labelFromSibling | Labels should not be empty | Looks at placeholder, title, and name attributes on neighboring inputs for a potential label | A label is empty and there is a relevant input neighboring the label |
| labelMultiple | Inputs should not have multiple associated labels | Removes a for attribute causing multiple labels to be applied to the same input | Input with multiple associated labels |
| labelTitle | Inputs should have a label | Takes the input element's title attribute and creates a visually-hidden label that will announce to AT users. | Input has no label but it has a title attribute. |
| linkAdjacentSameHREFOptin | Adjacent links to the same target cause confusion | Merges adjacent anchor elements that share an href attribute | Links with the same href attribute are either immediate sibling elements, or they are "leaves" on neighboring branches that share a common ancestor and encompass no other elements or text nodes. |
| linkEmptyOptin | Links should not be empty | Hides the link from Assistive Technology. SR implications are that the link will not be tab-able or announce-able by a SR if empty. If there is not any height or width, the screen reader will not attempt to read the link. Appends a SR-only span to an empty link if there is not one already. | A link with no text content |
| linkHrefNoneOptin | Links should have an href | Changes the anchor element to a span and copy over the remaining attributes. | Anchor doesn't have an href, name, id, tabindex, or role |
| linkimgTextAltBlankOptin | Links with an image should at least have an alt attribute | Attempts to generate an accurate description based on where the user will be taken after interacting with the link. It also considers if the link is internal or external. | A link image (with no text content) that is marked as decorative (has alt attribute set to empty string) |

FIG. 6F

| Remediation Name | Issue | Fix | Trigger |
|---|---|---|---|
| linkingTextAltNotFoundOptin | Users should be informed about the target of a link | Exceptions: This remediation only works for anchor elements that have href attribute. It ignores: <ul><li><area> elements, as they only refer to part of the image and should have alt attribute of their own (if they don't - that is a separate problem)</li><li>elements with role="link" as there is no reliable way of telling what will happen when user clicks the link without analyzing the code</li></ul> 1. Check if link has some text content. If so, mark image as decorative (alt=""). This assumes that the link text content is enough description and adding any alternative text to the image would most likely result in unnecessary repetition by screen reader. 2. If link does not have a text content - generate link description based on href attribute and use it as image's alternative text | A link image (with no text content) without an alt attribute |
| linkSamePageAnchorInvalidOptin | Internal anchors that point to non-existent parts of the page | It ignores anchors that have one of the following attributes: name, id, tabindex, role since their presence suggest that anchor has some additional functionality. For anchors that have invalid internal href and don't have any of the above attributes, it sets role attribute to presentation to inform assistive technologies that this element doesn't have any special interactions assigned to it. | Internal anchor that points to a non-existent part of the page without name, id, tabindex or role attributes |
| linkTextContentNotDescriptiveOptin | Link with non-descriptive text (e.g., "Read more", "Link", etc.) | Generates link description from a href attribute and uses it to attach aria description to the link (using aria-describedby). This way we provide AT users with some more context, but we don't change the original markup in any significant way. Exceptions: This remediation does only work on <a> tags. It ignores elements with role="link" as there is no reliable way of knowing what will happen after user interacts with such link | Link with non-descriptive text (e.g., "Read more", "Link", etc.) |
| linkTextContentRedundantOptin | Link where the title and text content match | Removes the redundant title attribute | Link with a redundant title attribute |
| marqueeOptin | Marquee elements are deprecated | Replaces marquee tag with a span tag | Marquee element is found |

FIG. 6G

DISTRIBUTED SYSTEMS AND METHODS FOR FACILITATING WEBSITE REMEDIATION AND PROMOTING ASSISTIVE TECHNOLOGIES AND DETECTING COMPLIANCE ISSUES

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application claims the benefit under 35 U.S.C. 119(e) to U.S. Provisional Application No. 63/093,486, entitled "Distributed Systems and Methods for Facilitating Website Remediation and Promoting Assistive Technologies and Detecting Compliance Issues," filed on Oct. 19, 2020, and to U.S. Provisional Application No. 63/112,307, entitled "Systems, Devices, and Methods for Facilitating Website Remediation and Promoting Assistive Technologies," filed on Nov. 11, 2020, and the entirety of both provisional applications are hereby incorporated by reference herein.

BACKGROUND

Field

This disclosure relates generally to systems and methods for facilitating website remediation and promoting assistive technologies. In some embodiments, the systems, methods, and devices disclosed herein relate generally to distributed systems and methods for facilitating website remediation, promoting assistive technologies, and detecting and tracking compliance issues. More specifically, the systems can involve techniques for allowing visitors of a website to participate in accessibility testing in order to enhance the user experience for users having diverse abilities.

BACKGROUND

Various forms of assistive technologies, such as screen reader applications, voice command devices, and the like, have proven useful to visually impaired, color impaired, low vision, dyslexic, illiterate, and learning-disabled individuals, particularly with respect to computer accessibility.

Screen readers, for example, are used to translate textual and graphical information displayed on a screen and re-present it to the user using synthesized speech, sound icons, and/or a refreshable Braille output device. Screen readers may be incorporated into the operating system as native applications or may be packaged as separate commercial products.

Presently known screen readers, voice command systems, and other assistive technologies are disadvantageous, however, because of their limited ability to remediate sites which do not comply with industry recognized best practices, such as the Web Content Accessibility Guidelines (WCAG), for example, WCAG 2.0, 2.1, 2.2, or the like and any future versions, Accessible Rich Internet Applications (WAI-ARIA), Authoring Tool Accessibility Guidelines (ATAG), Section 508 Standards & Technical Requirements, and other existing and forthcoming national and international standards and guidelines.

SUMMARY

The disclosure herein provides various embodiments of systems, methods, and devices for remediation of websites and web-based resources, in order to facilitate enhanced accessibility. In some embodiments, remediation techniques disclosed herein are automatically or at least partially automatically implemented.

Various embodiments herein relate to distributed systems and methods for accessibility testing of websites and web-based resources in order to evaluate their level of compliance with web accessibility standards. For instance, a website may have accessibility test code that executes in the browsers of users visiting the website. The accessibility test code may cause the browser to perform a number of accessibility tests and send the test results to a server, in some embodiments, a remote server or a local server or the like, where accessibility test results can be collected and analyzed, in some embodiments, the systems disclosed herein can automatically and/or manually and/or dynamically and/or in substantially real-time analyze the accessibility test results, in order to discover actionable insights and/or to generate reports and/or to create remediation scripts, in some embodiments, manually and/or automatically and/or dynamically and/or in substantially real-time, directed to improving the accessibility of the website. In some embodiments described herein, the systems, devices, and methods are configured to bring websites and other user interfaces into compliance with applicable standards to thereby facilitate enhanced accessibility. Various embodiments herein allow, for example, distributed accessibility testing of websites and/or web-based resources, in some embodiments, by utilizing one or more user computing systems in lieu of or in addition to a cloud-based or other computing server system, in order to evaluate their level of compliance with web accessibility standards. In some embodiments, a web page can comprise code configured to cause a web browser operating on a user device to contact a remote server. In some embodiments, the code operating in the web browser sends a request to the remote server. In some embodiments, the request causes the remote server to access a database or other data store. As used herein, the terms database, data store or storage medium are broad terms that can refer to relational databases, flat files, file structures, text files, or the like. In some embodiments, the accessing of the data store comprises accessing testing code. In some embodiments, the remote server is configured to transmit the testing code over an electronic network to the web browser. In some embodiments, the web browser is configured to execute the testing code to perform accessibility testing on the page or pages of the website. In some embodiments, the testing code is configured to modify the HTML and/or DOM to incorporate accessibility testing code into the HTML and/or DOM. In some embodiments, the web browser is configured to execute to the accessibility testing code incorporated in the HTML and/or DOM, for example, when rendering the web page and/or reloading the web page. In some embodiments, the systems and methods described herein can be configured to use the information from the test results to generate remediate code for remediating the website so that the website complies with compliance rules, and/or industry recognized best practices, such as the Web Content Accessibility Guidelines (WCAG), Accessible Rich Internet Applications (WAI-ARIA), Authoring Tool Accessibility Guidelines (ATAG), Section 508 Standards & Technical Requirements, and other existing and forthcoming national and international standards and guidelines and the like.

In some embodiments, described herein are systems, devices, or methods for programmatic creation and deployment of remediations to non-compliant web pages or user interfaces, the system comprising: one or more remediation code data storage mediums configured to store a plurality of remediation code. In some embodiments, the systems can comprise storage medium for storing JavaScript code configured for client-side interactivity with one or more web sites or user interfaces comprising a hypertext markup language (HTML), document object model (DOM), wherein the DOM comprises one or more nodes, the one or more nodes organized into a DOM tree structure; one or more computer readable storage devices configured to store a plurality of computer executable instructions. In some embodiments, the system can comprise one or more hardware computer processors in communication with the one or more computer readable storage devices and configured to execute the plurality of computer executable instructions in order to cause the system to: receive, from a user device, a request to access a web page associated with the one or more web sites or user interfaces; dynamically crawl, using a configuration file, the one or more web sites or user interfaces to generate a list of uniform resource locators (URLs) to be included as part of a compliance assessment of the one or more web sites or user interfaces; evaluate each of the one or more web pages associated with the generated list of URLs to identify one or more compliance issues, wherein the evaluation comprises loading each of the one or more web pages, for example, in a headless browser, applying the JavaScript code base, and executing a series of compliance tests; access, from the one or more remediation code databases, one or more remediation code blocks, each remediation code block corresponding to an identified compliance issue; programmatically apply the one or more remediation code blocks to the corresponding identified one or more compliance issues; and transmit, to the user device, for display, on the user device, the requested web page to which the one or more remediation code blocks have been applied; wherein application of the one or more remediation code blocks manipulates the DOM, causing a correction or enhancement of the one or more web sites or user interfaces upon loading and rendering.

In some embodiments, described herein are systems, devices, or methods, wherein the crawl of the one or more web sites or user interfaces is based on one or more scanning parameters, wherein the scanning parameters are manually or automatically configurable, and wherein the scanning parameters comprise at least one of maximum crawl time, level of recursion, percentage of pages catalogued, configurable threshold, and page depth.

In some embodiments, described herein are systems, devices, or methods, wherein the system is further caused to perform a link extraction process, wherein the link extraction process detects one or more URLs within the DOM to be added to the generated list of URLs.

In some embodiments, described herein are systems, devices, or methods, wherein the compliance tests assess one or more testable success criteria as supported by Web Content Accessibility Guidelines (WCAG).

In some embodiments, described herein are systems, devices, or methods, wherein the compliance tests are automatically or manually altered based on evolving web accessibility standards.

In some embodiments, described herein are systems, devices, or methods, wherein the compliance tests determine whether or not one or more specific use-cases are accommodated within the hypertext markup language (HTML) document object model (DOM).

In some embodiments, described herein are systems, devices, or methods for identifying structural patterns across a plurality of web pages and determining a set of remediations that can be applied to the plurality of web pages, the method comprising: identifying, by a computer system, within a first document object model (DOM) corresponding to a first web page of the plurality of web pages, a first hierarchal structure, wherein the first web page comprises a plurality of elements, wherein each hierarchy of the first hierarchal structure comprises one or more elements having commonalities in placement, class, or appearance; evaluating, by the computer system, the first web page to identify one or more compliance issues, wherein the evaluation comprises loading the first web page, applying an JavaScript code base, and executing a series of compliance tests; determining, by the computer system, one or more remediations to resolve the one or more identified compliance issues of the first web page; storing, by the computer system, the one or more remediations in a remediation database; identifying, by the computer system, within a second document object model (DOM) corresponding to a second web page of the plurality of web pages, a second hierarchal structure, wherein the second hierarchal structure comprises a substantially identical structural pattern to the first hierarchal structure; and applying, by the computer system, the one or more remediations to the second web page, wherein the computer system comprises a computer processor and an electronic storage medium.

In some embodiments, described herein are systems, devices, or methods for website accessibility monitoring, the system comprising: one or more analytics database engines configured to store one or more page load events received from a plurality of websites, wherein each of the plurality of websites comprises tracking code that activates a page load event upon a user loading the website, and wherein the page load event comprises a uniform resource locator (URL) and the date and time of the loading of the website; a data accessibility scanning and testing engine configured to scan one or more of the plurality of websites and perform one or more accessibility tests; one or more testing database engines configured to store testing data, wherein the testing data is related to the one or more accessibility tests; one or more computer readable storage devices configured to store a plurality of computer executable instructions; and one or more hardware computer processors in communication with the one or more computer readable storage devices and configured to execute the plurality of computer executable instructions in order to cause the system to: request, from the one or more analytics database engine, one or more URLs of the one or more stored page load events; load, by the data accessibility scanning and testing engine, for example, using a headless browser, the one or more URLs; perform the one or more accessibility tests on each of the one or more URLs to generate testing data; store, in the one or more testing database engines, the testing data corresponding to each of the one or more URLs; extract, from the one or more testing database engines, metadata corresponding to the testing data corresponding to each of the one or more URLs; and generate a report of the testing data and/or metadata, wherein the report prioritizes one or more results of the one or more accessibility tests.

In some embodiments, described herein are systems, devices, or methods, wherein the one or more results of the one or more accessibility tests are prioritized based at least in part on the severity of the one or more results on an accessibility metric, a number of web pages on which the one or more results occurs, and a number of times each web page has been accessed.

In some embodiments, described herein are systems, devices, or methods, wherein the voice input device is a secondary device, wherein the secondary device is paired remotely to one or more of the voice-enabled kiosk, browser, or point-of-sale user interface system.

In some embodiments, described herein are systems, devices, and methods for distributed compliance remediation analysis of a web page. In some embodiments, a remote computing system comprises: one or more computer data stores configured to store a plurality of computer executable instructions and one or more hardware computer processors in communication with the one or more computer data stores and configured to execute the plurality of computer executable instructions in order to cause the system to: receive through an electronic communications network a request for a compliance test script for applying to the web page, the request generated by a user computing system; transmit through the electronic communications network to the user computing system the compliance test script for applying to the web page loaded by the user computing system, the compliance test script configured for execution within a browser operating on the user computing system, the compliance test script further configured to enable the user computing system to detect one or more compliance issues in the web page loaded by the user computing system and generate a non-compliance report of the detected one or more compliance issues in the web page for transmission to the remote computing system, the compliance test script comprising one or more compliance tests, the test script configured to enable the user computing system to detect one or more compliance issues in order to implement a distributed system for detecting compliance issues in the web page; receive through the electronic communications network from the user computing system the generated non-compliance report; generate a remediation script for the web page loaded by the user computing system based on the received non-compliance report, the generated remediation script comprising one or more remediations; store the generated remediation script in a remediation data store for future remediation of the web page loaded by the user; and transmit through the electronic communications network the generated remediation script to the user computing system, the generated remediation script configured to be processed by the browser operating on the user computing system to enable the browser to remediate at least one of the detected one or more compliance issues in the web page loaded by the user computing system.

In some embodiments, described herein are systems, devices, and methods for distributed compliance remediation analysis of a web page. In some embodiments, a user computing system comprises: one or more computer data stores configured to store a plurality of computer executable instructions and one or more hardware computer processors in communication with the one or more computer data stores and configured to execute the plurality of computer executable instructions in order to cause the system to: transmit through an electronic communications network to a computing system a request for a compliance test script for applying to the web page; receive through the electronic communications network from the computing system the compliance test script for applying to the web page loaded by the user computing system, the compliance test script configured for execution within a browser operating on the user computing system, the compliance test script further configured to enable the user computing system to detect one or more compliance issues in the web page loaded by the user computing system and generate a non-compliance report of the detected one or more compliance issues in the web page for transmission to the computing system, the compliance test script comprising one or more compliance tests; execute the received compliance test script comprising instructions to: detect one or more compliance issues in the web page loaded by the user computer system; and generate the non-compliance report based on the detected one or more compliance issues; transmit through the electronic communications network to the computing system the generated non-compliance report; receive through the electronic communications network from the computing system a generated remediation script for the web page loaded by the user computer system, the remediation script generated based on the transmitted non-compliance report, the generated remediation script configured to be processed by the browser operating on the user computing system to enable the browser to remediate at least one of the detected one or more compliance issues in the web page, the generated remediation script comprising one or more remediations; and execute the received generated remediation script.

In some embodiments, described herein are systems, devices, and methods for distributed compliance remediation analysis of a web page. In some embodiments, a remote computing system comprises: one or more computer data stores configured to store a plurality of computer executable instructions and one or more hardware computer processors in communication with the one or more computer data stores and configured to execute the plurality of computer executable instructions in order to cause the system to: receive through an electronic communications network a request for a compliance test script for applying to the web page and a uniform resource locator (URL) for the web page, the request generated by a user computing system; transmit through the electronic communications network to the user computing system the compliance test script for applying to the web page loaded by the user computing system, the compliance test script configured for execution within a browser operating on the user computing system, the compliance test script further configured to enable the user computing system to detect one or more compliance issues in the web page loaded by the user computing system and generate a non-compliance report of the detected one or more compliance issues in the web page for transmission to the remote computing system, the compliance test script comprising one or more compliance tests, the test script configured to enable the user computing system to detect one or more compliance issues in order to implement a distributed system for detecting compliance issues in the web page; transmit through the electronic communications network to the user computing system a remediation script for applying to the web page, the remediation script configured to be processed by the browser operating on the user computing system to enable the browser to remediate at least one compliance issue in the web page loaded by the user computing system; receive through the electronic communications network from the user computing system the generated non-compliance report; and store the received generated non-compliance report.

In some embodiments, described herein are systems, devices, and methods for distributed compliance remediation analysis of a web page. In some embodiments, a user computing system comprises: one or more computer data stores configured to store a plurality of computer executable instructions and one or more hardware computer processors in communication with the one or more computer data stores and configured to execute the plurality of computer executable instructions in order to cause the system to: transmit through an electronic communications network to a remote computing system a request for a compliance test script for applying to the web page; receive through the electronic communications network from the remote computing system the compliance test script for applying to the web page loaded by the user computing system, the compliance test script configured for execution within a browser operating on the user computing system, the compliance test script further configured to enable the user computing system to detect one or more compliance issues in the web page loaded by the user computing system and generate a non-compliance report of the detected one or more compliance issues in the web page for transmission to the remote computing system, the compliance test script comprising one or more compliance tests; receive from the remote computing system through the electronic communications network a remediation script for applying to the web page loaded by the user computing system, the remediation script configured to be processed by the browser operating on the user computing system to enable the browser to remediate at least one compliance issue in the web page loaded by the user computing system; execute within the browser the received remediation script comprising instructions to: detect one or more compliance issues in the web page loaded by the user computing system; modify the web page to remediate the one or more detected compliance issues; execute within the browser the received compliance test script in order to enable a distributed system for detecting compliance issues in the web page, the received compliance test script comprising instructions to: detect one or more compliance issues in the web page loaded by the user computer system; and generate the non-compliance report based on the detected one or more compliance issues; and transmit through the electronic communications network to the remote computing system the generated non-compliance report.

In some embodiments, the compliance test script is further configured to re-run the one or more compliance tests of the compliance test script in response to a change in the web page.

In some embodiments, the compliance test script is further configured re-run the one or more compliance tests of the compliance test script in response to the executing a first and/or second received generated remediation script. In some embodiments, the compliance test script is further configured to generate a second compliance test report, the second compliance test report comprising an indicator for alerting an administrator of one or more problematic compliance issues requiring manual remediation fixes.

In some embodiments, the compliance test script may be configured to prioritize one or more compliance tests based at least in part on a uniform resource locator of the web page.

In some embodiments, the compliance test script may be configured to abort one or more compliance tests after a maximum period of time.

In some embodiments, the compliance test report may comprise a uniform resource locator of the web page loaded by the user computing system.

In some embodiments, the compliance test may be further configured to run when the browser is in a substantially idle state. For example, in some embodiments, the compliance test may run when the user expands a collapsed section, loads additional content, or the like.

In some embodiments, the remediation script may be configured to stop executing after a maximum period of time.

In some embodiments, the remediation script may comprise one or more remediations that are specific to a website to which the web page belongs.

Moreover, while various embodiments are described as using AE JavaScript, it is understood that any approach which augments existing code to remediate compliance issues and integrate assistive technologies to enhance the user experience is contemplated by the embodiments described herein. In addition, the various software modules described herein may be implemented in a variety of software languages and/or database structures.

For purposes of this summary, certain aspects, advantages, and novel features of the invention are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

All of these embodiments are intended to be within the scope of the invention herein disclosed. These and other embodiments will become readily apparent to those skilled in the art from the following detailed description having reference to the attached figures, the invention not being limited to any particular disclosed embodiment(s).

BRIEF DESCRIPTION OF THE DRAWINGS

The features, aspects, and advantages of the embodiments of the inventions are described in detail below with reference to the drawings of various embodiments, which are intended to illustrate and not to limit the inventions. The drawings comprise the following figures in which:

FIGS. 3A-3H illustrate example accessibility tests that can be performed on a user device, according to some embodiments of the present disclosure.

FIGS. 6A-6G illustrate example remediations that can be performed on a user device, according to some embodiments of the present disclosure.

DETAILED DESCRIPTION

Figure 1:
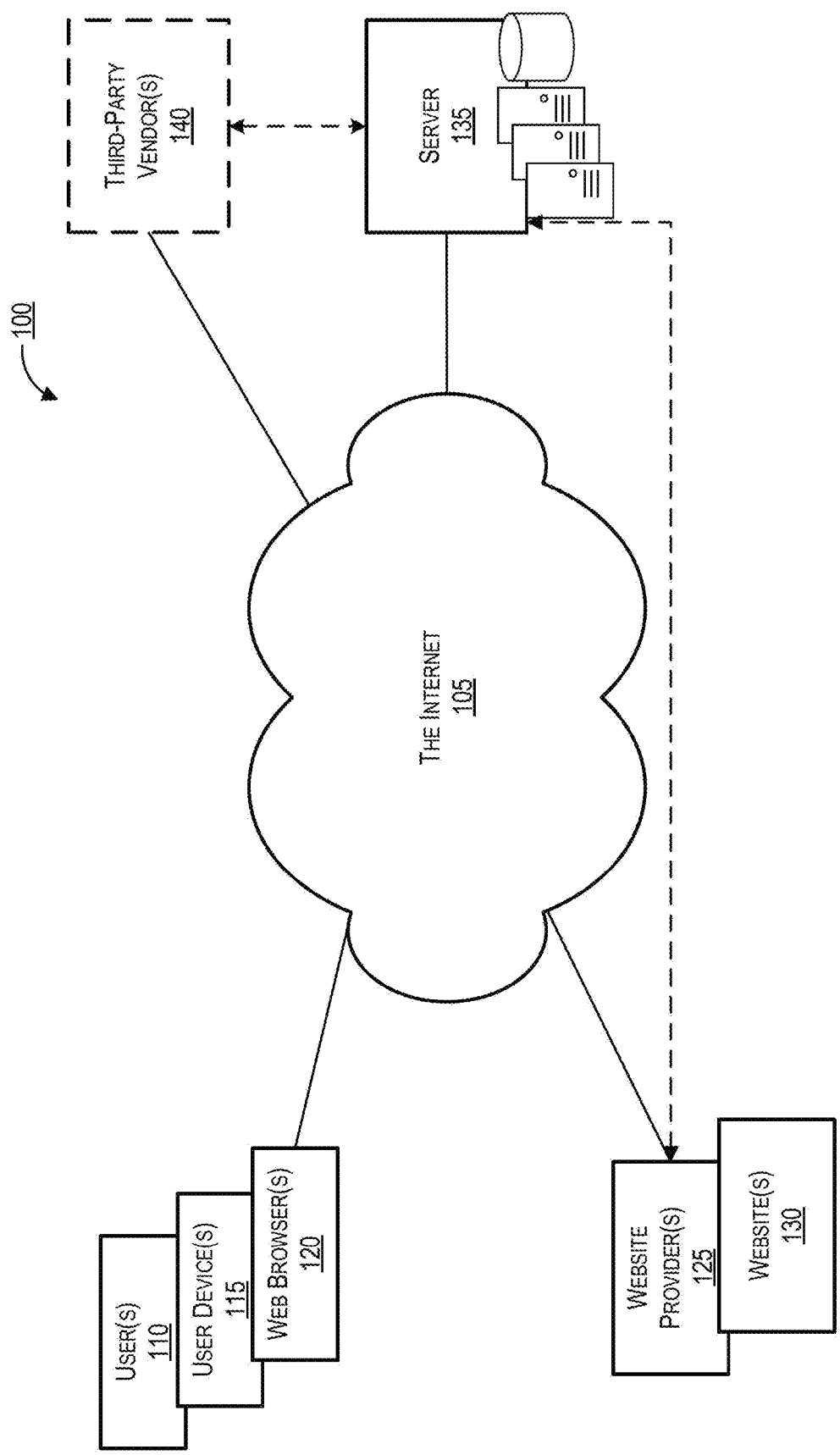
FIG. 1 is a block diagram illustrating an example system, according to some embodiments of the present disclosure.

The following detailed description is merely exemplary in nature and is not intended to limit the embodiments or the application and uses of the embodiments described herein. Furthermore, there is no intention to be bound by any theory presented in the preceding background or the following detailed description.

Although several embodiments, examples, and illustrations are disclosed below, it will be understood by those of ordinary skill in the art that the inventions described herein extend beyond the specifically disclosed embodiments, examples, and illustrations and includes other uses of the inventions and obvious modifications and equivalents thereof. Embodiments of the inventions are described with reference to the accompanying figures, wherein like numerals refer to like elements throughout. The terminology used in the description presented herein is not intended to be interpreted in any limited or restrictive manner simply because it is being used in conjunction with a detailed description of some specific embodiments of the inventions. In addition, embodiments of the inventions can comprise several novel features and no single feature is solely responsible for its desirable attributes or is essential to practicing the inventions herein described.

Various embodiments described herein relate to systems, devices, and methods for bringing websites and other user interfaces into compliance with applicable standards to thereby facilitate enhanced accessibility. Various embodiments herein allow, for example, distributed accessibility testing of websites and web-based resources in order to evaluate their level of compliance with web accessibility standards. For instance, a website may have accessibility test code that executes in the browsers of users visiting the website. The accessibility test code may cause the browser to perform a number of accessibility tests and send the test results to a server where accessibility test results can be collected and analyzed in order to discover actionable insights or generate reports directed to improving the accessibility of the website. This information can be used to remediate the website so that it complies with industry recognized best practices, such as the Web Content Accessibility Guidelines (WCAG), Accessible Rich Internet Applications (WAI-ARIA), Authoring Tool Accessibility Guidelines (ATAG), Section 508 Standards & Technical Requirements, and other existing and forthcoming national and international standards and guidelines. While various embodiments are presented with specific reference to WAI-ARIA, this is not intended to be limiting. It will be understood that additional standards and practices may be developed in the future and that the specific names of attributes may change over time or new attributes may be added.

Various embodiments described herein allow, for example, detection of one or more accessibility issues and remediation of such detected issues, enabling enhanced accessibility. In some embodiments, the detection of and/or the remediation of at least some of the issues is completely or at least partially automated. In some embodiments, the detection of and/or the remediation of at least some of the issues is configured to require and/or optionally incorporate at least some user interaction.

In various embodiments, bringing websites and user interfaces into compliance, such that accessibility functions can be added, is accomplished by scanning websites and programmatically detecting issues in a robust and efficient manner. This can be done as described in greater detail below. In some embodiments, the system is configured to conduct one or more accessibility tests or compliance tests. In some embodiments, the tests conducted by the system can be focused on the testable success criteria as supported by the Web Content Accessibility Guidelines (WCAG) 2.0/2.1/2.2 or other web accessibility standards. In some embodiments, the tests conducted by the system can be automatically or manually altered based on evolving web accessibility standards. In some embodiments, the system may conduct hundreds of tests to understand, for example, whether or not specific use-cases (for example, disability use-cases) are accommodated (accounted for) within the code or the way in which the elements are presented in the DOM. In some embodiments, not all accessibility element criteria may be programmatically testable and in the case of those that are not, the system may flag certain issues for additional review by human testers.

More particularly, web pages and other electronic documents, and/or documents otherwise accessible through a graphical user interface (GUI) may have an established reading order embodied in the DOM, including visual elements that are tagged with alternative text descriptions. The nodes of the document may be organized in a tree structure, called the DOM tree. In some embodiments, when an HTML page is rendered, a browser may download the HTML into local memory and may automatically parse it before, during, or after displaying the page.

The W3C Document Object Model (DOM), a W3C (World Wide Web Consortium) standard for accessing documents, can comprise a platform and language-neutral interface that may allow programs and scripts (such as JavaScript) to dynamically access and update the content, structure, and style of an electronic document. In some embodiments, the HTML DOM may be a standard object model and programming interface for HTML, and may define the properties of some or all HTML elements and the methods for accessing the HTML elements. In other words, the HTML DOM can act as a standard for how to acquire, change, add, delete, or otherwise interact with HTML elements.

In some embodiments, when an end-user accesses a website enabled with the techniques described herein, a version of the accessibility test code is one of the components that loads on that page. When loaded, the accessibility test code may cause the browser of the end-user to perform a battery of accessibility tests on the page. These accessibility tests can programmatically check for specific non-conformance issues and, if detected, programmatically fix them, report them to a remediation provider, or both. In some embodiments, programmatically fixing non-compliance issues may be done by, for example, querying a database of remediations and/or applying remediate code that is included in the accessibility test code.

FIG. 1 is a block diagram illustrating an example system 100, according to some embodiments of the present disclosure. The example system 100 may include one or more users 110 operating one or more user devices 115, which may run one or more web browsers 120. The example system 100 may include one or more website providers 125, which may host one or more websites 130, and each website may have any number of web pages. The example system 100 may include a remediation provider 135. The example system 100 may also optionally include one or more third-party vendors 140 that may provide services to, or perform the functionality of, the remediation provider 135. For the purposes of simplicity and facilitating understanding of the example system 100, the components of the example system 100 may be described singularly (for example, in the context of a single user 110, and so forth). However, it should be noted that in practice, there can be any number of each of the components within the example system 100. The components of the example system 100 may be communicatively coupled to one another via the internet 105.

In some embodiments, the remediation provider 135 may optionally communicate with the website provider 125 over a local network. In some embodiments, the remediation provider 135 may be operated by the operator of the website provider 125 such as, for example, by deploying a dedicated remediation server or virtual machine. In some embodiments, the remediation provider may operate as a third party service.

In some embodiments, the user 110 may operate their user device 115 in order to access a website, such as website 130. For instance, the user 110 may direct the web browser 120 running on their user device 115 to access a web page of the website 130 via the internet 105. Examples of the user device 115 may include a desktop computer, laptop, tablet, smart phone, and so forth.

In some embodiments, the website provider 125 may be the creator and provider of the website 130. In some embodiments, the website provider 125 may not be the creator of the website 130. In some embodiments, the website provider 125 may use internet service providers (ISPs), carriers, network operators, hosting services, and content delivery networks for storing, hosting, and delivering the website 130 and its contents. Examples of website contents may include web objects (text, graphics, and scripts), downloadable objects (media files, software, documents), applications (e-commerce, portals), live streaming media, on-demand streaming media, and so forth.

In some embodiments, the remediation provider 135 may be any entity entrusted to place the website 130 into compliance with accessibility standards. In some cases, the remediation provider 135 may provide code, such as remediation code, that can be executed on the web browser 120 of the user device 115 in order to perform real-time remediation of the website 130 (more specifically, one or more pages of the website 130), such that the remediated website can be displayed to the user 110 in the web browser 120. The web browser 120 may implement any remediations by acquiring and executing remediation code to remediate a web page and its contents. The remediation provider 135 may host and provide different remediation code. As just one example, the remediation provider 135 may host and provide different remediation code for different websites. In various embodiments, remediations immediately manipulate the DOM, causing the corrections and enhancements to take effect at the time the content has finished loading and rendering. In some embodiments, keyboard users may be able to use standard keys, such as tab or any other key or combination of keys, to navigate through the remediated page, regardless of whether a screen reader or other assistive technology is being utilized, reaping the benefits of the applied DOM manipulations.

Figure 2:
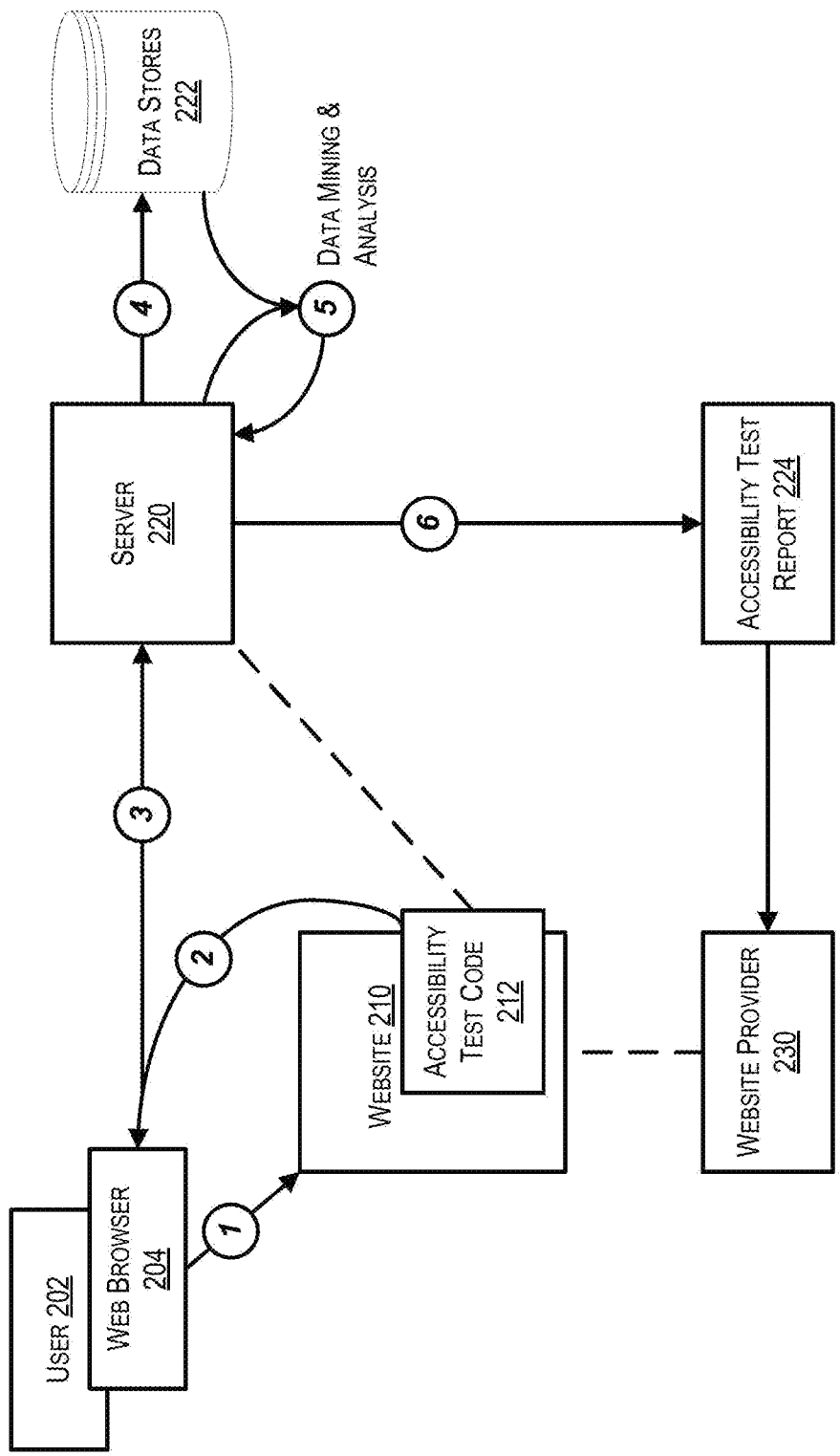
FIG. 2 is a combined schematic block and schematic flow sequence diagram illustrating an example approach for performing accessibility testing of a website, according to some embodiments of the present disclosure.

FIG. 2 is a combined schematic block and schematic flow sequence diagram illustrating an example approach for performing accessibility testing of a website, according to some embodiments of the present disclosure.

At circle 1, a user 202 accesses a website 210 through a web browser 204 running on their user device. The website 210 may include one or more web pages, and the website 210 may be created by the website provider 230. Embedded in the website 210 (e.g., the code of the web pages) may be accessibility test code 212. In some embodiments, the accessibility test code 212 may be JavaScript. In some embodiments, the accessibility test code 212 may be a relatively small segment of code (e.g., a JavaScript snippet or applet).

At circle 2, the accessibility test code 212 may be executed and run in the web browser 204 on the user device. Execution of the accessibility test code 212 may cause the web browser 204 to perform a battery of accessibility tests on the website 210, produce accessibility test results, and send those accessibility test results to a server, such as the remediation provider 220.

In general, these accessibility tests may be tests that test or monitor the accessibility of the website 210 against certain accessibility standards (for example, WCAG). For example, there may be an accessibility test to check if the font is too small to read and needs resizing, an accessibility test to check the contrast ratio between a visual indicator and the surrounding web page, an accessibility test to check to see if an input area is too small for the user (for example, an associated link or button does not have a clickable area that is at least 44 pixels), and so forth. These accessibility tests can be run in the browser 204 for every page on the website 210 that the user 202 visits. Examples of various accessibility tests that can be performed on a user device are shown in FIGS. 3A-3H.

Although described within the context of accessing a website through a web browser 204 on the user device, it should be noted that these concepts are applicable to native mobile applications as well. For instance, within a mobile application specifically configured for interacting with a particular website and/or web-based application (for example, a social media website), there may be embedded accessibility test code that can be run in order to perform accessibility tests and return the results to a server. The accessibility test code can be configured to listen for certain events within the application (for example, lifecycle change events) to trigger certain accessibility tests to run or re-run. In some embodiments, this accessibility test code can be added to the native mobile application via a plug-in or the SDK (for example, by the developer of the application). Thus, the user 202 may be attempting to access a resource through a mobile application on their mobile device. However, for the purposes of simplicity and facilitating understanding, the accessibility tests are described within the context of accessing the website 210 through the web browser 204. Similarly, the concepts described herein are applicable to some types of applications typically run on a desktop or laptop computer that use web technologies, such as, for example, applications that use the Electron framework.

There may be any number of accessibility tests performed within the web browser 204 on the user device. In some embodiments, the accessibility test code 212 may check to make sure that the browser 204 is not currently performing other tasks or running other tests before performing one or more of the accessibility tests. In other words, the accessibility tests may be performed on the browser 204 when the browser 204 is idle or during certain idle periods (for example, empty frame or animation frame request). In some embodiments, the accessibility tests may be broken up into multiple jobs, and the browser 204 may run one of the jobs when it has availability.

In some embodiments, when the user 202 clicks on content in the web page that manipulates and changes what is displayed on the page, that change can be detected and may trigger certain accessibility tests to be re-run. These accessibility test results can be batched up and then sent off to the server (for example, remediation provider 220), which can reduce the amount of communications and "chatter" that would be associated with streaming accessibility test results as they are produced. This process of performing accessibility testing in a web page may be relatively fast. For instance, in some embodiments, the accessibility testing may be performed, and the web page may be displayed to the user 202 all within a one or two second timeframe. In some embodiments, it may take a maximum of, for example, 200 milliseconds to perform all or most of the accessibility tests and then send the results to the server (for example, remediation provider 220).

In some embodiments, accessibility tests may be triggered to be run or re-run by listening for certain browser events (for example, when the user 202 clicks a button, the browser may trigger an onclick event that the accessibility test code may be listening for, and then the accessibility test code may then run all or a subset of tests again). In some embodiments, the accessibility test code 212 may be configured to listen for any suitable browser lifecycle event.

Accessibility tests can be run as separate jobs, and jobs can be broken up and run independently by the browser 204. In some embodiments, the browser 204 may prioritize certain jobs for execution. For example, specific jobs or types of jobs may be prioritized or run more frequently (e.g., on a repeated basis), and this prioritization can even be based on the type of website that the web page is associated with. Over time, the set of jobs and accessibility tests being re-run may even evolve based on the type of website or the other things that are detected on the page. For instance, for a website that has photos and interactive elements, all of the accessibility tests may eventually be performed the first time that the user visits the page. However, the browser 204 may prioritize running jobs for detecting images, making sure the page is framed correctly, making sure the hierarchy of the page is correct, and so forth. As the user 202 interacts with the web page and causes changes to the page, certain accessibility tests may be re-run. As just one example, the browser 204 may re-run the jobs for making sure the page is still framed correctly and the hierarchy of the page is still correct after the page has changed. Thus, if a website is image heavy, image-related jobs and accessibility tests may be prioritized first. If a website is content heavy, then content-based jobs and accessibility tests (for example, detecting font sizes, contrast ratios, etc.) may be prioritized instead.

At circle 3, as the user 202 accesses and interacts with the website 210, the browser 204 will send results of the accessibility tests to a backend server, such as a server associated with the remediation provider 220. In some embodiments, the browser 204 may send accessibility test results to the remediation provider 220 as text data in a structured format or an unstructured format. For example, the browser 204 may send accessibility test results to the remediation provider 220 in a specific transfer language or transfer format, such as JavaScript Object Notation (JSON), Extensible Markup Language (XML), CSV, TSV, plain text, and so forth. The remediation provider 220 may receive the accessibility test results, and, at circle 4, store the accessibility test results (e.g., raw data) in a data store 222.

In some embodiments, at circle 5, the remediation provider 220 may collate the accessibility test results and perform data mining and analysis of the accessibility test results. In some embodiments, the remediation provider may be able to perform data mining as part of the analysis in order to discover suggestable or actionable insights from the accessibility test results. In some embodiments, the remediation provider 220 may be able to go through all the accessibility test results associated with the website 210 and detect when there are a number of issues with the website 210 or web page that exceed a certain threshold. For instance, the remediation provider 220 may be able a new type of issue that has popped up and has never been an issue with the website 210 or the web page, or if the website 210 or web page normally has 100 issues but there are suddenly 1,000 issues. The remediation provider 220 may be able to detect these changes in the amount of issues or the level of accessibility and alert the website provider 230.

In some embodiments, the data mining performed by the remediation provider 220 may enable identification of a pattern that can lead to the generation of a new remediation technique or remediation code. In some embodiments, the remediation provider 220 may be able to dynamically generate a remediation based on its analysis. In some embodiments, dynamically generated remediations may be stored in the data store 222. In some embodiments, the data store 222 may also contain human-created remediations.

In some embodiments, the remediation provider 220 may apply machine learning in order to potentially identify a pattern that was previously unknown and generate a new test. The machine learning approaches applied may include supervised, unsupervised, semi-supervised, or reinforcement learning paradigms.

At circle 6, the remediation provider 220 may generate an accessibility test report that can be provided to the website provider 230. Any analysis performed by the remediation provider 220 and any generated accessibility test reports can be stored by the remediation provider 220 in the data store 222.

Thus, each individual user 202 accessing the website 210 serves as a tester of the level of accessibility of the website 210 based on how the content is displayed to that particular user 202. This approach has the advantage of being highly scalable, since each visitor of the website 210 is a tester, so the amount of testing that is performed on a website 210 is proportional to the amount of traffic that it receives. Furthermore, this approach will pick up on any differences or variations in how the website 210 is displayed to different users (for example, different users may see a web site differently based on region, browser configuration, user preferences, and other factors) because it is the actual user's browser that is performing the tests. Thus, the results are based on actual data of real users interacting with the website. Additionally, this approach leads to rich test results because it increases the number of environments, configurations, and use cases that the website is tested under.

Since accessibility tests can be re-run as the user 202 navigates and interacts with the website, the accessibility testing is ongoing and follows the user's journey through the website. This may be especially advantageous for testing websites that use expandable/collapsible sections, infinite scrolling, and the like. In some embodiments, the remediation provider 220 may be able to identify or analyze the accessibility test results or level of accessibility associated with a specific user's experience.

FIGS. 3A-3H illustrate example accessibility tests that can be performed on a user device, according to some embodiments of the present disclosure. For example, issues that can be checked or evaluated from the accessibility tests may include:

In some embodiments, a test may determine that one or more font sizes are below a defined minimum value such as, for example, 10 pixels, 12 pixels, or some other size. In some embodiments, a font size that is below a defined value may be difficult to read even when resized. In some embodiments, a minimum font size may be defined in pixels, points, or some other appropriate measure.

In some embodiments, a test may determine if one or more anchor tags are correct. In some embodiments, a test may determine that one or more anchor tags contain appropriate attributes. In some embodiments, a test may determine that one or more anchor tags lack one or more attribute tags.

In some embodiments, a test may determine if the contrast ratio between one or more visual indicators and their surroundings is sufficient. In some embodiments, contrast may be checked automatically based at least in part on the borders, indicators, text, or other components of one or more elements and the background color or colors. In some embodiments, a test may not be able to programmatically determine the colors and thus may be unable to determine one or more contrast ratios. In some embodiments, a human tester may check that the contrast is sufficient.

In some embodiments, a test may determine if one or more input areas are too small. In some embodiments, minimum width and/or height values may be set such as, for example, a minimum of 44 pixels. In some embodiments, there may be exceptions to minimum width and/or height values such as, for example, inline link text, the ability of the user to enlarge the clickable area, and/or the input area being part of a group of buttons. In some embodiments, a human tester may determine if an input area falls within an exception.

In some embodiments, a test may determine if changes in content can be detected by assistive technologies. In some embodiments, a test may determine, for example, that there is no way for a screen reader to detect when one or more hidden elements are made visible because the elements lack, for example, aria-live or aria-expanded attributes.

In some embodiments, a test may determine if one or more links lack meaningful text. In some embodiments, a test may check for common indicators of a lack of meaningful text such as, for example, the use of words or phrases such as "link" or "read more." In some embodiments, additional considerations may be reviewed such as, for example, whether one or more image titles, if applicable, adequately describe the links or whether the link texts briefly describe the link destinations.

In some embodiments, a test may determine if one or more input areas meet a minimum size such as, for example, a minimum height and/or a minimum width. In some embodiments, a human tester may verify that all parts of one or more input areas are unobstructed and available as clickable areas.

In some embodiments, a test may determine if one or more contrast ratios between one or more visual indicators and their surroundings are too below a minimum value. In some embodiments, a test may determine a contrast ration based at least in part on or more of a color measurement of the borders, focus and selection indicators, and/or input text compared with the background color. In some embodiments, a test may determine if the contrast ratios meet the contrast standards or best practices set by, for example, WCAG 2.0 AA.

In some embodiments, a test may determine if one or more elements have an accessibility roles, labels, or the like such as, for example, an ARIA role or label.

In some embodiments, a test may determine if one or more semantic tags are used properly. For example, a test may determine if one or more blockquote tags contain quotations.

In some embodiments, a test may determine if one or more buttons contain text. In some embodiments, a test may further determine if said buttons contain vague terms such as, for example, "Click Here." In some embodiments, a human tester may verify that the button text adequately describes the purpose of the button.

In some embodiments, a test may determine which properties of one or more links differ from surrounding text including, for example, color, text decoration, font face, font size, font weight, and the like. In some embodiments, a test may determine that one or more links may be difficult to identify because, for example, they are only differentiated by color.

In some embodiments, a test may determine if one or more form fields should contain autocomplete attributes. In some embodiments, a test may determine that one or more form fields do not have autocomplete attributes. In some embodiments, a test may not be able to determine if one or more form fields should contain autocomplete attributes. In some embodiments, a human tester may determine whether autocomplete attributes may be preferable for one or more form fields.

In some embodiments, a test may determine if one or more headers appear in a logical order such as, for example, an outline style. In some embodiments, a test may further determine if one or more headers are at the appropriate level (for example, a top level heading, a second level heading, a third level heading, and the like).

In some embodiments, a test may determine if one or more form fields have labels. In some embodiments, a test may further determine if one or more labels of one or more input elements are meaningful and/or if said labels adequately describe the function of said input elements.

In some embodiments, a test may determine if one or more fields are required by checking, for example, attributes indicating that said fields are required. In some embodiments, a test may determine if one or more required fields have not been marked with an attribute indicating that the fields are required. In some embodiments, a test may determine that one or more label elements of one or more required fields do not indicate that the one or more fields are required. In some embodiments, a human tester may verify that one or more fields are not required.

In some embodiments, a test may determine if user interfaces are consistent by checking, for example, button styles, link styles, list styles, font faces, font sizes, font weights, and the like. In some embodiments, a human tester may verify that user interface components are consistent.

In some embodiments, a test may determine if a web page uses at least one image of text instead of text.

In some embodiments, a test may determine if one or more emoticons used within a web page have defined text equivalents. In some embodiments, a test may determine if a web page should be changed to avoid using emoticons.

In some embodiments, a test may determine if a web page uses a number of emoticons in excess of a defined limit or limits. In some embodiments, a limit may be defined by, for example, a limit on the total number of emoticons in a web page, a limit on the maximum number of emoticons that can appear next to each other, a minimum distance between emoticons and/or groups of emoticons, and the like.

In some embodiments, a test may determine if sensory information such as, for example, shape, size, visual location, orientation, sound, color, or the like is necessary to understand, operate, and/or navigate the content of a web page.

In some embodiments, a test may determine if the document of a web page matches the visual order of the web page. In some embodiments, a test may determine if the sequence and/or presentation of the web page may cause a screen reader to mispronounce words that would normally be read correctly. For example, in some embodiments, improper use of whitespace may cause problems for screen reader software.

In some embodiments, a test may determine if one or more identifiers associated with one or more elements of a web page are the same.

In some embodiments, a test may determine if text can be resized up to a minimum value such as, for example, 200% or 300%, without the use of assistive technology and without loss of content and/or functionality. In some embodiments, captions and images of text may be excluded from the test.

In some embodiments, a test may determine if one or more link image contains text alternative descriptions. In some embodiments, a test may further determine if the text alternative descriptions of said images contain meaningful text such as, for example, descriptions of the contents of said images. In some embodiments, a test may determine if the text within said images appears in the text alternative descriptions for the images. In some embodiments, a test may determine if the text alternative descriptions adequately describe the links and/or images.

In some embodiments, a test may determine if one or more elements use native OnClick functionality. In some embodiments, elements preferably use native OnClick functionality rather than, for example, custom implementations of similar functionality.

In some embodiments, a test may determine whether content in a web page can be displayed up to a maximum size such as, for example, text displayed at 320 CSS pixels or some other size. In some embodiments, a test may further determine whether other content on the web page can be scaled without loss of content or functionality such as, for example, overlapping boxes, obscured controls, controls that are separated from labels, or other similar issues. In some embodiments, a test may scale content within a window of a specific width or height such as, for example, a window width of 1280 pixels. In some embodiments, a test may zoom the content up to a maximum value such as, for example, 400%. In some embodiments, a test may determine if any horizontal scrolling that appears when the page is zoomed in is advantageous or preferable such as, for example, a table with data organized into columns.

In some embodiments, a test may determine if one or more images have alternative text descriptions. In some embodiments, a test may further determine if the alternative text descriptions of said images have common signs of inaccessible content such as, for example, alternative text descriptions that merely say "image" or give the filenames of said images. In some embodiments, a test may determine if any text within said images appears within the alternative text descriptions of said images. In some embodiments, a test may determine if the alternative text descriptions of said images describe the contents of said images. In some embodiments, a human tester may verify that the alternative text descriptions adequately describe said images.

In some embodiments, a test may determine if one or more input images have alternative text descriptions. In some embodiments, a test may further determine if the alternative text descriptions of said input images have common signs of inaccessible content such as, for example, alternative text descriptions that merely say "image" or give the filenames of said images. In some embodiments, a test may determine if any text within said input images appears within the alternative text descriptions of said input images. In some embodiments, a test may determine if the alternative text descriptions of said input images describe the contents of said images. In some embodiments, a human tester may verify that the alternative text descriptions adequately describe said input images.

In some embodiments, a test may determine if two-axis scrolling is present when a web page is viewed in a small viewport such as, for example, on a low resolution screen, in a small window, or on a device with a small screen such as, for example, a smartphone and/or when a web page is viewed while zoomed in. In some embodiments, a test may determine that two-axis scrolling is present even in a relatively large viewport such as a viewport with a width of, for example, 1280 pixels. In some embodiments, a test may determine that two-axis scrolling is present when not zoomed in. In some embodiments, a test may determine that the presence of two-axis scrolling in relatively large viewports and/or when not zoomed in may indicate that two-axis scrolling is advantageous and/or preferable for the web page.

In some embodiments, a test may determine if two-axis scrolling is present when the spacing of the contents of a web page are changed such as, for example, by a user style sheet. In some embodiments, a test may determine that two-axis scrolling is present when the spacing is not changed. In some embodiments, a test may determine that the presence of two-axis scrolling when the spacing is not changed may indicate that two-axis scrolling is advantageous and/or preferable for the web page.

In some embodiments, a test may determine if error messages exist for one or more input fields. In some embodiments, a test may further determine if error messages are accessible to screen reader users or users of other assistive technologies. In some embodiments, a human tester may intentionally omit and/or mistype data into an input field to cause one or more error messages to appear. In some embodiments, a human tester may verify that a screen reader user would be informed of the error messages immediately or substantially soon after an error occurs.

In some embodiments, a test may determine if there are error prevention mechanisms on one or more input fields. In some embodiments, only forms that have financial or legal weight may be checked. In some embodiments, an automated test may not be able to determine whether a form carries financial or legal weight. In some embodiments, a form may not be checked if it does not carry financial or legal weight and/or the test cannot determine if the form carries financial or legal weight. In some embodiments, a human tester may determine whether a form carries financial or legal weight.

In some embodiments, a test may determine if one or more forms may initiate a context change without warning to the user. In some embodiments, a test may determine that one or more forms do not initiate a context change without warning at least in part by determining that said forms have submit buttons. In some embodiments, a test may determine that said forms do not have submit buttons and also do not appear to have any associated events triggered by one or more changes. In some embodiments, a human tester may verify that a user is adequately warned of any changes in context and/or the user is able to control changes in context.

In some embodiments, a test may determine if one or more form fields have valid autocomplete attributes. In some embodiments, where one or more autocomplete attributes are valid may be determined at least in part by one or more of the type of control, the label, or the like. In some embodiments, a human tester may verify that the proper data is automatically filled.

In some embodiments, a test may determine if one or more images are decorative by, for example, determining that said images contain text alternative that are empty strings. In some embodiments, a test may further determine if said images contain text or other information that is advantageous to understanding the document.

In some embodiments, a test may determine if one or more CSS background images provide sufficient contrast. In some embodiments, said CSS background images may not create uniform color contrast across the foreground text. In some embodiments, it may not be feasible to programmatically determine where a piece of an image will display with respect to the foreground text. In some embodiments, a human tester may manually confirm that there is sufficient contrast.

In some embodiments, a test may determine if one or more links within the same page contain a valid reference. In some embodiments, a valid reference has an anchor portion which points to a valid element ID or named anchor in the web page.

In some embodiments, a test may determine if a web page contains one or more landmarks. In some embodiments, landmarks may be HTML 5 landmark elements with implicit roles or may have explicit ARIA landmark roles. In some embodiments, a test may determine if common problems with landmarks are present such as, for example, content that is outside of any landmark role or a banner landmark that is not a top level landmark.

In some embodiments, a test may determine if one or more elements in a web page have aria-describedby and/or aria-labelledby attributes. In some embodiments, a test may further determine if one or more aria-describedby and/or aria-labelledby attributes contain a reference or references to a target or targets that do not exist on the page.

In some embodiments, a test may determine if one or more required child elements associated with one or more ARIA roles are missing. In some embodiments, for example, a test may determine that a web page contains an element with a radiogroup rule but there are no children with a radio role, or a web page may contain a tablist role without any children that have a tab role.

In some embodiments, a test may determine if one or more elements with an ARIA role are missing a required parent role. In some embodiments, for example, a test may determine that a web page contains one or more elements with a radio role, but there is no associated parent element with a radio group role, or a web page may contain one or more elements with a tab role, but there is no associated parent with a tablist role.

In some embodiments, a test may determine if one or more links in a web page contain no text content such as, for example, inner text and/or titles.

In some embodiments, one or more links with invalid anchors may cause assistive technology to exhibit indeterminate behavior. In some embodiments, a test may determine if one or more same-page links contain an invalid anchors such as, for example, an element ID or named anchor that does not exist in the web page.

In some embodiments, a test may determine if one or more mouse-triggered events are present without associated keyboard events. In some embodiments, a test may check that onmousedown events have corresponding onkeydown events. In some embodiments, a test may check that onmouseup events have corresponding onkeyup events. In some embodiments, a test may check that onmouseover events have corresponding onfocus events. In some embodiments, a test may check that onmouseout events have corresponding onblur events. In some embodiments, a test may check that onmouseneter events have corresponding onfocus events. In some embodiments, at test may check that onmouseleave events have corresponding onblur events. In some embodiments, a test may check that onclick events have corresponding onkeypress events. In some embodiments, a test may identify that one or more events should be avoided at least in part because they do not have associated keyboard events such as, for example, onmousemove (the cursor is moved) or ondblclick (the primary mouse button was double clicked).

In some embodiments, a test may determine if one or more button titles, link titles and/or link text alternatives are redundant. In some embodiments, one or more button titles, link titles and/or link text alternatives may be redundant because, for example, the button titles, link titles, and/or link text alternatives repeat what is found in one or more links. In some embodiments, redundant titles and/or text alternatives may cause a screen reader to repeat the same text.

In some embodiments, a test may determine if one or more animated GIFs, embedded objects, scripts, and/or applets cause excessive change according to a defined metric. In some embodiments, a test may determine that one or more animations, embedded objects, scripts, or applets case excessive change because, for example, the one or more animations, embedded objects, scripts, or applets result in flickering, flashing, or changing colors more than, for example, five times per second. In some embodiments, a human tester may verify that one or more animations, embedded objects, scripts, or applets do not cause excessive change.

In some embodiments, a test may determine if one or more scalable vector graphics (SVG) elements have titles. In some embodiments, a test may determine if one or more SVG elements with link to external sources lack title child elements. In some embodiments, a test may determine if one or more titles may be advantageous because, for example, the text inside one or more inline SVGs is not meaningful.

In some embodiments, a test may determine if one or more buttons do not have visible text, either as actual text or as images containing text.

In some embodiments, a test may determine if one or more checkbox groups and or radio groups have fieldsets and/or legends. In some embodiments, a test may further determine if one or more fieldsets and/or legends associated with one or more checkbox groups and/or radio groups accurately describe the list of choices in the one or more groups.

In some embodiments, a test may determine if there are one or more visible text indications of one or more required fields. In some embodiments, indications that one or more fields are required may be included in the label elements of the one or more required fields.

In some embodiments, a test may determine if one or more elements have an ARIA role of checkbox, combobox, listbox, and/or radio. In some embodiments, an ARIA checkbox role, combobox role, a listbox role, and/or radio role may not be needed because, for example, the native HTML checkbox, combobox, listbox, and/or radio elements provide the needed functionality. In some embodiments, an ARIA checkbox role, combobox role, a listbox role, and/or radio role may be misused.

In some embodiments, a test may determine if one or more autocomplete attributes of one or more fields are appropriate. In some embodiments, when one or more autocomplete attributes for one or more fields are set to off, a User Agent should preferably not automatically fill data in said fields. In some embodiments, if one or more autocomplete attributes for one or more fields are set to on, the User Agent may use its own heuristics to determine how to fill said fields. In some embodiments, a human tester may verify whether autocomplete functionality is appropriate for one or more fields.

In some embodiments, a test may determine if one or more heading elements such as, for example, the elements, may be preferable and/or advantageous on one or more data tables. In some embodiments, a test may determine that one or more tables are used for layout and preferably should not have heading elements. In some embodiments, a test may determine that one or more tables contain data and that it may be advantageous to have heading elements.

In some embodiments, a test may determine if one or more colors are used to convey information, indicate one or more actions, prompt one or more responses, and/or distinguish one or more visual elements. In some embodiments, a test may determine if there are one or more alternative indications such as, for example, textual cues.

In some embodiments, a test may determine if a web page contains one or more invalid ARIA roles.

In some embodiments, a test may determine if a web page has a title. In some embodiments, a web page may further determine if the title adequately describes the page. In some embodiments, a human tester may verify that the title adequately describes the page.

In some embodiments, a test may determine if a web page displays one or more visual keyboard focus indicators. In some embodiments, a test may determine if one or more visual indications of focus are conspicuous because of, for example, a change in color, a change in size, a change in border thickness, or the like. In some embodiments, a human test may verify that one or more visual indications of focus are sufficient.

In some embodiments, a test may determine if one or more elements in a web page collide when the spacing of the contents of the web page is changed. In some embodiments, one or more elements may collide or overlap when the spacing is changed. In some embodiments, one or more colliding or overlapping elements may cause information on the page to become unreadable and/or may cause one or more user interface components to become inaccessible.

In some embodiments, a test may determine if two or more adjacent links are directed to the same destination. In some embodiments, a test may identify that two or more adjacent links may be combined in a single link.

In some embodiments, a test may determine if each of one or more frames and/or iframes in a web page contains a title. In some embodiments, a test may further determine if the title of each of the one or more frames and/or iframes in a web page adequately describes the purpose and/or function of the one or more frames and/or iframes. In some embodiments, a test may determine if more than one frame and/or iframe in a web page contains the same title attribute. In some embodiments, a test may determine that one or more titles are inadequate or are placeholders because, for example, the title text is empty.

In some embodiments, a test may determine if one or more images do not have text alternatives. In some embodiments, one or more decorative images may have empty text alternatives.

In some embodiments, a test may determine if the text content of one or more links is meaningful. In some embodiments, a test may determine that the text content of one or more links is not meaningful because the text content of the one or more links does not adequately describe the purpose of the one or more links. For example, in some embodiments, text such as "link," "click here," or "read more" do not provide adequately context.

In some embodiments, one or more media queries may lock the screen to a particular orientation. In some embodiments, one or more media queries that lock the screen to a particular orientation may result in inconsistent display and/or may prevent a user from accessing content entirely. In some embodiments, a test may determine if there are one or more media queries that may lock the orientation of the screen such as, for example, in landscape mode or in portrait mode. In some embodiments, a test may determine if one or more media queries based at least in part on screen orientation have entries for both portrait mode and landscape mode.

In some embodiments, a test may determine if one or more headings appear out of order. In some embodiments, a test may determine that one or more headings are out of order if said headings do not conform to an outline style. For example, in some embodiments, a test may determine that one or more second level headings that appear before any first level heading are out of order.

In some embodiments, a test may determine if there is more than one level 1 heading in a web page. In some embodiments, a test may determine if there is exactly one level 1 heading. In some embodiments, a test may determine if there are no level 1 headings. In some embodiments, a web page preferably contains exactly one level 1 heading.

In some embodiments, a test may determine if one or more videos in a web page are accessible. In some embodiments, a test may determine if one or more videos in a web page have user-selectable audio tracks. In some embodiments, a test may further determine if at least one audio track of each of the one or more videos in a web page is a description track that includes audio descriptions of the one or more videos.

In some embodiments, a test may determine if there are alternatives, such as, for example, text descriptions and/or transcripts, to time-based media such as, for example, audio or video. In some embodiments, a test may be unable to automatically determine if there are alternatives to time-based media. In some embodiments, a human tester may verify if there are alternatives to time-based media.

In some embodiments, a test may determine if one or more anchors in a web page are functional. In some embodiments, one or more anchors may not be functional because, for example, said anchors lack href, name, id, tabindex, or role attributes or the like.

In some embodiments, a test may determine if one or more linked videos contain captions and/or if transcripts are available. In some embodiments, a test may determine if one or more transcripts are contained on the web page and/or if there are one or more links to one or more transcripts near the media. In some embodiments, a test may determine if one or more captions associated with one or more videos accurately reflect the contents of the one or more videos.

In some embodiments, a test may determine if a web page has one or more links to skip to the main content on the page. In some embodiments, a test may determine if the one or more links to skip to the main content direct to a section of the page that appears to be the main content. In some embodiments, the main content may be determined based on, for example, a role or a top level heading. In some embodiments, if a main content area is defined, then a skip to main link can be auto-generated.

In some embodiments, a test may determine if a web page contains at least one top level or a second level heading. In some embodiments, a test may determine if the first heading on a page is either a first level heading or a second level heading.

In some embodiments, a test may determine if one or more form fields do not have labels. In some embodiments, one or more labels may be determined based on context. In some embodiments, a human tester may verify that one or more input labels are meaningful.

In some embodiments, a test may determine if one or more links contain both images and text. In some embodiments, a test may determine that one or more links are not accessible because, for example, said links only contain images and the images do not contain text alternatives.

In some embodiments, a test may determine if one or more text alternatives for one or more images in a web page are the file names of the one or more images.

In some embodiments, a test may determine if one or more SVG objects have text equivalents. In some embodiments, a test may further determine if any text within the one or more SVG objects is also in the text equivalents associated with the one or more SVG objects. In some embodiments, a test may determine if the text in one or more title child elements adequately describes the content of the one or more SVG objects.

In some embodiments, a test may determine if a web page contains one or more meta tags that restrict the scale and reflow of a page.

In some embodiments, a test may determine if one or more updates to a web page are announced to a user by a screen reader.

In some embodiments, a test may determine if one or more meta viewport tags allow adequate content zoom. In some embodiments, a test may determine that one or more meta viewport tags limit the scale and/or reflow of content in an inaccessible manner.

In some embodiments, a test may determine if one or more elements with an ARIA role are missing one or more required attributes. In some embodiments, some ARIA roles may require a set of ARIA attributes in order to function properly.

In some embodiments, a test may determine if there are one or more ARIA attributes that are not appropriate for the one or more roles of one or more elements. For example, in some embodiments, a test may determine that an implicit and/or explicit ARIA attribute is not appropriate for a role.

In some embodiments, a test may determine if one or more form fields have associated labels. In some embodiments, a screen reader may operate in a "form mode" and may not provide useful information to the user if one or more form fields are missing labels.

In some embodiments, a test may determine if a user of assistive technology may get stuck in one place on the page. In some embodiments, a test may use keyboard navigation to go through a web page and may interact with the page as instructed on the page.

In some embodiments, a test may determine if one or more form controls contain a placeholder attribute such as, for example, (###) ###-#### for a phone number input field or Jan. 1, 1970 for a birthday input field. In some embodiments a test may determine that one or more fields contain placeholder text but do not contain labels. In some embodiments, placeholder text may present accessibility problems because it disappears when a user begins typing and/or because it may be displayed in low contrast.

In some embodiments, a test may determine if a web page contains one or more elements with the same ID. In some embodiments, scripts, styles, intra-page links, and the like may rely on element IDs. In some embodiments, duplicate IDs may cause confusion. In some embodiments, duplicate IDs may not impact accessibility because, for example, the elements are not interactable. In some embodiments, a human tester may verify that duplicate IDs do not interfere with accessibility.

In some embodiments, a test may determine if there are one or more data tables in a web page. In some embodiments, a test may further determine if one or more data tables have headers and/or captions. In some embodiments, a test may determine if the headers accurately describe the data contained within a row, column, rowspan, and/or colspan. In some embodiments, a test may determine if row and/or column headers are properly scoped such as, for example, a scope of a single column, a single row, two rows, two columns, three rows, three columns, or any other number of rows and/or columns.

In some embodiments, a test may determine if one or more ARIA attribute values are invalid. In some embodiments, one or more ARIA attributes in a web page may only have limited sets of standards-compliant values. In some embodiments, a test may determine if one or more ARIA attribute values are not contained within the allowed values.

In some embodiments, a test may determine if more than one navigation region is defined in a web page. In some embodiments, a test may determine if the more than one navigation regions are distinctly labeled by, for example, aria-label attributes and/or aria-labelledby attributes.

In some embodiments, a test may determine if one or more checkbox groups have descriptions. In some embodiments, a test may determine if one or more checkbox groups are wrapped in one or more fieldset elements. In some embodiments, a test may further determine if the one or more fieldset elements contain one or more legends that describe one or more lists of choices.

In some embodiments, a test may determine if one or more autofill field types are appropriate for one or more controls and/or inputs. For example, in some embodiments, a test may determine that a numeric control is not appropriate for an email address field. In some embodiments, a list of appropriate controls and/or inputs for different fields may be obtained from a third party source such as, for example, the W3C website.

In some embodiments, a test may determine if one or more tabbable elements on in web page have an ARIA hidden attribute. In some embodiments, one or more elements may be tabbable because they are naturally tabbable. In some embodiments, one or more elements may be tabbable because they have a tabindex attribute. In some embodiments, one or more naturally tabbable element may be hidden at least in part from assistive technology by setting its tabindex to −1. In some embodiments, one or more element that is not naturally tabbable may be hidden from assistive technology at least in part by removing the tabindex attribute from the element.

In some embodiments, a test may determine if one or more fieldsets have legends. In some embodiments, a test may determine if the one or more legends contain inaccessible content. In some embodiments, a test may check that the text of the one or more legends accurately describes the fields contained within the one or more fieldsets.

In some embodiments, a test may determine if one or more drop-down selection boxes lack optgroup elements. In some embodiments, a test may determine that one or more drop-down selection boxes contain a large list of options such as, for example, 20 options, 30 options, 50 options, 100 options, or some other number of options. In some embodiments, a test may determine that one or more drop-down selection boxes have options that may be logically grouped. In some embodiments, one or more drop-down selection boxes may be flagged for the web site operator to consider adding optgroup elements.

In some embodiments, a test may determine if one or more fields that appear to collect customer information such as, for example, name, address, date of birth, or the like do not have autocomplete attributes. In some embodiments, the use of autocomplete may be recommended when appropriate but may not be required for accessibility compliance.

In some embodiments, a test may determine if one or more list tags such as, for example, of and/or ul, are used improperly. For example, in some embodiments, a test may determine if one or more list tags are used to format text rather than to provide one or more structured lists. In some embodiments, any list with only one element may be flagged for manual review.

In some embodiments, a test may determine if one or more hypertext links contain the word "link." In some embodiments, hypertext links preferably should not contain the word "link" because it may cause assistive technology to announce "link" twice.

In some embodiments, a test may determine if content may be adapted to different styles. In some embodiments, for example, a test may apply one or more user style sheets. In some embodiments, a test may apply a user style sheet with a different background style. In some embodiments, a test may further determine if the web page loses information because of the change in background style. In some embodiments, a test may fail because, for example, the background style does not change when a user style sheet is applied. In some embodiments, a user style sheet may adjust text styles by, for example, changing the line height, changing the font family, changing the foreground color, and/or changing the background color. In some embodiments, a web page may pass the test if there is no significant loss of functionality.

In some embodiments, foreign words are preferably marked with a language attribute. In some embodiments, a test may determine if one or more foreign words are marked with language attributes. In some embodiments, a test may determine if the language attributes for the one or more foreign words are correct.

In some embodiments, a test may determine if a web page contains one or more empty headers. In some embodiments, all headers should preferably contain text, images with appropriate text alternative attributes, or both. In some embodiments, headers should preferably contain navigational cues.

In some embodiments, a test may determine if tab indexes are out of order. In some embodiments, a test may determine that tab indexes are out of order if, for example, the tab index order does not match the DOM order. In some embodiments, a tab index that is different from the DOM order may be intentional. In some embodiments, a tab index that is different from the DOM order may not negatively impact page flow.

In some embodiments, a test may determine if a web page contains one or more buttons with text that is not descriptive. In some embodiments, a test may determine if vague terms such as, for example, "click here" or "button" are used. In some embodiments, a test may determine if the contents of one or more buttons describe the purpose or result of the one or more buttons.

In some embodiments, a test may determine if one or more buttons contain a label with the word "button." In some embodiments, assistive technology may announce "button" twice if a button is labeled as "button."

In some embodiments, a test may determine if a page has a title and/or if a page title is a placeholder which does not describe the page. In some embodiments, all pages preferably have titles that describe the pages. In some embodiments, screen readers may announce the title of the current web page when the user focuses on the browser window.

In some embodiments, a test may determine if content may preferably be wrapped in a heading tag. In some embodiments, each logical section of a page may be broken or introduced with a header element such as, for example, h1, h2, h3, h4, h5, h6, etc.

In some embodiments, a test may determine if there are one or more table headers that do not reference any table cells. In some embodiments, one or more table headers may describe cells via, for example, headers attributes, aria-describedby attributes, or positioning. In some embodiments, a row header may describe cells to the right of the row header. In some embodiments, a column header may describe cells below it. In some embodiments, a test may determine that one or more row headers have no cells to the right and/or one or more column headers have no cells below.

In some embodiments, a test may determine if one or more top level landmarks such as, for example, banner, main, complementary, and/or contentinfo landmarks, are nested within another landmark. In some embodiments, a test may flag one or more top level landmarks that appear inside another element with an implicit ARIA role or an explicit ARIA role. In some embodiments, the implicit banner role and implicit contentinfo roles may be removed from one or more header and/or footer elements contained within an article, aside, main, nav, or section element.

In some embodiments, a test may determine if a focus event results in a context change. In some embodiments, a human may verify that a focus event does not cause a context change.

In some embodiments, a test may determine if one or more hidden input field such as, for example, a hidden transaction currency field, have an autocomplete attribute. In some embodiments, a test may determine that one or more hidden input fields should preferably not have an autocomplete attribute of on or off because they do not provide anchoring information.

In some embodiments, a test may determine if whitespace is used to style plaintext. In some embodiments, a test may determine that whitespace is used to display multiple columns of text. For example, in some embodiments, spaces may be used to align columns of data. In some embodiments, a test may determine that white space should not be used.

In some embodiments, a test may determine if whitespace is used to control letter spacing. In some embodiments, blank characters inserted to control letter spacing within one or more words may change the interpretation of the one or more words and/or cause the one or more words not to be programmatically recognized as individual words. For example, in some embodiments, assistive technology may not recognize the text "H E L L O W O R L D" as the two phrase "hello world" but may instead recognize the text as, for example, individual letters.

In some embodiments, a test may determine if a web page contains more than one main region. In some embodiments, a well-formed page should have only one region with a role of main. In some embodiments, the role of main may be explicitly and/or implicitly defined.

In some embodiments, a test may determine if one or more ARIA attributes are invalid. In some embodiments, a test may check one or more attributes that begin with "aria" against a list of known valid ARIA attributes. In some embodiments, the one or may attributes that begin with "aria" are compared against the valid attributes defined in the WAI-ARIA specification.

In some embodiments, a test may determine if the alternative text for one or more images is within a defined limit such as, for example, 100 characters. In some embodiments, one or more images with alternative text that exceeds a defined limit may be flagged for review.

In some embodiments, a test may determine if one or more fields should be required by checking for one or more visual indications that a field is required. In some embodiments, one or more fields that are visually required may be flagged because said fields do not have the required attribute applied.

In some embodiments, a test may determine if one or more blockquote elements have semantic meaning. In some embodiments, one or more blockquote elements may be used as a styling tool. In some embodiments, a screen reader may, for example, treat a blockquote as having semantic meaning. In some embodiments, one or more blockquotes may be interpreted differently from how the one or more blockquotes were intended to be interpreted. In some embodiments, a test may flag one or more blockquotes that appear to be used only for styling.

In some embodiments, a test may determine if a web page contains one or more quotations. In some embodiments, a test may determine if one or more quotations may preferably be placed in blockquotes because, for example, screen reader software may interpret text in blockquotes differently, which may improve a page's narration.

In some embodiments, a test may determine if one or more field labels are placeholders. In some embodiments, all inputs should preferably have valid text in their label elements. In some embodiments, all inputs should preferably have labels that describe the purpose of the input to a screen reader user.

In some embodiments, a test may determine if one or more complementary regions are distinctly labeled. In some embodiments, complementary regions may preferably be labeled so that an assistive technology may distinguish them. In some embodiments, complementary regions may be labeled by, for example an aria-label attribute and/or an aria-labelledby attribute.

In some embodiments, a test may determine if one or more links to downloadable files have appropriate labels. In some embodiments, a downloadable file may be, for example, a Microsoft Word document or a PDF. In some embodiments, a test may determine if one or more links to downloadable files contain a word such as, for example, "download" or "open" to indicate that a file is downloadable. In some embodiments, a test may identify links to downloadable files based at least in part on file extension.

In some embodiments, a test may determine if one or more map areas have alt attributes. In some embodiments, one or more map areas may be flagged if they do not have alt attributes.

In some embodiments, a test may determine if one or more elements have incorrect ARIA roles. In some embodiments, one or more ARIA roles may only be appropriate for a subset of HTML elements. In some embodiments, a test may detect that one or more ARIA roles have been applied to one or more elements for which the one or more ARIA roles are not appropriate.

In some embodiments, a test may determine if one or more tables contain one or more headers with no text. In some embodiments, a test may identify one or more headers based on, for example, th tags, an ARIA role of columnheader, and/or an ARIA role of rowheader. In some embodiments, one or more header cells should be changed to regular cells such as, for example, the top-left corner of a table that represents the intersection of two data axes.

In some embodiments, a test may determine if one or more video elements contain captions. In some embodiments, one or more video elements may not have a caption track.

In some embodiments, a test may determine if a web page contains more than one contentinfo region such as, for example, more than one footer. In some embodiments, a test may determine that a web page should preferably have only a single contentinfo role. In some embodiments, an HTML5 footer may have an implicit contentinfo role. In some embodiments, embedding a footer within another region such as, for example, an article, aside, main, nav, or section may remove the implicit contentinfo role from said footer.

In some embodiments, a test may determine if one or more links to skip to the main content of a web page are clearly marked. In some embodiments, a test may determine that a link to skip to the main content should preferably be the first focusable control in a web page. In some embodiments, a test may check that one or more links to skip to the main content describe that the one or more links point to the main content of the web page.

In some embodiments, a test may determine if one or more links to skip to the main content contain references to a target or targets that do not exist.

In some embodiments, a test may determine if a web page contains one or more colspans and/or rowspans that are unusual or inconsistent. In some embodiments, a test may determine that one or more colspans and/or rowspans may cause screen readers to behave unexpectedly.

In some embodiments, a test may determine if a web page contains more than one banner region such as, for example, more than one banner. In some embodiments, a test may determine that a web page should preferably have only a single banner role. In some embodiments, an HTML5 banner may have an implicit banner role. In some embodiments, embedding a banner within another region such as, for example, an article, aside, main, nav, or section may remove the implicit banner role from said banner.

In some embodiments, a test may determine if one or more description lists are improperly structured. For example, a test may determine that one or more description lists differ from the required structure of individual definition term (dt) tags followed by one or more definition detail (dd) tags, all contained within definition list (dl) tags. For example, in some embodiments, a test may determine that one or more description lists have one or more definition detail tags that are not preceded by a definition term tag. In some embodiments, a test may determine that one or more dt and/or dd tags are not with a definition list. In some embodiments, one or more dt and/or dd tags may be outside a definition list because, for example, dl tags were omitted by accident, or the author of the web page wanted to use dl and/or dt tags for styling.

In some embodiments, a test may determine if one or more form controls have title tags but do not have label, aria-label, or aria-labelledby attributes. In some embodiments, assistive technologies may have better support for labels, aria-labels, and aria-labelledby attributes.

In some embodiments, a test may determine if a web page contains one or more marquee tags. In some embodiments, content that moves or auto-updates such as, for example, content within marquee tags, can be a barrier to anyone who has trouble reading stationary text quickly as well as anyone who has trouble tracking moving objects. In some embodiments, screen readers may have difficulty processing content within marquee tags.

In some embodiments, a test may determine if a web page has a valid language attribute. In some embodiments, a test may determine if the lang attribute of a web page conforms to the ISO 639 standard.

In some embodiments, a test may determine if a website has a sitemap.

In some embodiments, a test may determine if a web page contains one or more emoticons. In some embodiments, a test may determine if one or more emoticons have text equivalents that are defined by, for example, one or more abbr tags.

In some embodiments, a test may determine if one or more content areas update automatically. In some embodiments, a test may determine if updating can be paused and/or resumed for the one or more content areas that update automatically.

In some embodiments, a test may determine if a web page has one or more time limits such as, for example, an automatic logout after a period of inactivity. In some embodiments, a test may determine if one or more time limits for a web page can be extended.

In some embodiments, a test may determine if one or more hyperlink images in a web page contain alt text with the word "link." In some embodiments, assistive technologies may announce hyperlink images in such a way that the word "link" will be announced twice if that word is in the alt text. In some embodiments, this redundancy may cause confusion.

In some embodiments, a test may determine if a web page contains content that is visible by focus or hovering. In some embodiments, a test may determine if content visible by focus or hovering is accessible. For example, in some embodiments, a test may verify that triggering content is not obscured when a popup is visible. In some embodiments, a test may determine if a pointer can be moved onto one or more popups without a loss of visibility. In some embodiments, a test may determine if one or more popups remain visible when one or more user interface components within said popups are focused.

In some embodiments, a test may determine if a web page contains one or more sounds that play automatically. In some embodiments, a test may check if one or more sounds that play automatically have controls such as pause, stop, and/or volume. In some embodiments a test may not check if one or more sounds that are less than a defined duration such as, for example, three seconds, have controls.

In some embodiments, a test may determine if one or more objects are missing a text equivalent such as, for example, inner text or title attributes. In some embodiments, a test may fail if one or more objects do not have at least one text equivalent.

In some embodiments, a test may determine if one or more map areas have associated alternative text. In some embodiments, a test may further determine if the alternative text associated with one or more map areas shows a common sign of inaccessible content such as, for example, a placeholder description, an excessively long description (such as, for example, more than 100 characters), an inaccurate description, or the like. In some embodiments, a test may determine if the alternative text associated with one or more map areas describe that content, purpose, etc. of the one or more map areas. In some embodiments, a test may determine if one or more images associated with one or more map areas contain text alternatives. In some embodiments, a test may further determine if the text alternatives of one or more images associated with one or more map areas adequately describe the contents of the one or more images.

In some embodiments, a test may determine if one or more tables are used only for layout. In some embodiments, a test may fail if one or more tables that are used only for layout contain a summary attribute.

In some embodiments, a test may determine if one or more link images and/or images are purely decorative. In some embodiments, a test may determine if one or more link image alternatives and/or image alternatives are present on one or more images that are not purely decorative. In some embodiments, a test may fail if one or more link image alternatives and/or image alternatives are placeholders such as, for example, "image" or a filename.

In some embodiments, one or more tables in a web page may contain one or more table cells that contain headers attributes. In some embodiments, a test may determine if one or more headers attributes contain ID values that do not exist on the web page.

In some embodiments, a test may determine if a web page contains one or more embedded elements. In some embodiments, embedded elements should preferably have alternatives such as, for example, noembed elements. In some embodiments, a test may further determine if one or more noembed elements contain text within the one or more embedded elements. In some embodiments, a test may determine if one or more noembed elements adequately describe the one or more embedded elements.

In some embodiments, a test may determine if a web page contains one or more nested tables. In some embodiments, a web page may contain one or more nested tables because, for example, nested tables are used for layout purposes. In some embodiments, screen readers may have difficulty processing/traversing nested tables.

In some embodiments, a test may determine if each of the one or more accesskey attributes associated with one or more elements in a web page is unique. In some embodiments a test may detect conflicting and/or duplicated accesskey attributes (for example, two elements may have the same accesskey assigned). In some embodiments, a human tester may verify that there are no other keypress events that may cause conflicts.

In some embodiments, a test may determine if one or more accesskey attributes are invalid. In some embodiments, one or more accesskey attributes may contain space-delimited lists of characters. In some embodiments, space-delimited lists of characters may be allowed by a specification but may not be supported by all or substantially all web browsers.

In some embodiments, a test may determine if one or more layout tables in a web page contain caption elements. In some embodiments, tables that do not contain data should preferably not contain caption elements.

In some embodiments, a test may determine if a web page contains one or more fieldset legends. In some embodiments, a test may further determine if one or more fieldset legends are empty. In some embodiments a test may determine if one or more legend elements describe the one or more groups of fields contained within the one or more fieldset elements.

In some embodiments, a test may determine if a web page contains one or more form controls that have aria-describedby attributes but that do not have labels. In some embodiments, aria-describedby attributes may not constitute form field labels. For example, the WAI-ARIA specification reserves the aria-describedby attribute to indicate relationships between form inputs rather than the purpose of the form input itself.

In some embodiments, a test may determine if a web page contains one or more popups. In some embodiments, a test may determine if one or more popups overlap one or more controls that cause said popups to appear such as, for example, when a user hovers, focuses, actuates, or clicks one or more controls. In some embodiments, a test may determine if interacting with one or more controls a second time causes one or more popups to be dismissed. For example, in some embodiments, clicking a button or other user interface element a second time may dismiss a popup. In some embodiments, one or more user interface controls to dismiss one or more popups may be obscured.

In some embodiments, a test may determine if a web page uses one or more autofill tokens. In some embodiments, a test may determine if one or more autofill tokens are out of order. For example, in some embodiments, a test may determine that autofill tokens for an address are out of order because they do not appear in the expected order: section (an optional grouping token), shipping/billing designation (optional), and location designation (home, work, mobile, fax, or pager) (optional), followed by the autofill field name.

In some embodiments, a test may determine if a web page contains one or more live synchronized media elements. In some embodiments, a test may determine if the one or more live synchronized media elements have captions.

In some embodiments, a test may determine if one or more images contain longdesc long description attributes. In some embodiments, a test may determine if one or more documents linked to in one or more longdesc attributes adequately describe the one or more images.

In some embodiments, a test may determine if a web page has one or more elements that improperly use autofill tokens. In some embodiments, a test may flag as invalid one or more elements that use autocomplete on/off in combination with autofill tokens. In some embodiments, autofill tokens should not be used with autocomplete on/off is used.

In some embodiments, a test may determine if each of one or more tables in a web page have the same caption and summary. In some embodiments, for each of the one or more tables in a web page, the caption of the table and the summary of the table should preferably be different. In some embodiments, a table caption may act as a title for the table. In some embodiments, assistive technology software may use one or more table captions to generate a listing of the tables in a web page. In some embodiments, one or more table summaries may convey information about the data in one or more tables such as, for example, unusual structural aspects. In some embodiments, if each of one or more tables have the same caption and summary, a screen reader may, for example, repeat content.

In some embodiments, a test may determine if a web page contains one or more frame title attributes. In some embodiments, a test may determine if one or more frame titles are placeholders. In some embodiments, all frame titles should preferably not be empty strings.

In some embodiments, a test may determine if one or more applets in a web page have text equivalents. In some embodiments, a test may further determine if, for example, any text within the one or more applets is also in the text equivalents and/or the text alternatives of the one or more applets adequately describe the contents of the one or more applets.

In some embodiments, a test may determine if one or more elements in a web page such as, for example, anchors or spans, should be announced as buttons (as opposed to links) by assistive technologies. In some embodiments, one or more elements may trigger an action such as, for example, opening a modal dialog, expanding content, collapsing content, changing a color or colors, changing a size or sizes, or sorting a table.

Figure 4:
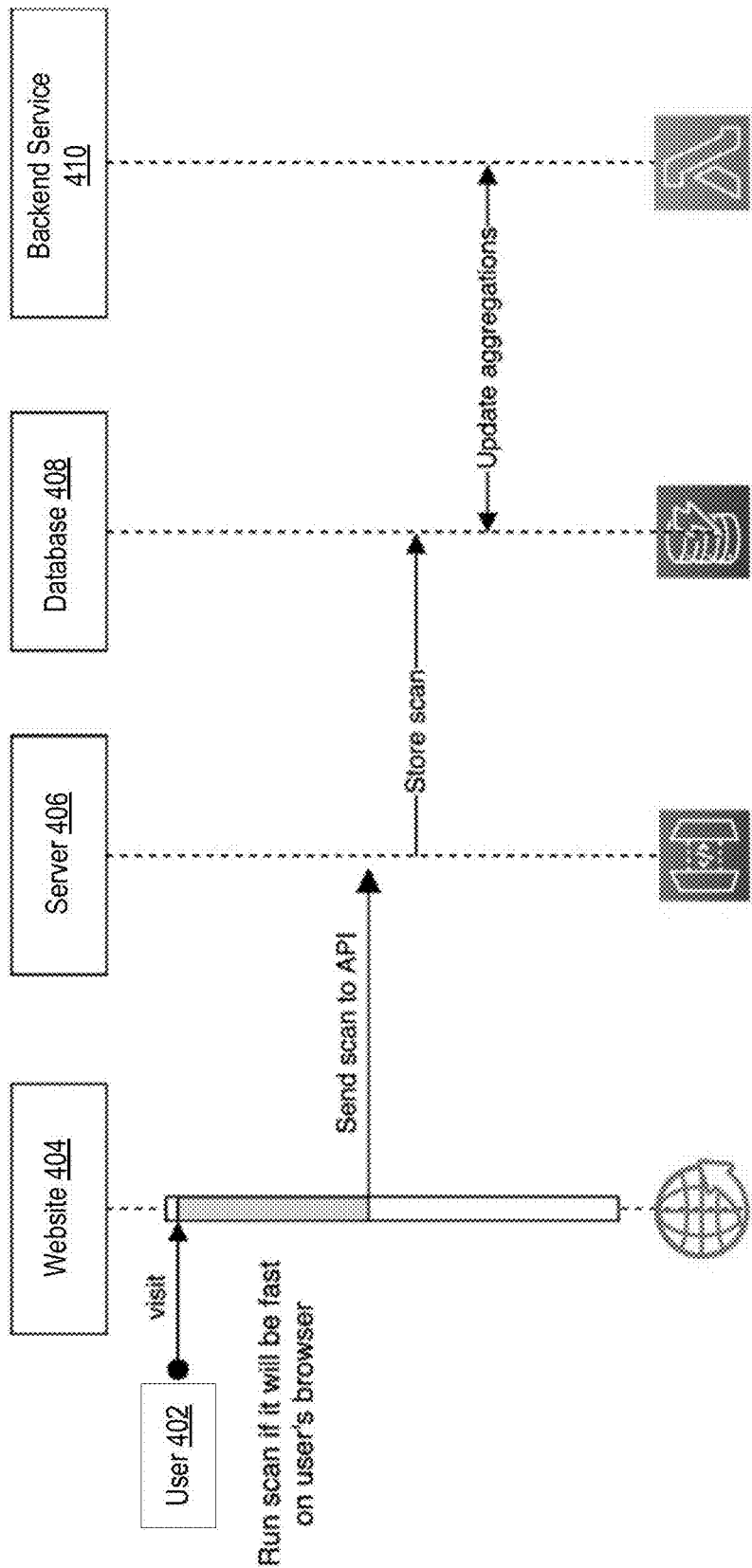
FIG. 4 illustrates sequencing of an example approach for performing accessibility testing of a website, according to some embodiments of the present disclosure.

FIG. 4 illustrates an example approach for performing accessibility testing of a website, according to some embodiments disclosed herein.

A user 402 may visit one or more pages of a website 404 via a web browser on a user device. The pages of the website 404 may contain accessibility testing code which will operate on the user's browser and run scans (e.g., accessibility tests) on the pages of the website 404 browsed by the user 402. In some embodiments, the website can comprise code configured to cause the web browser operating on the user device to contact a remote server. In some embodiments, the code operating in the web browser sends a request to the remote server. In some embodiments, the request causes the remote server to access a database or other data store. In some embodiments, the accessing of the data store comprises accessing testing code. In some embodiments, the remote server is configured to transmit the testing code over an electronic network to the web browser. In some embodiments, the web browser is configured to execute the testing code to perform accessibility testing on the page or pages of the website. In some embodiments, the testing code is configured to modify the HTML and/or DOM to incorporate accessibility testing code into the HTML and/or DOM. In some embodiments, the web browser is configured to execute to the accessibility testing code incorporated in the HTML and/or DOM.

In some embodiments, a particular scan (for example, accessibility testing code) may be run if it will be fast (e.g., to perform) on the user's browser, such as while the user 402 browses the website 404. The results of the scan may be sent via API to a server 406. The server 406 may receive the scan results and then store the scan results in a database or other data store 408. The server 406 may continuously receive scan results for the website 404 over time (e.g., as the user 402 continues to browse the website 404, or as other users browse the website 404), thereby building up the collection of scan results in the database 408.

From time to time, a backend service 410 may be enlisted to aggregate the scan results and/or update aggregations in the database 408. For example, the backend service 410 may aggregate all the scan results (or update those aggregations) in the database 408 associated with the website 404 from the various users that have visited the website 404 over a period of time. In some embodiments, the backend service 410 may be a component of the server 406 that performs the aggregation in the database 408. In some embodiments, the backend service 410 may be an event-driven computing service, such as AWS Lambda.

Figure 5:
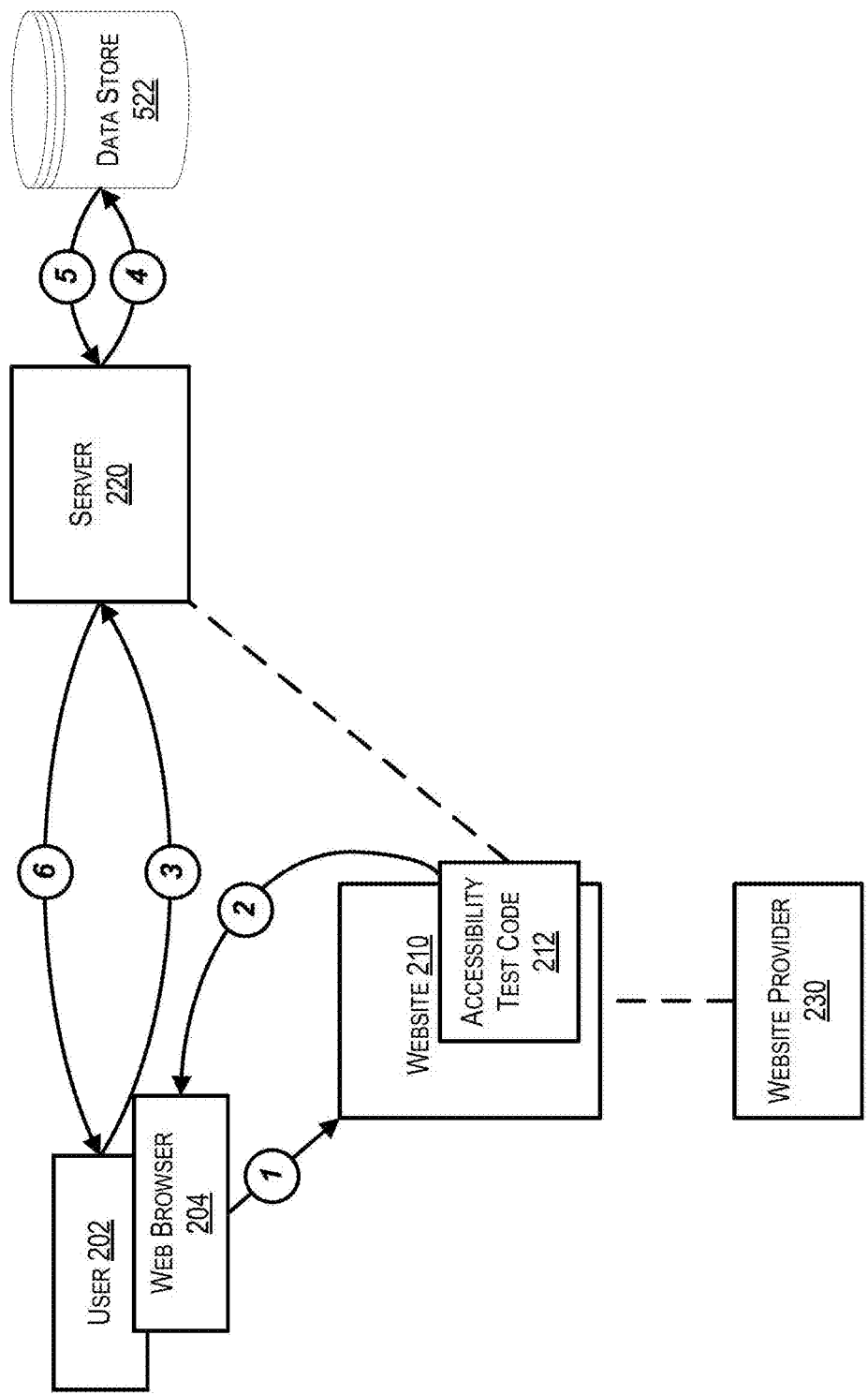
FIG. 5 illustrates a illustrates an example approach for performing remediation of a website, according to some embodiments disclosed herein.

FIG. 5 illustrates an example approach for performing remediation of a website, according to some embodiments disclosed herein. At circle 1, a user 202 accesses a website 210 through a web browser 204 running on their user device. The website 210 may include one or more web pages, and the website 210 may be created by the website provider 230. Embedded in the website 210 (the code of the web pages) may be accessibility test code 212 and/or instructions to request accessibility test code 212 from a remediation server 220. In some embodiments, the accessibility test code may be JavaScript. In some embodiments, the accessibility test code 212 may comprise one or more segments of code such as JavaScript snippets or applets. At circle 2, the accessibility test code 212 may be executed and run in the web browser 204 on the user device. Execution of the accessibility test code 212 may cause the browser 204 to perform a battery of accessibility tests on the website 210 and produce accessibility test results. At circle 3, the browser 204 may send the accessibility test results to a remediation server 220. At circle 4, the remediation server 220 may request one or more remediations and/or remediation scripts from a data store 522. At circle 5, the remediation server 220 may receive one or more remediations from the data store 522. At circle 6, the remediation server may provide one or more remediations and/or remediation scripts to the user 202 for execution by the web browser 204 to modify the web page with one or more remediations.

In some embodiments, a remediation script may be provided by the remediation server. In some embodiments, the remediation script may contain one or more generally applicable remediations. In some embodiments, the remediation script may contain one or more remediations that are specific to the web page and/or the website. In some embodiments, the remediation script may contain only remediations for one or more accessibility issues identified on the web page. In some embodiments, a remediation script may contain a plurality of remediations, one or more of which may not be applicable to the web page.

In some embodiments, a battery of accessibility tests may be run before any remediations are applied to the web page. In some embodiments, a report of one or more identified compliance issues may be generated. In some embodiments, a developer of the web page may use the reports to develop one or more updates to the web page.

In some embodiments, a remediation script containing one or more remediations may be provided to by a remediation server to a web browser and one or more remediations may be applied before a battery of accessibility tests is run. In some embodiments, a report may be generated that identifies one or more accessibility issues that were not resolved by the one or more remediations contained in the remediation script. In some embodiments, one or more reports may be analyzed to identify issues that cannot be resolved by the remediation script. In some embodiments, new and/or modified remediations may be developed. In some embodiments, new and/or modified remediations may be automatically generated. In some embodiments, new and/or modified remediations may be manually created.

In some embodiments, the remediation server may be controlled or operated by a remediation provider who is not the same as the website provider. In some embodiments, a remediation server may be controlled or operated by the website provider.

Various example embodiments of remediation methods are described below and may be implemented by the systems disclosed herein. These examples are merely example embodiments, and modifications to the techniques disclosed therein are considered to be within the scope of the present disclosure. As one example, any techniques that reference a specific number (such as "100 characters" or "14 characters") may be modified to use a different number. Additionally, while various embodiments of remediations are described below, it will be understood that the systems and methods described herein are not limited to the specific remediations in the example embodiments and that additional or modified remediations may also be deployed in accordance with the present disclosure.

FIGS. 6A-6G and the descriptions below provide examples of various remediations that can be performed on a user device, according to some embodiments of the present disclosure. It may be desirable for at least some of the techniques described below to be fully automated. However, it is not necessary that all the techniques are required to be fully automated. As discussed above, in some embodiments, the detection of and/or the remediation of at least some of the issues is completely or at least partially automated. In some embodiments, however, the detection of and/or the remediation of at least some of the issues may be configured to require and/or optionally incorporate at least some user interaction.

The techniques summarized below and those summarized in FIGS. 6A-6H may be implemented by, for example, one or more of the systems disclosed in U.S. Pat. No. 10,444,934 titled MODULAR SYSTEMS AND METHODS FOR SELECTIVELY ENABLING CLOUD-BASED ASSISTIVE TECHNOLOGIES (the '934 Patent), and U.S. Pat. No. 10,423,709, titled SYSTEMS, DEVICES, AND METHODS FOR AUTOMATED AND PROGRAMMATIC CREATION AND DEPLOYMENT OF REMEDIATIONS TO NON-COMPLIANT WEB PAGES OR USER INTERFACES (the '709 Patent), modified versions of those systems, any systems disclosed herein, and/or other suitable systems. The '934 Patent and the '709 Patent are incorporated by reference herein in their entireties.

In some embodiments, one or more accesskey attributes can conflict with one or more user and/or system shortcuts. In some embodiments, one or more accesskey attributes that conflict with one or more user and/or system shortcuts may be removed.

In some embodiments, one or more iframes may be missing titles. In some embodiments, missing titles may cause users of assistive technologies to lack context for where they are in a page. In some embodiments, a system may be configured to add one or more title attribute to the one or more iframe elements based on context clues such as, for example, an element ID. For example, in some embodiments, the system may add a title of "Twitter Widgets Event Hub" to a "twttrhubframe" element.

In some embodiments, one or more images may be missing alt attributes. In some embodiments, if the one or more images are used inside one or more hyperlinks that have additional text or the one or more images are likely used for spacing, the alt attributes of the one or more images may be set to empty strings to indicate that the one or more images are decorative. In some embodiments, if one or more images have title attributes that are different from the file names of the one or more images, the title attributes may be reused as alt attributes.

In some embodiments, multiple adjacent images may have the same alt attributes. In some embodiments, the system may append a counter to the alt attributes of adjacent images with duplicate attributes.

In some embodiments, one or more alt attributes may be too long such as, for example, over 100 characters or over 200 characters. In some embodiments, one or more alt attributes may be shortened. In some embodiments, one or more alt attributes may be shortened, and an ellipsis may be appended to the one or more shortened alt attributes. In some embodiments, the one or more original alt attributes may be preserved as, for example, ARIA labels.

In some embodiments, one or more alt attributes may be redundant with visual visible text nearby. In some embodiments, open or more redundant attributes may be set to empty strings to mark the respective elements as decorative.

In some embodiments, one or more anchor tags may have onclick events or contain JavaScript in the href attributes. In some embodiments, the roles of the one or more anchor tags may be changed to "button" and keypress events may be updated so that space triggers the event instead of or in addition to enter.

In some embodiments, one or more elements may have a role of "menu" when there are no menu children. In some embodiments, one or more role="menu" attributes may be changed to "menuitem," "menuitemcheckbox," and/or "menuitemradio."

In some embodiments one or more lists may have only a single item in each of them. In some embodiments, one or more single list item in one or more lists that contain only a single item each that lack a role may have a role set to "presentation."

In some embodiments, a web page may contain one or more blink elements. In some embodiments, the system may replace the one or more blink elements with spans. In some embodiments, one or more elements may have a text decoration style set to blink. In some embodiments, such elements may be changed to have text decoration styles set to "none."

In some embodiments, one or more buttons may not have labels. In some embodiments, a system may check common locations around one or more button elements to search for labels that may be applied to it such as, for example, text immediately preceding or following the buttons, the names of icons the buttons contain, the presence of a common class name for the buttons, text input fields that are proximate to the buttons, names of forms that the buttons belong to, or the like.

In some embodiments, a web page may respond only to inputs from one or more particular types of devices such as, for example, only a mouse or only a keyboard. In some embodiments, the system may copy one or more inline mouse events into one or more related keyboard events when one or more related keyboard events are not already defined. In some embodiments, the system may be configured to detect errors in the copied events.

In some embodiments, one or more legend elements may be empty. In some embodiments, one or more empty legend elements may be hidden from assistive technologies by using, for example, the aria-hidden attribute. In some embodiments, the role of one or more legend elements may be set to presentation if the one or more legend elements contain no text.

In some embodiments, a first heading may not be within a first level heading or second level heading tag. In some embodiments, the page may be modified to set the first heading on the page to a first level heading by, for example, setting the aria-level to 1 and/or wrapping the first heading in h1 tags.

In some embodiments, one or more radio button groups may not be labeled. In some embodiments, the system may add additional attributes such as, for example, aria-describedby and/or id attributes. In some embodiments, one or more labels may be associated with one or more radio button groups. In some embodiments, a system may be configured to detect one or more labels label in a nearby element. In some embodiments, one or more roles such as, for example, "radiogroup" may be added and one or more labels may be added using, for example, the aria-labelledby attribute.

In some embodiments, one or more form fields may not have valid labels. In some embodiments, the system may check if there are one or more nearby orphaned labels. In some embodiments, one or more orphaned labels may be associated with one or more form fields that do not have labels by using, for example, the aria-labelledby attribute. In some embodiments, one or more form fields may have attribute values that can be used as a label such as, for example, a title and/or placeholder text. In some embodiments, one or more attribute values may be used to set an aria-label attribute. In some embodiments, there may be at least one nearby element that could be used as a label. In some embodiments, a site developer may use one or more labels that assistive technologies cannot detect such as, for example, a label that uses non-semantic markup. In some embodiments, one or more nearby elements may be used to set, for example, one or more aria-labelledby attributes. In some embodiments, one or more elements may have names. In some embodiments, the names of one or more elements may be used to set one or more label values such as, for example, aria-label values. In some embodiments, a system may be configured to choose between possible labels. In some embodiments, a system may first prioritize orphaned labels, followed by form field attributes, then nearby elements, and finally element name, although other prioritizations are possible.

In some embodiments, one or more labels may be orphans because the one or more labels are not associated with one or more target elements by using, for example, nesting or setting attributes. In some embodiments, a system may be configured to attempt to find one or more fields to associate with one or more orphan labels. In some embodiments, one or more labels may be associated with one or more form field controls that are hidden from view. In some embodiments, one or more hidden fields may be made accessible and/or focusable while still keeping the one or more fields out of view. In some embodiments, one or more labels may themselves act as one or more form field controls. In some embodiments, one or more labels may be mapped to one or more field elements in the DOM. In some embodiments, one or more field elements may be proximate to one or more orphan labels. In some embodiments, one or more proximate field elements may not be associated with at least one label. In some embodiments, one or more orphan labels may be associated with one or more proximate fields that do not have labels. In some embodiments, one or more identifiers will be generated for one or more form fields if the one or more form fields do not have identifiers. In some embodiments, one or more orphan label may be assigned one or more roles. In some embodiments, one or more orphan labels may be assigned a presentation role.

In some embodiments, one or more hidden input fields may allow automatic completion. In some embodiments, hidden inputs should preferably not allow automatic completion, and an autocomplete attribute may be removed from the one or more hidden input fields.

In some embodiments, one or more non-hidden input fields may be missing autocomplete attributes. In some embodiments, the name attributes of one or more input fields that do not have autocomplete attributes may be checked against a list of known autocomplete fields. In some embodiments, autocomplete attributes may be added to one or more input fields. In some embodiments, autocomplete attributes may not be added to some types of fields because, for example, the fields are prone to errors. As just one example, address fields may be problematic because there are many ways to structure addresses and many local variations that must be considered. In some embodiments, autocomplete attributes may not be set for one or more fields that involve payment information such as credit card numbers, expiration dates, or the like. In some embodiments, autocomplete attributes may not be added for one or more input elements that relate to country because, for example, the use of an input tag instead of a select tag may indicate that the field utilizes JavaScript. In some embodiments, one or more select tags related to country may be corrected by adding autocomplete attributes. In some embodiments, a browser may have built-in autocomplete functionality that can automatically complete one or more fields even if the one or more fields do not have autocomplete attributes set. As an example, modern web browsers are typically very good at identifying address and payment information fields.

In some embodiments, multiple iframe elements in a web page may have the same title. In some embodiments, a count value may be added to the one or more duplicate titles.

In some embodiments, one or more headings may have no text content. In some embodiments, an assistive technology user may be alerted that one or more headings appear to be empty. In some embodiments, one or more headings that have no text content may be updated with a role of "presentation."

In some embodiments, a web page may not have a level 1 heading. In some embodiments, a level 1 heading with the page title may be added. In some embodiments, an added level 1 heading may be announced to assistive technology users. In some embodiments, an added level 1 heading may not be displayed.

In some embodiments, heading levels may not be properly ordered such as, for example, a level 3 heading following a level 1 heading. In some embodiments, the aria-level attributes of one or more headings may be adjusted. In some embodiments, adjusting the aria-level attribute of one heading may cause one or more subsequent headings to be at an incorrect level. In some embodiments, one or more subsequent headings may be adjusted. In some embodiments, all of the one or more headings may be updated in sequence until the last heading element has been reached and updated.

In some embodiments, one or more elements may have a mismatch between the text contents and the accessible names of the one or more elements. In some embodiments, one or more attributes that provide accessible names to one or more elements may be removed such as, for example, aria-label and/or aria-labelledby attributes. In some embodiments, web developers often place ARIA attributes purposely, and removing attributes may decrease accessibility. In some embodiments, one or more accessible names may not be removed if, for example, the one or more accessible name attributes are not for button and/or link elements. In some embodiments, one or more accessible name attributes will not be removed from one or more link and/or button elements if the text of the one or more link and/or button elements is too short such as, for example, under three characters.

In some embodiments, one or more elements with role attributes may have one or more inappropriate ARIA attributes. In some embodiments, one or more ARIA attributes may be substituted or removed such as, for example, if an attribute does not exist in a dictionary of ARIA attributes. In some embodiments, one or more elements may have a role that is not in a list of known roles. In some embodiments, one or more new roles may be generated based at least in part on child role requirements, parent role requirements, and/or the Levenshtein distance between an invalid assigned role and the names of valid roles. In some embodiments, if a valid role cannot be found, the role attributes may be removed from the one or more elements.

In some embodiments, one or more elements may have an ARIA role but may be missing a required parent role. In some embodiments, a parent role may be added based on, for example, the ARIA roles of one or more child elements. In some embodiments, one or more roles may be removed if there are multiple possible parent roles. In some embodiments, one or more ARIA roles may have a plurality of valid parent roles such as, for example, a "row" role which may have a parent role of, for example, rowgroup, table, and/or grid. In some embodiments, all child roles may be removed if there are multiple possible parent roles.

In some embodiments, one or more elements may have one or more attributes indicating they are hidden from assistive technology such as, for example, aria-hidden="true," and may be displayed on the screen and focusable using, for example, a keyboard. In some embodiments, the one or more elements may have one or more attributes such as, for example, role="presentation," indicating that the one or more elements have no semantic meaning. In some embodiments, the one or more elements may be made unreachable using a keyboard by setting one or more attributes such as, for example, tabindex="-1." In some embodiments, one or more elements may not have attributes indicating that the one or more elements lack semantic meaning, and the attribute indicating that is hidden from assistance technology may be removed.

In some embodiments, a web page may have more than one navigational element within a single section. In some embodiments, one or more navigation elements may be inside one or more content sections such as, for example, header, footer, or other sections. In some embodiments, label attributes may be added to one or more navigation elements such as, for example, aria-label="section." In some embodiments, more than one navigational element may exist within a single section. In some embodiments, the more than one navigational elements may be labeled in part by a number or other indication of the individual navigational element.

In some embodiments, a web page may not have at least one link that allows a user to skip to the main content of a web page. In some embodiments, a link that allows the user to skip to the main content may be added to a web page. In some embodiments, the link may be targeted to the most likely content section. In some embodiments, the most likely content section may be determined by, for example, a role indicating that a part of the web page is the main content, a header, a heading, a nav element, or the like. In some embodiments, the target of the link may already have an ID that can be used for the link. In some embodiments, an ID may be assigned to the target of the link.

In some embodiments, redundant text may appear near one or more images. In some embodiments, redundant text may appear, for example, on the web page content and in the attributes of one or more images. In some embodiments, one or more attributes of the one or more images that are redundant such as, for example, title attributes, may be removed. In some embodiments, one or more alt attributes that contain redundant text may be set to empty strings.

In some embodiments, one or more label elements may be empty. In some embodiments, one or more labels may be added by, at least in part, checking the relevant inputs to determine, for example, one or more placeholders, titles, or names to use as labels. In some embodiments, one or more labels may be in the form of visually hidden spans which may be announced to assistive technology users. In some embodiments, one or more labels may be empty, and there may be one or more relevant inputs neighboring the one or more labels. In some embodiments, one or more labels may be assigned based at least in part on the placeholder, title, and/or name attributes of the one or more neighboring inputs. In some embodiments, one or more inputs may be associated with multiple labels. In some embodiments, one or more labels may be disassociated from one or more inputs by, for example, removing one or more "for" attributes. In some embodiments, one or more inputs may have title attributes but no label attributes. In some embodiments, one or more visually hidden labels may be created based at least in part on the one or more titles of the one or more input elements.

In some embodiments, two or more adjacent links may have the same target. In some embodiments, two or more adjacent links may be merged into a single link.

In some embodiments, one or more links may not contain text content. In some embodiments, the one or more links may be hidden from assistive technology. In some embodiments, one or more screen reader-only spans may be appended to the one or more links.

In some embodiments, one or more anchors may not have href, name, ID, tabindex, role, or other attributes. In some embodiments, the one or more anchors may be changed to spans. In some embodiments, the attributes of the one or more anchors may be copied over to the spans.

In some embodiments, one or more link images with no text content may be marked as decorate (for example, by having alt attributes set to empty strings). In some embodiments, one or more descriptions may be generated for the one or more link images that have empty alt attributes by, for example, generating a description based at least in part on the destinations of the one or more links images. In some embodiments, a remediation may not be applied when one or more "area" elements that refer to part of the image are used and/or one or more elements have a role of "link."

In some embodiments, one or more links may contain at least one image that does not have an alt attribute. In some embodiments, at least one link image may not have an alt attribute set. In some embodiments, an alt attribute for the at least one link image may be set to an empty string if the one or more links contain some text content. In some embodiments, an alt attribute for the at least one link image may be generated based on the destinations of the one or more links. In some embodiments, if the one or more links do not have text content, one or more link descriptions may be generated based on, for example, href attributes and may be used as the alt text of the one or more images.

In some embodiments, one or more internal anchors may point to a nonexistent part or parts of the page such as, for example, an internal anchor that points to a name, ID, tabindex, roll, or the like that does not exist on the page. In some embodiments, one or more anchors that point to a nonexistent part of the page may have other functionality. In some embodiments, functionality may be indicated by one or more attributes such as, for example, a name, ID, tabindex, roll, or the like. In some embodiments, one or more internal anchors that may have additional functionality may not be altered. In some embodiments, one or more internal anchors may not have an attribute such as, for example, a name, ID, tabindex, roll, or the like and thus may be determined to likely not have additional functionality. In some embodiments, role attributes may be set that indicate to assistive technologies that the one or more anchors that point to nonexistence parts of the page and that do not appear to have additional functionality do not have semantic meaning.

In some embodiments, one or more links may have non-descriptive text such as, for example, "read more," "link," or the like. In some embodiments, link descriptions may be generated based at least in part on the targets of the one or more links.

In some embodiments, one or more links may have redundant title and text content. In some embodiments, one or more redundant title attributes may be removed from one or more links.

In some embodiments, a web page may contain one or more marquee elements. In some embodiments, one or more marquee elements may be replaced by spans.

In some embodiments, a web page may contain one or more anchors that do not contain valid hrefs but do contain onclick events. In some embodiments, a role of "button" may be assigned to the one or more anchors that have onclick events but do not have valid hrefs.

In some embodiments, one or more page elements may be interactable by a user using a mouse but may not be interactable by a user using a keyboard. In some embodiments, the type and role of one or more such elements may match, and the role may be removed so that native browser functionality is preserved. In some embodiments, the type and role of one or more such elements may not match, and events may be added to react to key presses. In some embodiments, for example, one or more buttons and/or links may be modified so that the one or more buttons and/or links may be activated by pressing the space and/or enter keys. In some embodiments, key press events may not be added to an element or elements if the element or elements have a tabindex of −1.

In some embodiments, one or more non-hidden interactable elements may not have tabindex values. In some embodiments, a tabindex may be added to ensure that a user can navigate to the one or more interactable elements.

In some embodiments, one or more links to downloadable files may not indicate to the user that said links will cause files to download. For example, one or more links may be directed to Microsoft Word documents, ZIP files, executables, and other types of downloadable content. In some embodiments, indications may be added to said links to indicate to the user that said links will cause files to download.

In some embodiments, one or more forms may be missing labels. In some embodiments, one or more labels for said forms may by, for example, inspecting the DOM for a suitable label.

In some embodiments, one or more forms may be missing ARIA labels that are required for compliance. In some embodiments, one or more missing required ARIA labels may be added to the one or more forms.

In some embodiments, one or more frames and/or iframes may be missing titles. In some embodiments, titles may be added to the one or more frames and/or iframes.

In some embodiments, one or more links may not have any text. In some embodiments, text may be added to said links based on, for example, the targets of the one of more links.

In some embodiments, a web page may contain one or more empty headers. In some embodiments, empty headers may be hidden from assistive technology by, for example adding aria-hidden attributes to the one or more empty headers.

In some embodiments, one or more links may be directed to the current page. In some embodiments, said links may be updated to have a "button" role. In some embodiments, one or more key press events may be added to the one or more links.

In some embodiments, one or more label references may be invalid. In some embodiments, said label references may be removed.

In some embodiments, one or more table headers may be empty. In some embodiments, said table header (th) elements may be changed to standard data cell (td) elements.

In some embodiments, one or more elements on a web page may have redundant titles because, for example, the titles of the one or more elements contain text that is found with the text of the one or more elements. In some embodiments, one or more redundant titles may be removed.

In some embodiments, one or more outer tables in a web page may have inner tables nested within them. In some embodiments, said outer tables may preferably have their roles set to presentation. In some embodiments, whether or not to set the role of one or more outer tables to presentation may be determined by, for example, comparing the number of rows in an inner table to the number of rows in an outer table, comparing the number of cells in an inner table to the number of cells in an outer table, and/or comparing the number of table headers in an inner table to the number of table headers in an outer table. In some embodiments, the role of one or more outer tables may be set to presentation if, for example, the difference in the number of rows between said outer tables and corresponding inner tables is less than or equal to two, the difference in the number of cells between said outer tables and corresponding inner tables is less than or equal to six, and/or the difference in the number of table headers between said outer tables and corresponding inner tables is equal to zero.

In some embodiments, one or more groups of checkboxes may be missing a description and/or may not have descriptions labeling the one or more groups of checkboxes. In some embodiments, one or more identified fieldsets may be wrapped in, for example, one or more divs that are assigned "group" roles. In some embodiments, a label (for example, aria=labelledby) may be determined by inspecting the DOM for orphan labels, relevant text notes, or the like. In some embodiments, if a label cannot be determined, a label may be generated. In some embodiments, one or more labels may be set using, for example, aria-label and/or aria-labelledby attributes.

In some embodiments, one or more form fields may not have valid labels. In some embodiments, one or more labels may be added to said form fields by, for example, checking for nearby orphan labels, checking for one or more form field attributes that can be used as labels such as, for example, titles or placeholder text, checking for nearby elements that can be used as labels (for example, if a web developer used non-semantic markup to add one or more labels), and/or checking for names of one or more form fields.

In some embodiments, a web page may contain more than one level one heading. In some embodiments, all headings after the first level one heading may be converted to level two headings. For example, in some embodiments, <h1> may be changed to <h1 aria-level="2" role="heading">.

In some embodiments, a web page may contain more than one sections that have roles of "complementary." In some embodiments, labels may be added aid assistive technology users in distinguishing multiple complementary landmarks. For example, in some embodiments, unique aria-label attributes may be added to each of the more than one complementary elements.

In some embodiments, a web page may contain more than one main element. In some embodiments, a "presentation" role may be assigned to all of the one or more main elements that are contained within another element such as header, footer, aside, or article elements. In some embodiments, if all main elements are contained inside header, footer, aside, or article elements, first main element may not be assigned a "presentation" role.

In some embodiments, a web page may contain one or more links that do not have image content and that do not have text content. In some embodiments, link descriptions may be added (for example, using aria-label) based at least in part on the href values of the one or more links. In some embodiments, for example, aria-label="Back to top" may be added to a link with href="#."

In some embodiments, a web page may contain one or more links with redundancies. For example, in some embodiments, one or more links may have title and/or alt attributes that repeat content already present in said links. In some embodiments, one or more title attributes redundant title attributes may be removed. In some embodiments, one or more redundant alt attributes may be removed.

In some embodiments, a web page may contain one or more spacer images. In some embodiments, one or may spacer images may not have alt attributes. In some embodiments, empty alt attributes may be added to one or more images based on the filenames of the one or more images. For example, alt=" " may be added to one or more images with filenames that contain the words "spacer," "space," or "blank." In some embodiments, empty alt attributes may be added, regardless of filename, if one or more images are small, such as 1 pixel wide and/or tall, 2 pixels wide and/or tall, 3 pixels wide and/or tall, or some other number of pixels wide and/or tall.

In some embodiments, the focus sequence of a web page may be out of order because, for example, tabindex values alter the sequential order. In some embodiments, out of order navigation may make it difficult for people who rely on assistive technologies to navigate the page. In some embodiments, all tabindex values greater than zero may be changed to zero.

In some embodiments, one or more tables may be used only for presentation purposes. In some embodiments, said tables may be assigned "presentation" roles. In some embodiments, whether one or more tables are used only for presentation purposes may be for example, inspecting said tables for one or more header elements, one or more elements with a role of "columnheader," and/or one or more elements with a role of "rowheader."

Computer Systems

Figure 7:
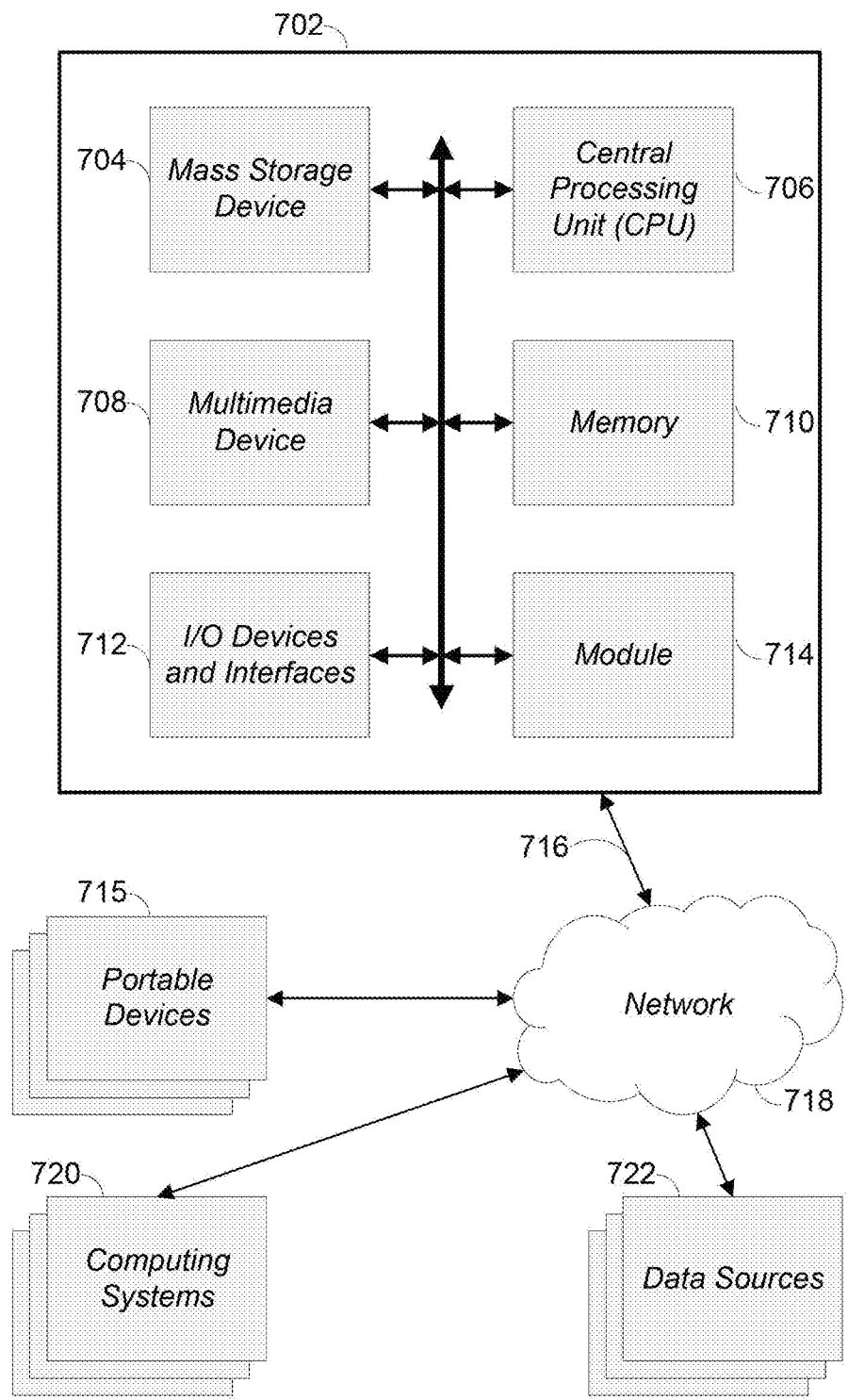
FIG. 7 illustrates a computer system with which certain methods disclosed herein may be implemented, in accordance with some embodiments of the present disclosure.

FIG. 7 is a block diagram depicting an embodiment of a computer hardware system configured to run software for implementing one or more embodiments of the health testing and diagnostic systems, methods, and devices disclosed herein.

In some embodiments, the systems, processes, and methods described herein are implemented using a computing system, such as the one illustrated in FIG. 7. The example computer system 702 is in communication with one or more computing systems 730 and/or one or more data sources 722 via one or more networks 718. While FIG. 7 illustrates an embodiment of a computing system 702, it is recognized that the functionality provided for in the components and modules of computer system 702 may be combined into fewer components and modules, or further separated into additional components and modules.

The computer system 702 can comprise a module 714 that carries out the functions, methods, acts, and/or processes described herein. The module 714 is executed on the computer system 702 by a central processing unit 706 discussed further below.

In general, the word "module," as used herein, refers to logic embodied in hardware or firmware or to a collection of software instructions, having entry and exit points. Modules are written in a program language, such as Java, C, C++, Python, or the like. Software modules may be compiled or linked into an executable program, installed in a dynamic link library, or may be written in an interpreted language such as BASIC, PERL, LUA, or Python. Software modules may be called from other modules or from themselves, and/or may be invoked in response to detected events or interruptions. Modules implemented in hardware include connected logic units such as gates and flip-flops, and/or may include programmable units, such as programmable gate arrays or processors.

Generally, the modules described herein refer to logical modules that may be combined with other modules or divided into sub-modules despite their physical organization or storage. The modules are executed by one or more computing systems and may be stored on or within any suitable computer readable medium or implemented in-whole or in-part within special designed hardware or firmware. Not all calculations, analysis, and/or optimization require the use of computer systems, though any of the above-described methods, calculations, processes, or analyses may be facilitated through the use of computers. Further, in some embodiments, process blocks described herein may be altered, rearranged, combined, and/or omitted.

The computer system 702 includes one or more processing units (CPU) 706, which may comprise a microprocessor. The computer system 702 further includes a physical memory 710, such as random-access memory (RAM) for temporary storage of information, a read only memory (ROM) for permanent storage of information, and a mass storage device 704, such as a backing store, hard drive, rotating magnetic disks, solid state disks (SSD), flash memory, phase-change memory (PCM), 7D XPoint memory, diskette, or optical media storage device. Alternatively, the mass storage device may be implemented in an array of servers. Typically, the components of the computer system 702 are connected to the computer using a standards-based bus system. The bus system can be implemented using various protocols, such as Peripheral Component Interconnect (PCI), Micro Channel, SCSI, Industrial Standard Architecture (ISA) and Extended ISA (EISA) architectures.

The computer system 702 includes one or more input/output (I/O) devices and interfaces 712, such as a keyboard, mouse, touch pad, and printer. The I/O devices and interfaces 712 can include one or more display devices, such as a monitor, that allows the visual presentation of data to a user. More particularly, a display device provides for the presentation of GUIs as application software data, and multi-media presentations, for example. The I/O devices and interfaces 712 can also provide a communications interface to various external devices. The computer system 702 may comprise one or more multi-media devices 708, such as speakers, video cards, graphics accelerators, and microphones, for example.

The computer system 702 may run on a variety of computing devices, such as a server, a Windows server, a Structure Query Language server, a Unix Server, a personal computer, a laptop computer, and so forth. In other embodiments, the computer system 702 may run on a cluster computer system, a mainframe computer system and/or other computing system suitable for controlling and/or communicating with large databases, performing high volume transaction processing, and generating reports from large databases. The computing system 702 is generally controlled and coordinated by an operating system software, such as z/OS, Windows, Linux, UNIX, BSD, SunOS, Solaris, MacOS, or other compatible operating systems, including proprietary operating systems. Operating systems control and schedule computer processes for execution, perform memory management, provide file system, networking, and I/O services, and provide a user interface, such as a graphical user interface (GUI), among other things.

The computer system 702 illustrated in FIG. 7 is coupled to a network 718, such as a LAN, WAN, or the Internet via a communication link 716 (wired, wireless, or a combination thereof). Network 718 communicates with various computing devices and/or other electronic devices. Network 718 is communicating with one or more computing systems 230 and one or more data sources 722. The module 714 may access or may be accessed by computing systems 230 and/or data sources 722 through a web-enabled user access point. Connections may be a direct physical connection, a virtual connection, and other connection type. The web-enabled user access point may comprise a browser module that uses text, graphics, audio, video, and other media to present data and to allow interaction with data via the network 718.

Access to the module 714 of the computer system 702 by computing systems 230 and/or by data sources 722 may be through a web-enabled user access point such as the computing systems' 230 or data source's 722 personal computer, cellular phone, smartphone, laptop, tablet computer, e-reader device, audio player, or another device capable of connecting to the network 718. Such a device may have a browser module that is implemented as a module that uses text, graphics, audio, video, and other media to present data and to allow interaction with data via the network 718.

The output module may be implemented as a combination of an all-points addressable display such as a cathode ray tube (CRT), a liquid crystal display (LCD), a plasma display, or other types and/or combinations of displays. The output module may be implemented to communicate with input devices 712 and they also include software with the appropriate interfaces which allow a user to access data through the use of stylized screen elements, such as menus, windows, dialogue boxes, tool bars, and controls (for example, radio buttons, check boxes, sliding scales, and so forth). Furthermore, the output module may communicate with a set of input and output devices to receive signals from the user.

The input device(s) may comprise a keyboard, roller ball, pen and stylus, mouse, trackball, voice recognition system, or pre-designated switches or buttons. The output device(s) may comprise a speaker, a display screen, a printer, or a voice synthesizer. In addition, a touch screen may act as a hybrid input/output device. In another embodiment, a user may interact with the system more directly such as through a system terminal connected to the score generator without communications over the Internet, a WAN, or LAN, or similar network.

In some embodiments, the system 702 may comprise a physical or logical connection established between a remote microprocessor and a mainframe host computer for the express purpose of uploading, downloading, or viewing interactive data and databases on-line in real time. The remote microprocessor may be operated by an entity operating the computer system 702, including the client server systems or the main server system, an/or may be operated by one or more of the data sources 722 and/or one or more of the computing systems 230. In some embodiments, terminal emulation software may be used on the microprocessor for participating in the micro-mainframe link.

In some embodiments, computing systems 230 who are internal to an entity operating the computer system 702 may access the module 714 internally as an application or process run by the CPU 706.

In some embodiments, one or more features of the systems, methods, and devices described herein can utilize a URL and/or cookies, for example for storing and/or transmitting data or user information. A Uniform Resource Locator (URL) can include a web address and/or a reference to a web resource that is stored on a database and/or a server. The URL can specify the location of the resource on a computer and/or a computer network. The URL can include a mechanism to retrieve the network resource. The source of the network resource can receive a URL, identify the location of the web resource, and transmit the web resource back to the requestor. A URL can be converted to an IP address, and a Domain Name System (DNS) can look up the URL and its corresponding IP address. URLs can be references to web pages, file transfers, emails, database accesses, and other applications. The URLs can include a sequence of characters that identify a path, domain name, a file extension, a host name, a query, a fragment, scheme, a protocol identifier, a port number, a username, a password, a flag, an object, a resource name and/or the like. The systems disclosed herein can generate, receive, transmit, apply, parse, serialize, render, and/or perform an action on a URL.

A cookie, also referred to as an HTTP cookie, a web cookie, an internet cookie, and a browser cookie, can include data sent from a website and/or stored on a user's computer. This data can be stored by a user's web browser while the user is browsing. The cookies can include useful information for websites to remember prior browsing information, such as a shopping cart on an online store, clicking of buttons, login information, and/or records of web pages or network resources visited in the past. Cookies can also include information that the user enters, such as names, addresses, passwords, credit card information, etc. Cookies can also perform computer functions. For example, authentication cookies can be used by applications (for example, a web browser) to identify whether the user is already logged in (for example, to a web site). The cookie data can be encrypted to provide security for the consumer. Tracking cookies can be used to compile historical browsing histories of individuals. Systems disclosed herein can generate and use cookies to access data of an individual. Systems can also generate and use JSON web tokens to store authenticity information, HTTP authentication as authentication protocols, IP addresses to track session or identity information, URLs, and the like.

The computing system 702 may include one or more internal and/or external data sources (for example, data sources 722). In some embodiments, one or more of the data repositories and the data sources described above may be implemented using a relational database, such as DB2, Sybase, Oracle, CodeBase, and Microsoft® SQL Server as well as other types of databases such as a flat-file database, an entity relationship database, and object-oriented database, and/or a record-based database.

The computer system 702 may also access one or more databases 722. The databases 722 may be stored in a database or data repository. The computer system 702 may access the one or more databases 722 through a network 718 or may directly access the database or data repository through I/O devices and interfaces 712. The data repository storing the one or more databases 722 may reside within the computer system 702.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than restrictive sense.

Indeed, although this invention has been disclosed in the context of certain embodiments and examples, it will be understood by those skilled in the art that the invention extends beyond the specifically disclosed embodiments to other alternative embodiments and/or uses of the invention and obvious modifications and equivalents thereof. In addition, while several variations of the embodiments of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. It should be understood that various features and aspects of the disclosed embodiments can be combined with, or substituted for, one another in order to form varying modes of the embodiments of the disclosed invention. Any methods disclosed herein need not be performed in the order recited. Thus, it is intended that the scope of the invention herein disclosed should not be limited by the particular embodiments described above.

It will be appreciated that the systems and methods of the disclosure each have several innovative aspects, no single one of which is solely responsible or required for the desirable attributes disclosed herein. The various features and processes described above may be used independently of one another or may be combined in various ways. All possible combinations and subcombinations are intended to fall within the scope of this disclosure.

Certain features that are described in this specification in the context of separate embodiments also may be implemented in combination in a single embodiment. Conversely, various features that are described in the context of a single embodiment also may be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination. No single feature or group of features is necessary or indispensable to each and every embodiment.

It will also be appreciated that conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. In addition, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise. Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted may be incorporated in the example methods and processes that are schematically illustrated. For example, one or more additional operations may be performed before, after, simultaneously, or between any of the illustrated operations. Additionally, the operations may be rearranged or reordered in other embodiments. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products. Additionally, other embodiments are within the scope of the following claims. In some cases, the actions recited in the claims may be performed in a different order and still achieve desirable results.

Further, while the methods and devices described herein may be susceptible to various modifications and alternative forms, specific examples thereof have been shown in the drawings and are herein described in detail. It should be understood, however, that the invention is not to be limited to the particular forms or methods disclosed, but, to the contrary, the invention is to cover all modifications, equivalents, and alternatives falling within the spirit and scope of the various implementations described and the appended claims. Further, the disclosure herein of any particular feature, aspect, method, property, characteristic, quality, attribute, element, or the like in connection with an implementation or embodiment can be used in all other implementations or embodiments set forth herein. Any methods disclosed herein need not be performed in the order recited. The methods disclosed herein may include certain actions taken by a practitioner; however, the methods can also include any third-party instruction of those actions, either expressly or by implication. The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and should be interpreted based on the circumstances (e.g., as accurate as reasonably possible under the circumstances, for example ±5%, ±10%, ±15%, etc.). For example, "about 7.5 mm" includes "3.5 mm." Phrases preceded by a term such as "substantially" include the recited phrase and should be interpreted based on the circumstances (e.g., as much as reasonably possible under the circumstances). For example, "substantially constant" includes "constant." Unless stated otherwise, all measurements are at standard conditions including temperature and pressure.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y, and at least one of Z to each be present. The headings provided herein, if any, are for convenience only and do not necessarily affect the scope or meaning of the devices and methods disclosed herein.

Accordingly, the claims are not intended to be limited to the embodiments shown herein, but are to be accorded the widest scope consistent with this disclosure, the principles and the novel features disclosed herein.

What is claimed is:

1. A remote computing system for distributed compliance remediation analysis of a web page, the remote computing system comprising:
   one or more computer data stores configured to store a plurality of computer executable instructions; and
   one or more hardware computer processors in communication with the one or more computer data stores and configured to execute the plurality of computer executable instructions in order to cause the system to:
      receive through an electronic communications network a request for a compliance test script for applying to the web page and a uniform resource locator (URL) for the web page, the request generated by a user computing system;
      determine, by the one or more computer processors in communication with the one or more computer data stores, whether the compliance test script is current based on updated web accessibility standards stored in the one or more computer data stores;
      automatically alter, by the one or more computer processors in communication with the one or more computer data stores, the compliance test script based on the updated web accessibility standards;
      transmit through the electronic communications network to the user computing system the altered compliance test script for applying to the web page loaded by the user computing system, the altered compliance test script configured for execution within a user's browser operating on the user computing system, the altered compliance test script further configured to enable the user computing system to detect one or more compliance issues in the web page loaded by the user computing system and generate a non-compliance report of the detected one or more compliance issues in the web page for transmission to the remote computing system, the altered compliance test script comprising one or more compliance tests, the altered compliance test script configured to enable the user computing system to detect one or more compliance issues in order to implement a distributed system for detecting compliance issues in the web page, the altered compliance test script configured to re-run the one or more compliance tests of the altered compliance test script in response to a change in the web page;
      receive through the electronic communications network from the user computing system the generating non-compliance report;
      store the generated non-compliance report;
      determine, based on the generated non-compliance report, one or more remediations from a remediations data store by querying the remediations data store; and
      transmit through the electronic communications network to the user computing system a remediation script for applying to the web page, the remediation script configured to be processed by the user's browser operating on the user computing system to enable the user's browser to remediate at least one compliance issue in the web page loaded by the user computing system;

wherein the altered compliance test script is further configured to, in response to executing the remediation script from the remote computing system, re-run, from the one or more compliance tests of the altered compliance test script, a subset of compliance tests that correspond to web page elements updated by detected user actions; and wherein the remediation script is configured to manipulate a document object model (DOM) of the web page loaded by the user computing system, such that the at least one compliance issue is remediated at time the web page has finished loading and rendering on the user computing system.

2. The remote computing system of claim 1, wherein the altered compliance test script is further configured to generate a second compliance test report, the second compliance test report comprising an indicator for alerting an administrator of one or more problematic compliance issues requiring manual remediation fixes.

3. The remote computing system of claim 1, wherein the altered compliance test script is further configured to prioritize one or more compliance tests based at least in part on a uniform resource locator of the web page.

4. The remote computing of claim 1, wherein the altered compliance test script is further configured to abort one or more compliance tests after a maximum period of time.

5. The remote computing system of claim 1, wherein the compliance test report comprises a uniform resource locator of the web page loaded by the user computing system.

6. The remote computing system of claim 1, wherein the compliance test is further configured to run when the user's browser is in a substantially idle state.

7. The remote computing of claim 1, wherein the remediation script is configured to stop executing after a maximum period of time.

8. The remote computing system of claim 1, wherein the remediation script comprises one or more remediations that are specific to a website to which the web page belongs.

9. A user computing system for distributed compliance remediation analysis of a web page, the user computing system comprising:

one or more computer data stores configured to store a plurality of computer executable instructions; and one or more hardware computer processors in communication with the one or more computer data stores and configured to execute the plurality of computer executable instructions in order to cause the system to:

transmit through an electronic communications network to a remote computing system a request for a compliance test script for applying to the web page;

receive through the electronic communications network from the remote computing system the compliance test script for applying to the web page loaded by the user computing system, determine, by the one or more computer processors in communication with the one or more computer data stores, whether the compliance test script is current based on updated web accessibility standards stored in the one or more computer data stores;

automatically alter, by the one or more computer processors in communication with the one or more computer data stores, the compliance test script based on the updated web accessibility standards;

the altered compliance test script configured for execution within a user's browser operating on the user computing system, the altered compliance test script further configured to enable the user computing system to detect one or more compliance issues in the web page loaded by the user computing system and generate a non-compliance report of the detected one or more compliance issues in the web page for transmission to the remote computing system, the altered compliance test script comprising one or more compliance tests, the altered compliance test script configured to re-run the one or more compliance tests of the altered compliance test script in response to a change in the web page;

execute within the user's browser the received altered compliance test script in order to enable a distributed system for detecting compliance issues in the web page, the received altered compliance test script comprising instructions to:

detect one or more compliance issues in the web page loaded by the user computer system; and generate the non-compliance report based on the detected one or more compliance issues;

transmit through the electronic communications network to the remote computing system the generated non-compliance report;

determine, based on the generated non-compliance report, one or more remediations from a remediations data store by querying the remediations data store;

receive from the remote computing system through the electronic communications network a remediation script for applying to the web page loaded by the user computing system, the remediation script configured to be processed by the user's browser operating on the user computing system to enable the user's browser to remediate at least one compliance issue in the web page loaded by the user computing system;

wherein the altered compliance test script is further configured to, in response to executing the remediation script from the remote computing system, re-run, from the one or more compliance tests of the altered compliance test script, a subset of compliance tests that correspond to web page elements updated by detected user actions; and execute within the user's browser the remediation script comprising instructions to:

modify the web page to remediate the one or more detected compliance issues, wherein the remediation script is configured to manipulate a document object model (DOM) of the web page loaded by the user computing system, such that the at least one compliance issue is remediated at time the web page has finished loading and rendering on the user computing system.

10. The user computing system of claim 9, wherein the altered compliance test script is further configured to generate a second compliance test report, the second compliance test report comprising an indicator for alerting an administrator of one or more problematic compliance issues requiring manual remediation fixes.

11. The user computing system of claim 9, wherein the altered compliance test script is further configured to prioritize one or more compliance tests based at least in part on a uniform resource locator of the web page.

12. The user computing system of claim 9, wherein the altered compliance test script is further configured to abort one or more compliance tests after a maximum period of time.

13. The user computing system of claim 9, wherein the compliance test report comprises a uniform resource locator of the web page loaded by the user computing system.

14. The user computing system of claim 9, wherein the compliance test is further configured to run when the user's browser is in a substantially idle state.

15. The user computing system of claim 9, wherein the remediation script is configured to stop executing after a maximum period of time.

16. The user computing system of claim 9, wherein the remediation script comprises one or more remediations that are specific to a website to which the web page belongs.

* * * * *